(12) United States Patent
Yamada et al.

(10) Patent No.: US 6,999,240 B2
(45) Date of Patent: Feb. 14, 2006

(54) ZOOM LENS AND VIDEO CAMERA USING IT

(75) Inventors: Katsu Yamada, Matsubara (JP); Shuusuke Ono, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 93 days.

(21) Appl. No.: 10/489,808

(22) PCT Filed: Nov. 22, 2002

(86) PCT No.: PCT/JP02/12216

§ 371 (c)(1),
(2), (4) Date: Mar. 17, 2004

(87) PCT Pub. No.: WO03/046635

PCT Pub. Date: Jun. 5, 2003

(65) Prior Publication Data
US 2004/0246593 A1 Dec. 9, 2004

(30) Foreign Application Priority Data
Nov. 28, 2001 (JP) ............................. 2001-362932
Jan. 30, 2002 (JP) ............................. 2002-022129

(51) Int. Cl.
*G02B 15/14* (2006.01)
*G02B 27/64* (2006.01)
(52) U.S. Cl. .................. 359/683; 359/557; 359/684
(58) Field of Classification Search .............. 359/676, 359/683, 684, 554, 557
See application file for complete search history.

(56) References Cited

U.S. PATENT DOCUMENTS

| | | | |
|---|---|---|---|
| 6,392,816 B1 | 5/2002 | Hamano | 359/683 |
| 6,763,186 B2 * | 7/2004 | Hamano | 396/79 |
| 2004/0218274 A1 * | 11/2004 | Aoki | 359/557 |

FOREIGN PATENT DOCUMENTS

| | | |
|---|---|---|
| EP | 1 103 834 | 5/2001 |
| JP | 7-128619 | 5/1995 |
| JP | 8-29737 | 2/1996 |

* cited by examiner

Primary Examiner—Scott J. Sugarman
(74) Attorney, Agent, or Firm—Hamre, Schumann, Mueller & Larson, P.C.

(57) ABSTRACT

A zoom lens capable of correcting camera shake and being reduced in size and weight, comprising five groups of lenses respectively having positive, negative, positive, negative, positive refractive powers, the second lens group (12) varying power, the fifth lens group (15) adjusting focusing. The third lens group (13) is moved in a direction perpendicular to the optical axis when correcting camera shake. When lens power on the object side of a cemented lens in the first lens group (11) is $\phi_{11}$, lens power on the image plane side $\phi_{12}$, the Abbe number of a lens on the object side $\nu_{d11}$, and the Abbe number of a lens on the image plane side $\nu_{d12}$, the condition of the following Expression 82 is satisfied:

$-75 < \nu_{d11}\nu_{d12}(\phi_{11}+\phi_{12})/(\phi_{11}\nu_{d12}+\phi_{12}\nu_{d11}) < -50$. Expression 82.

47 Claims, 37 Drawing Sheets

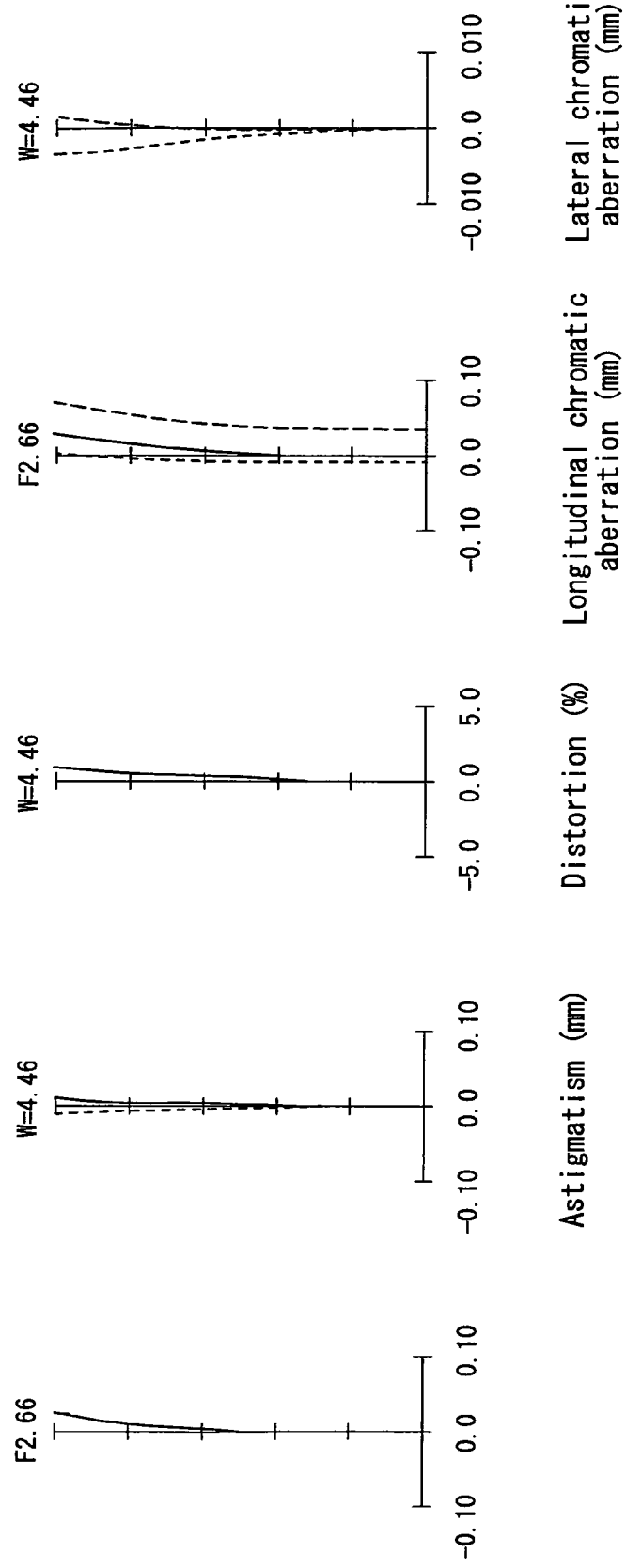

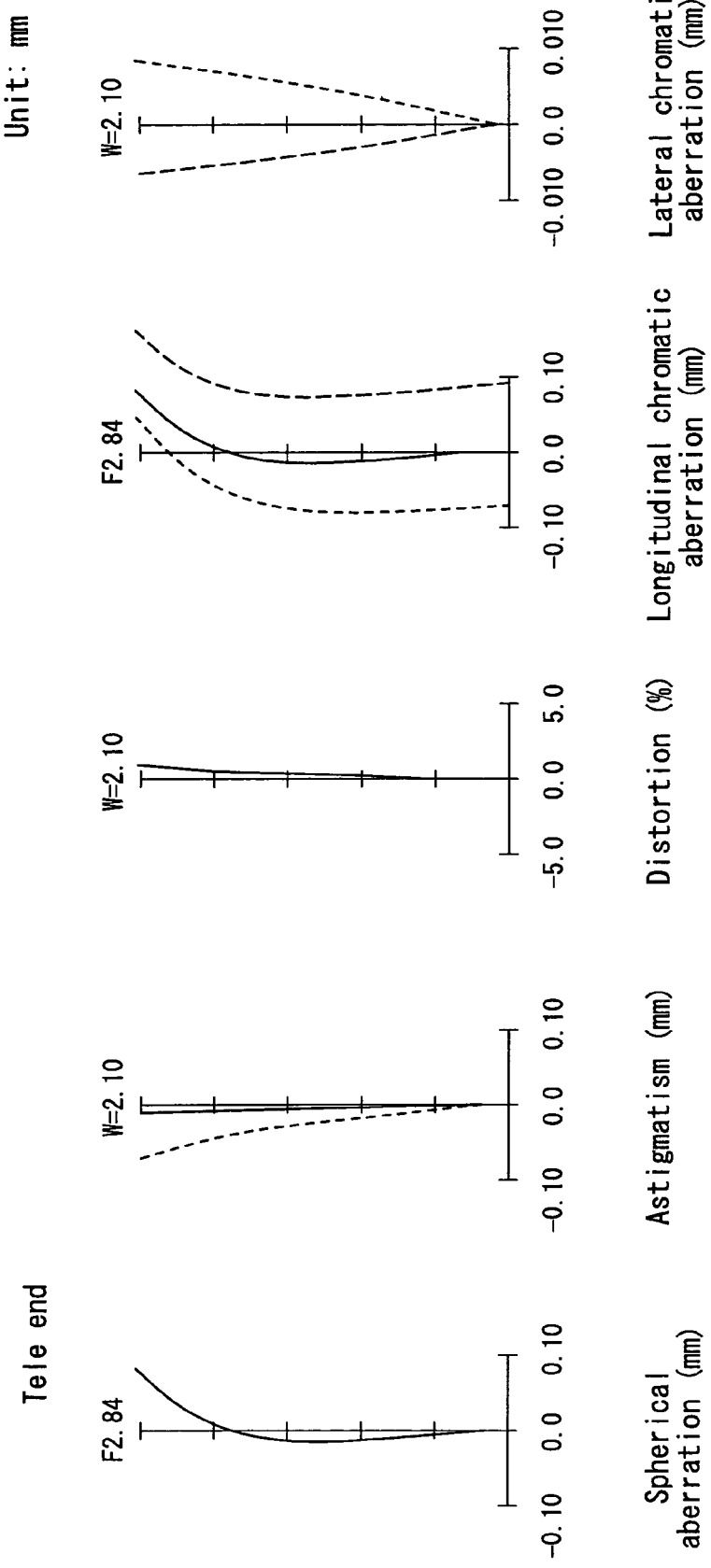

Unit: mm

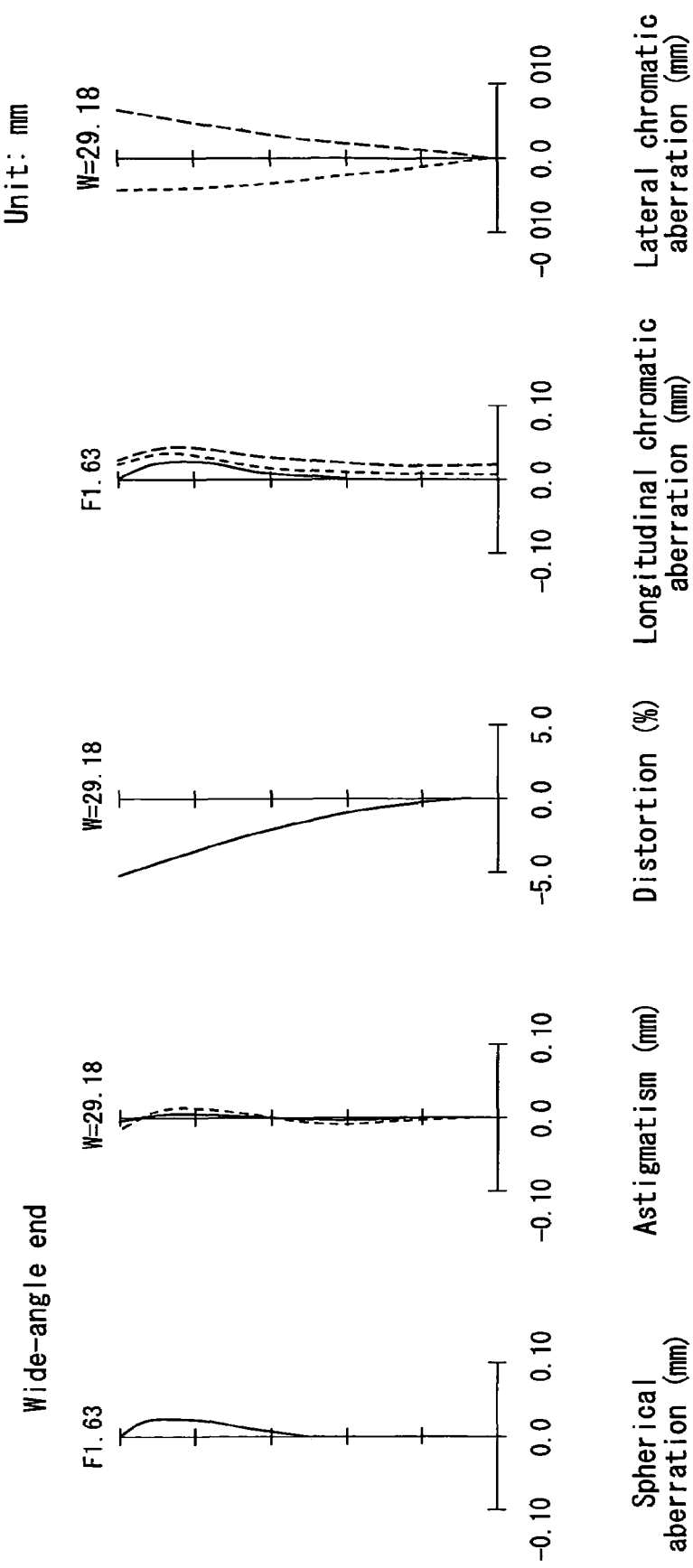

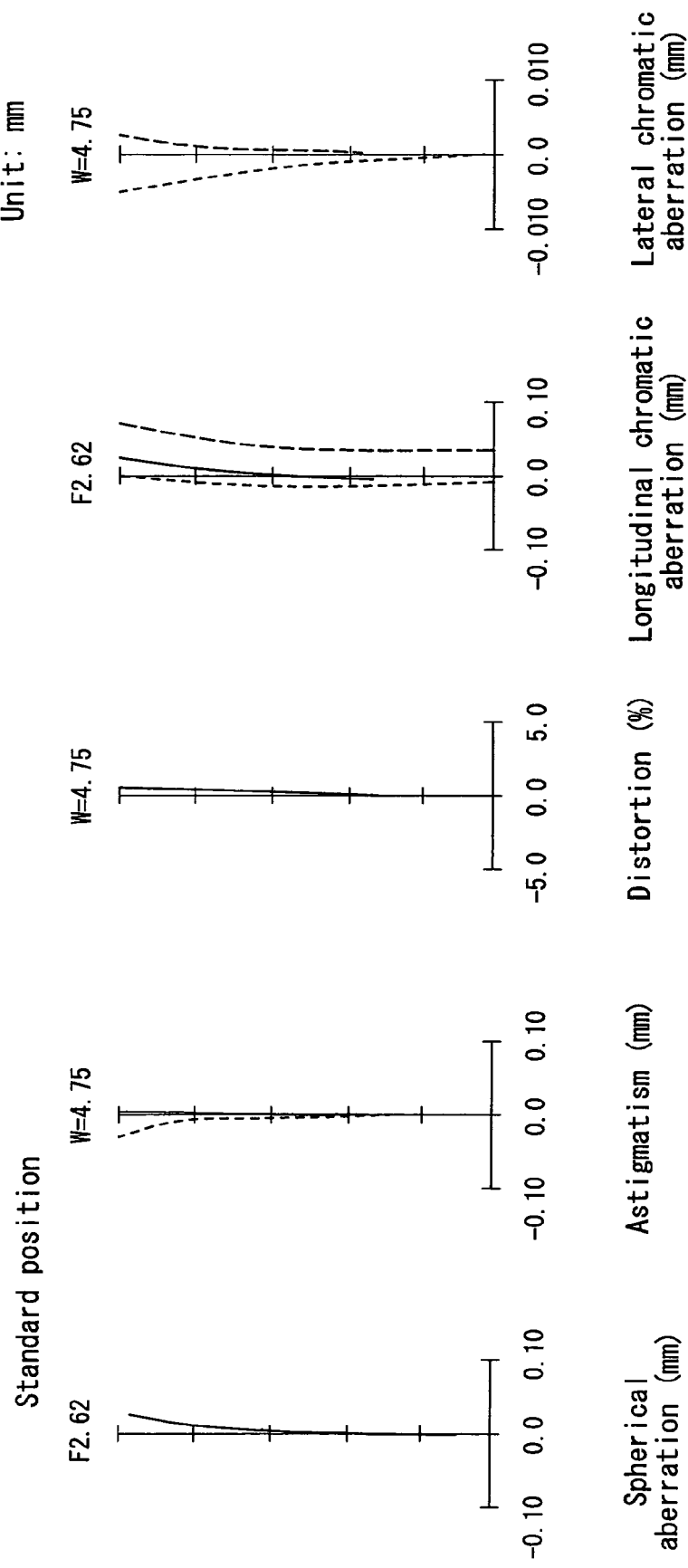

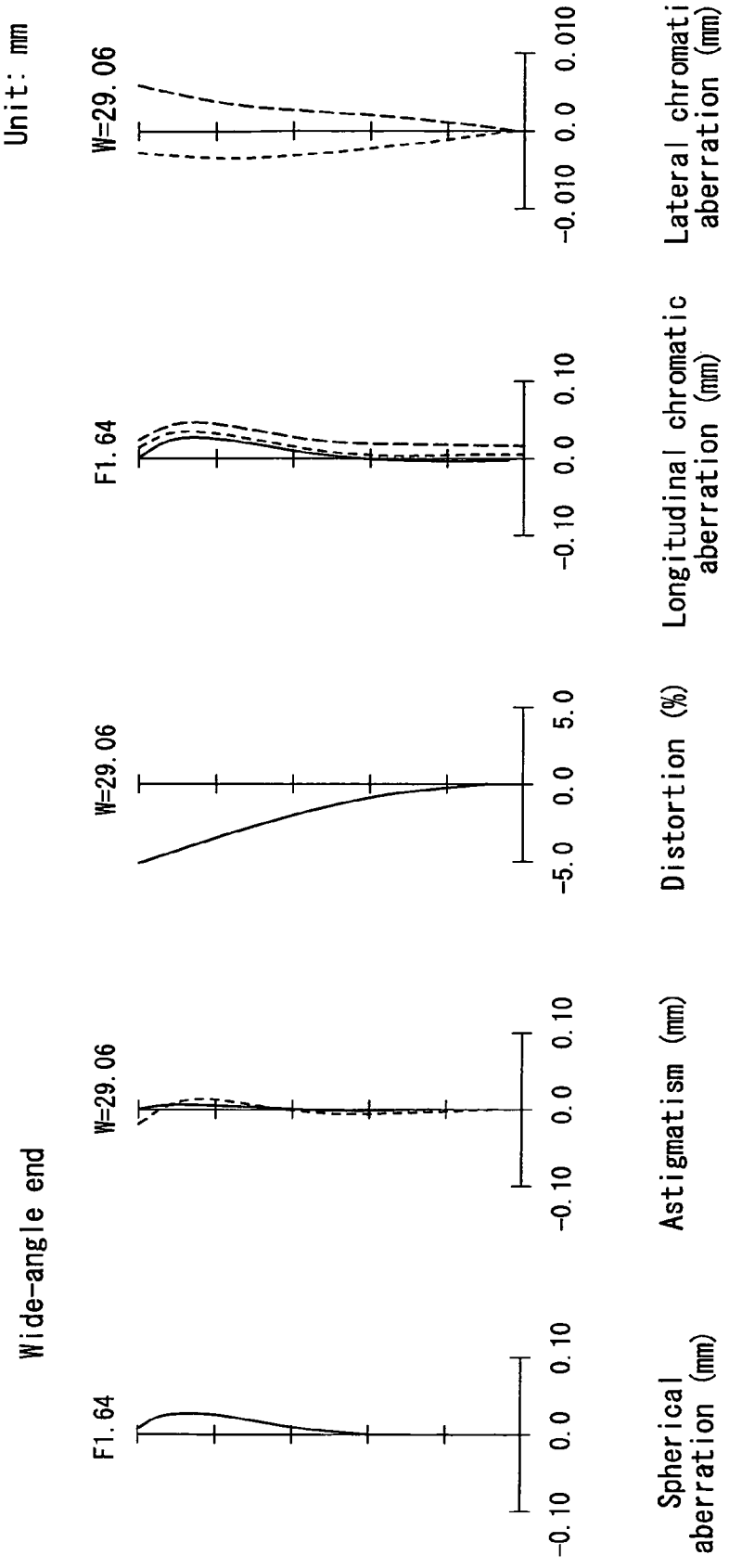

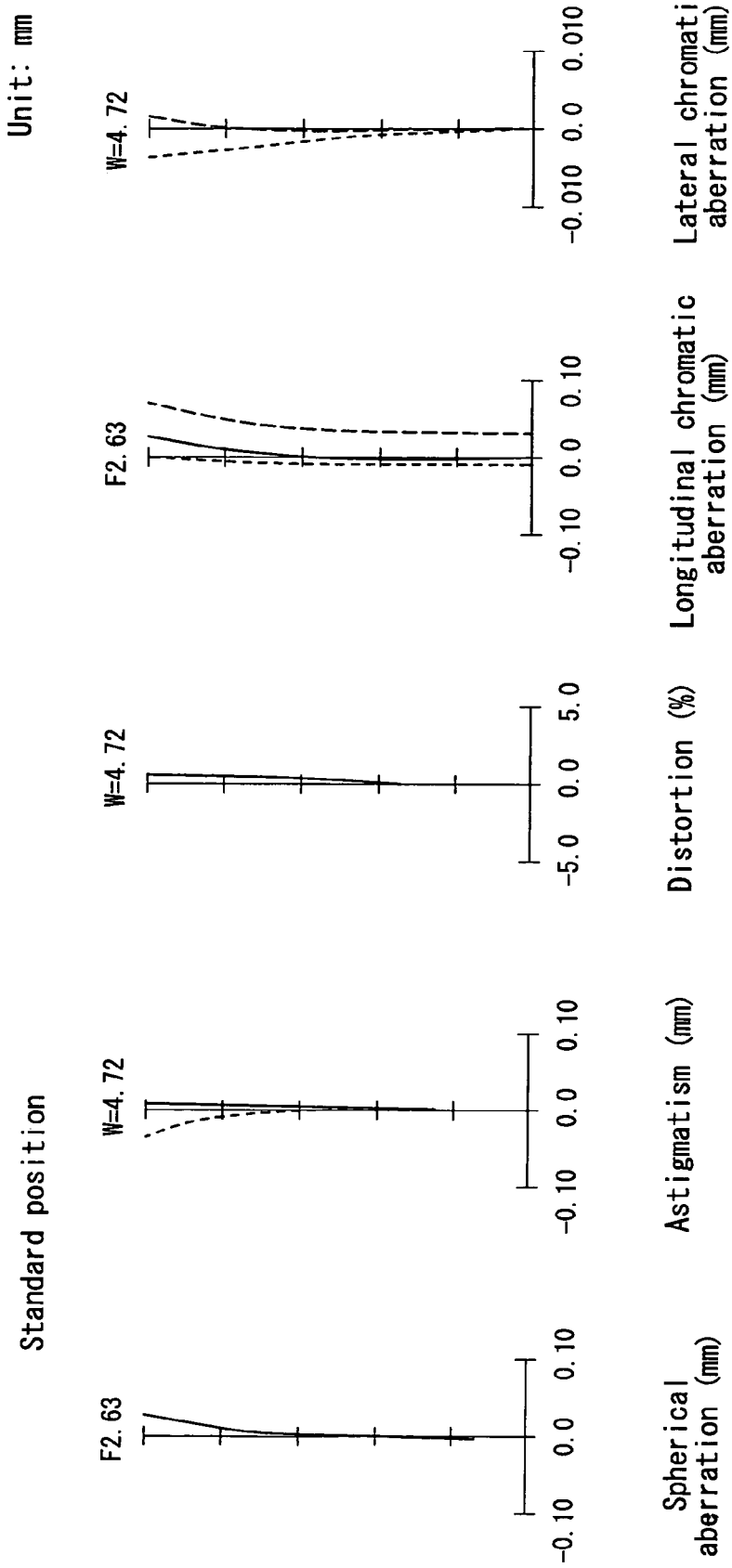

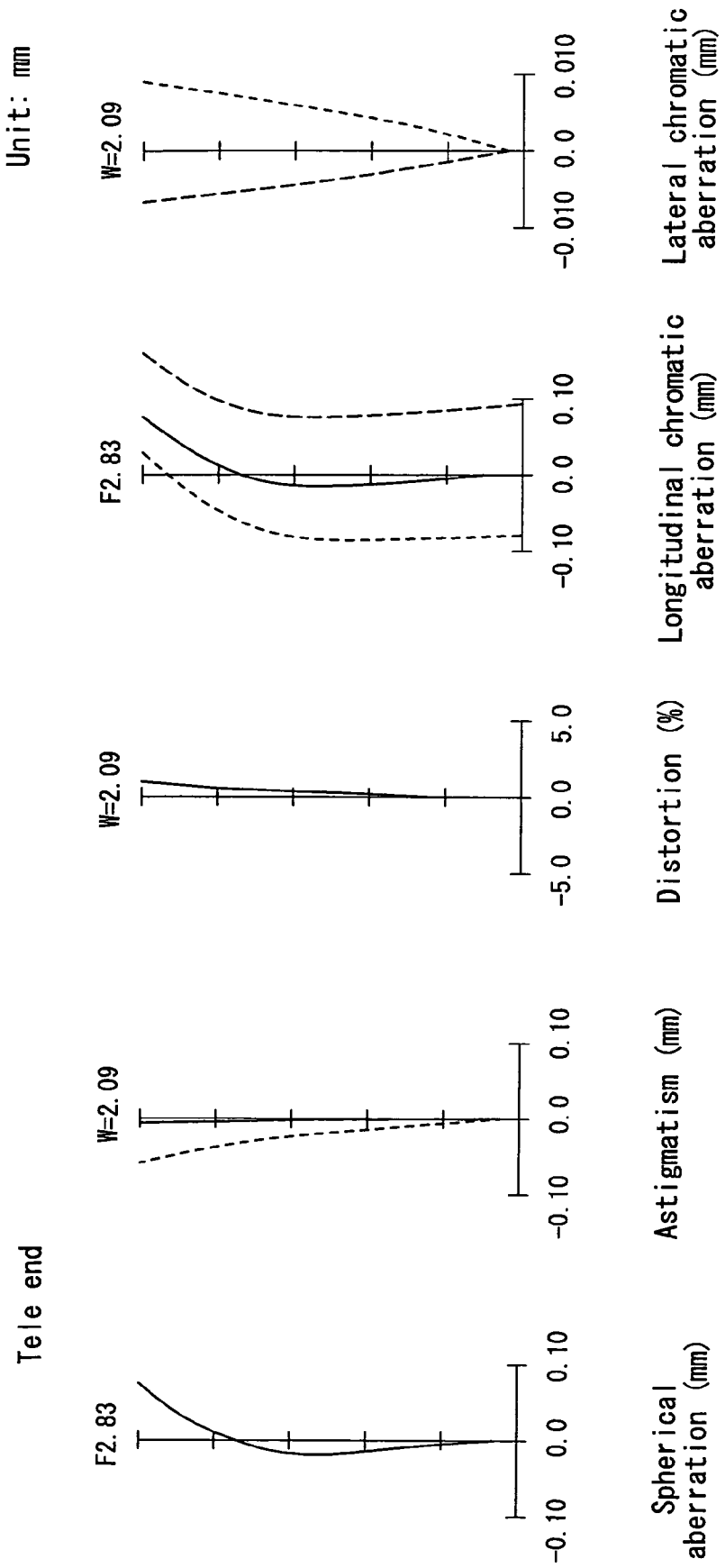

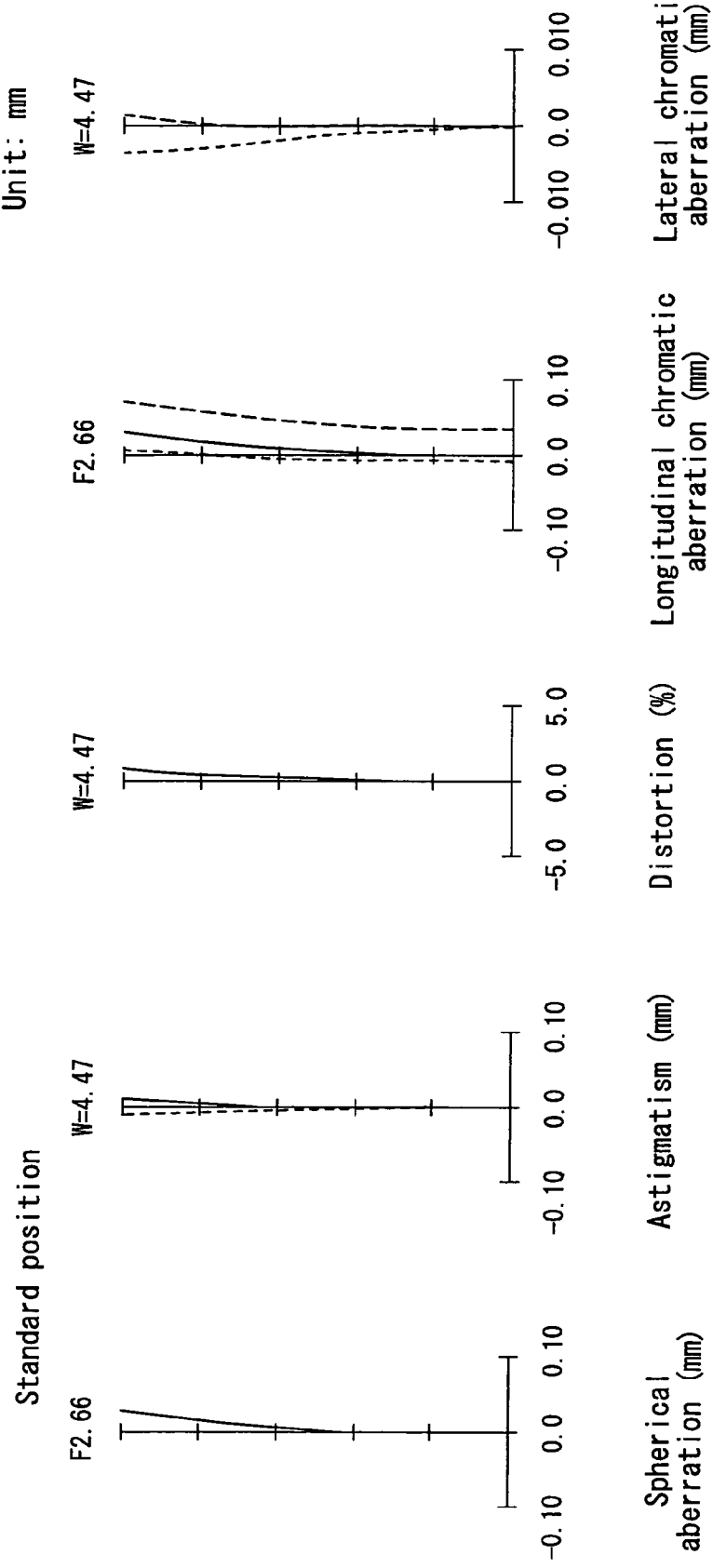

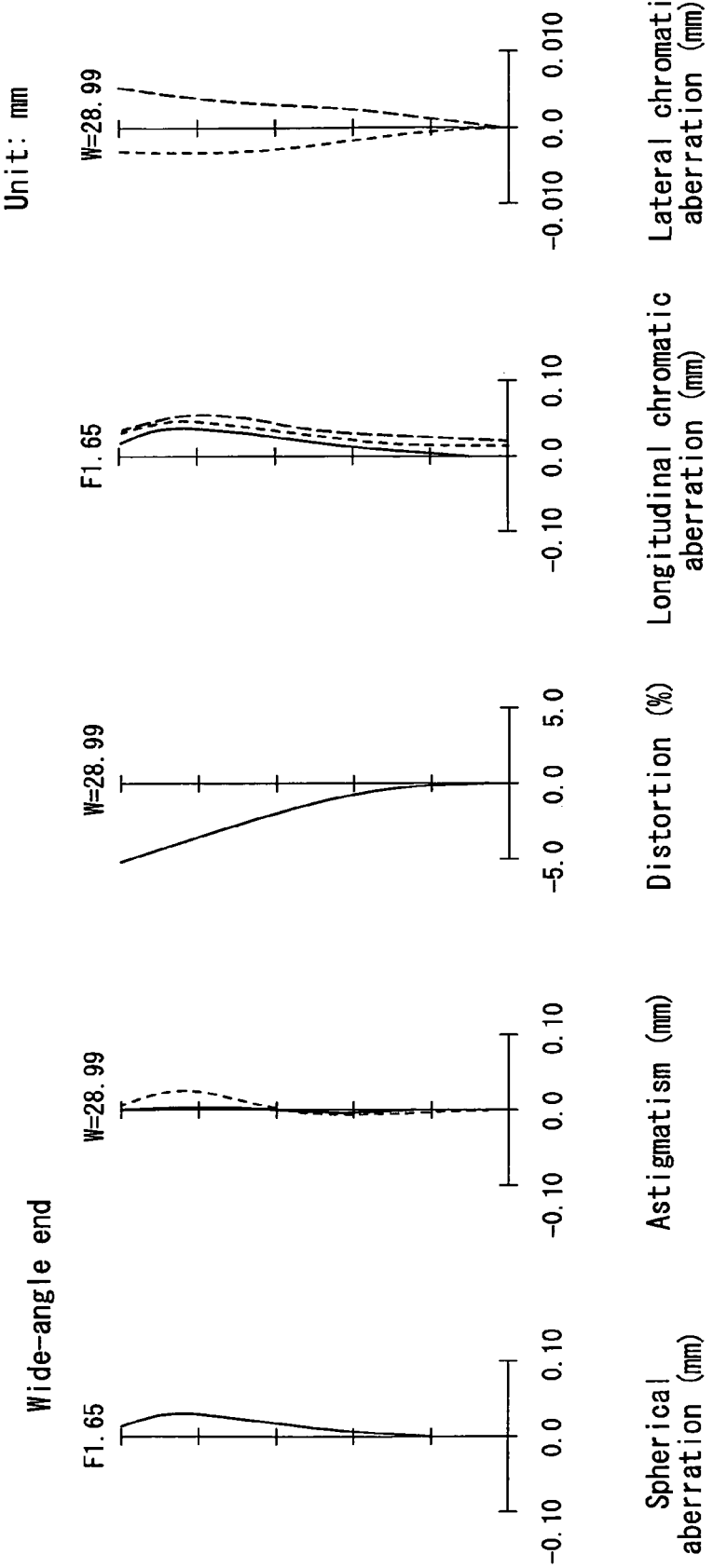

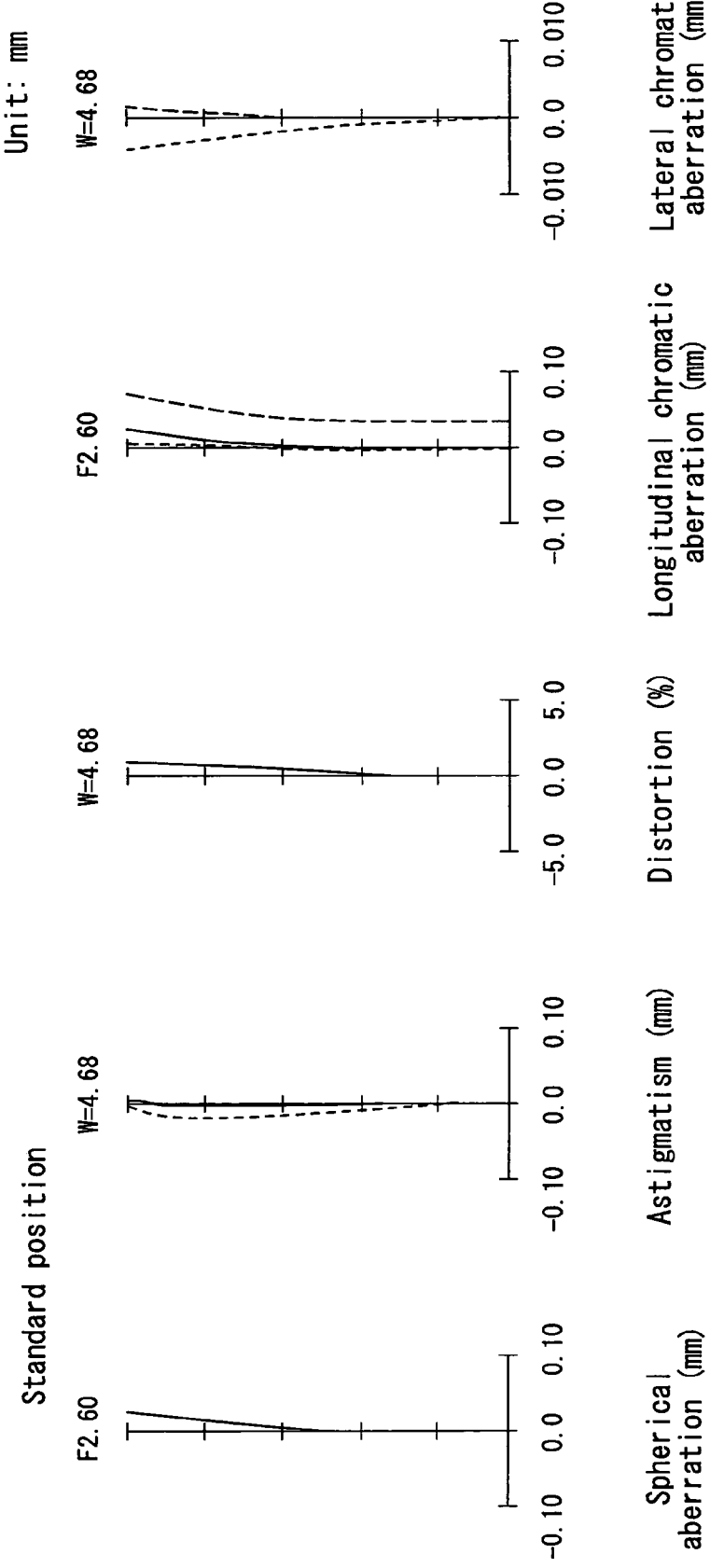

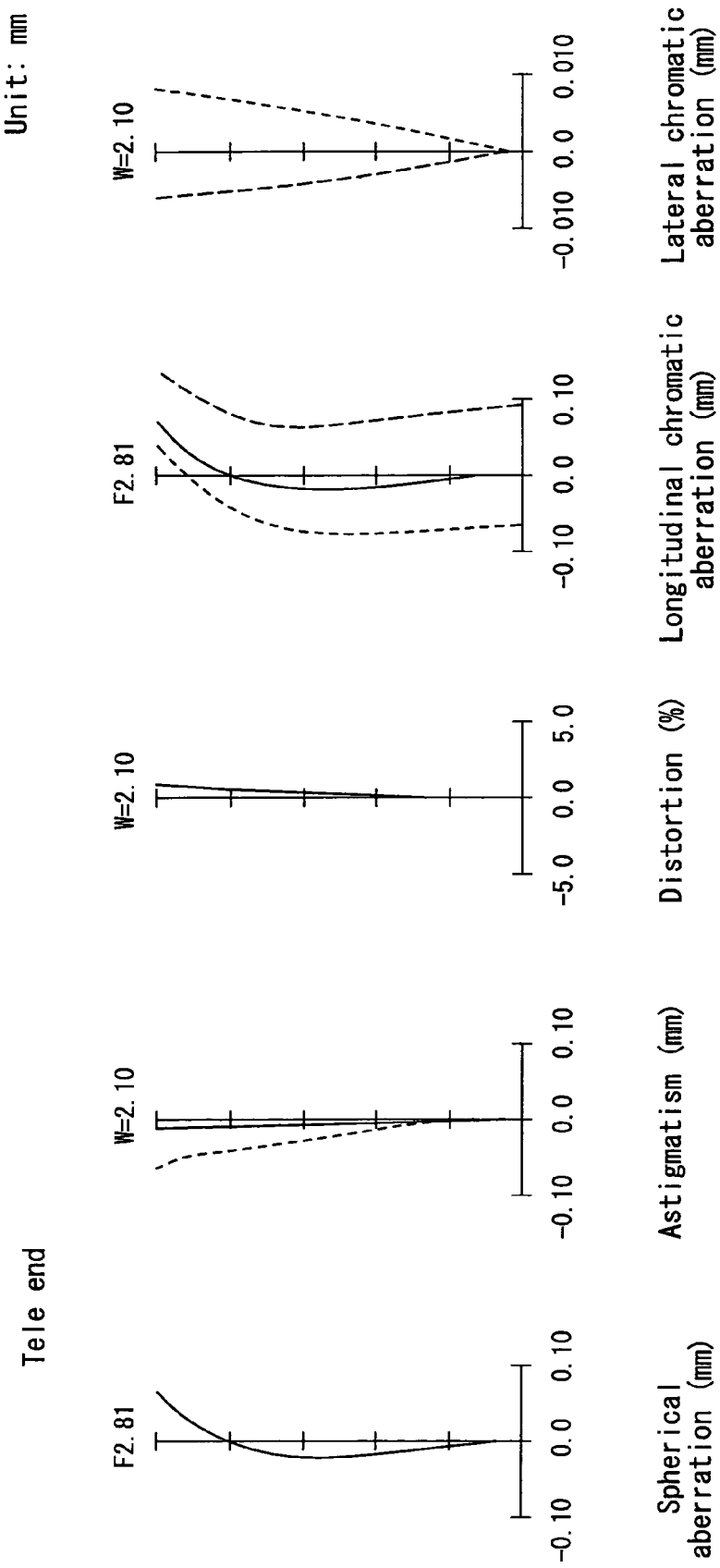

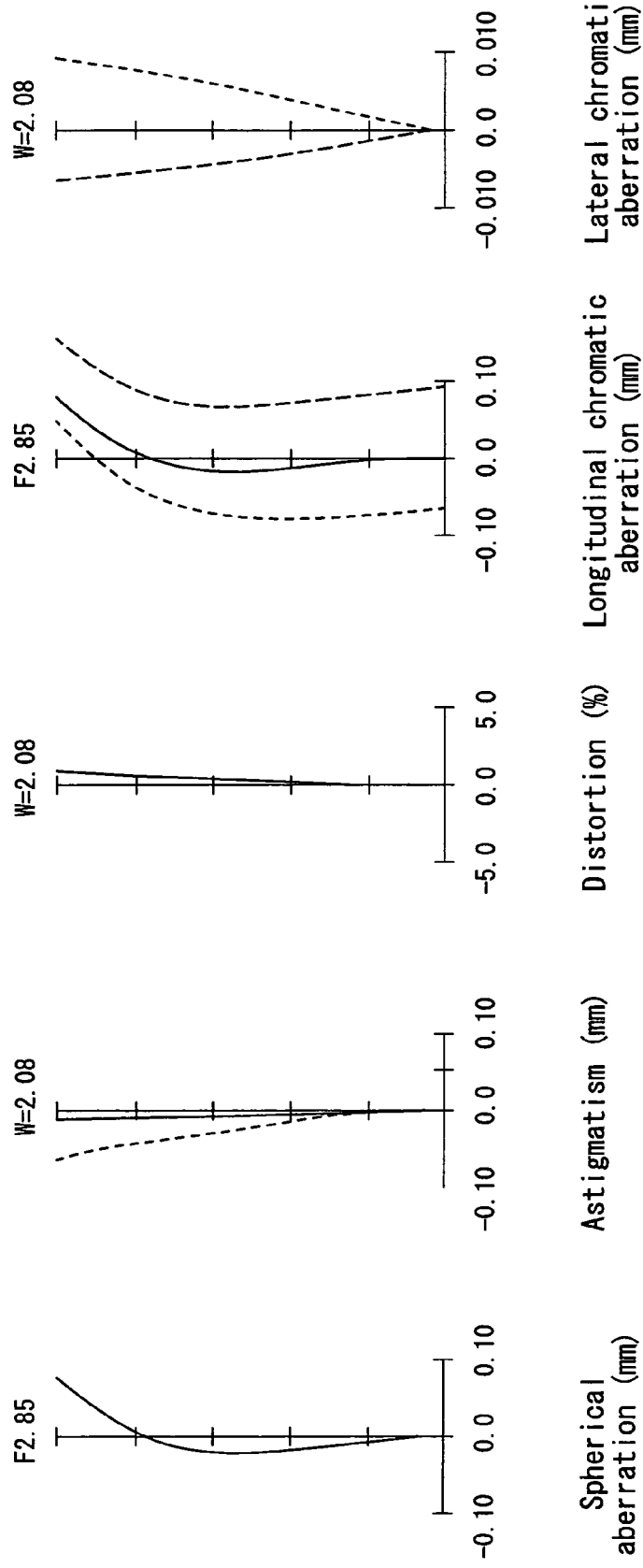

Unit: mm

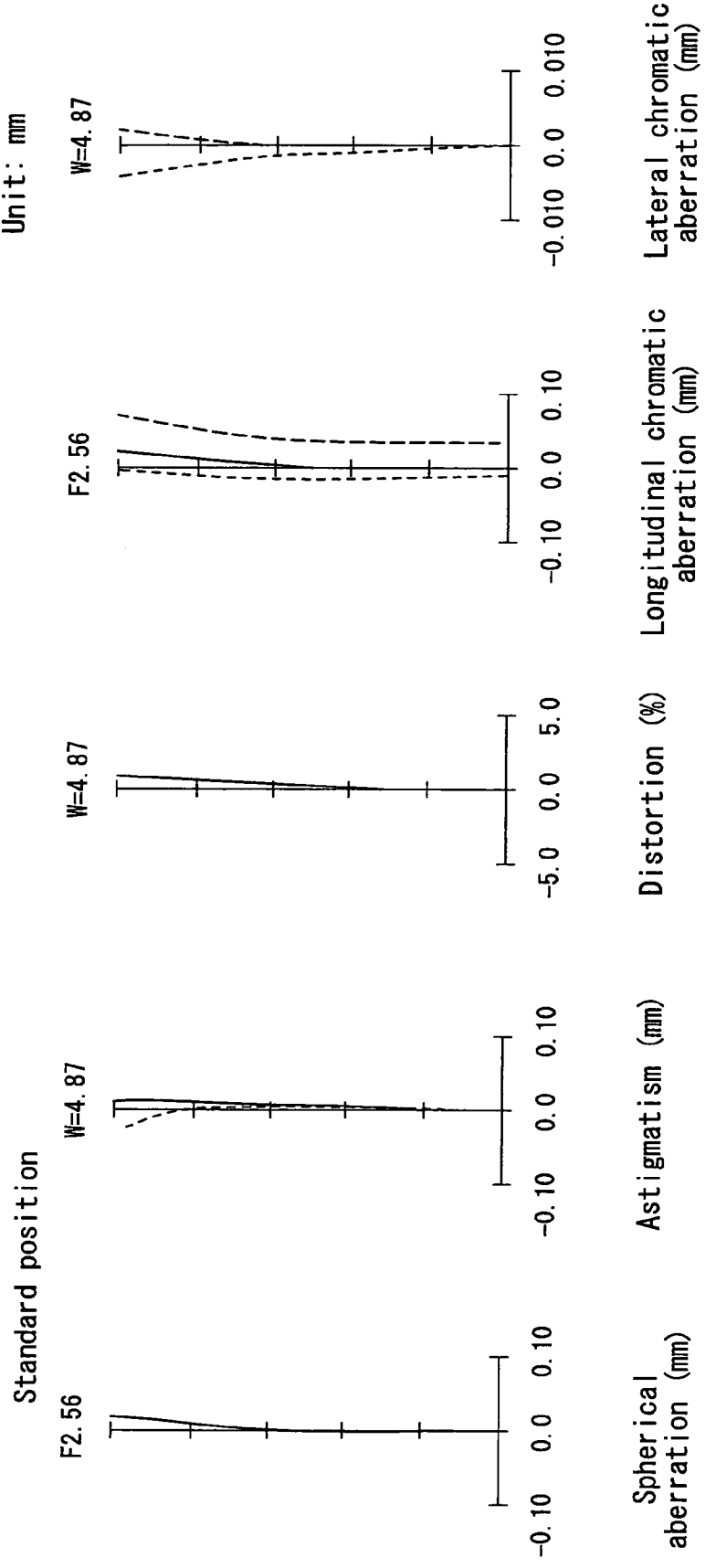

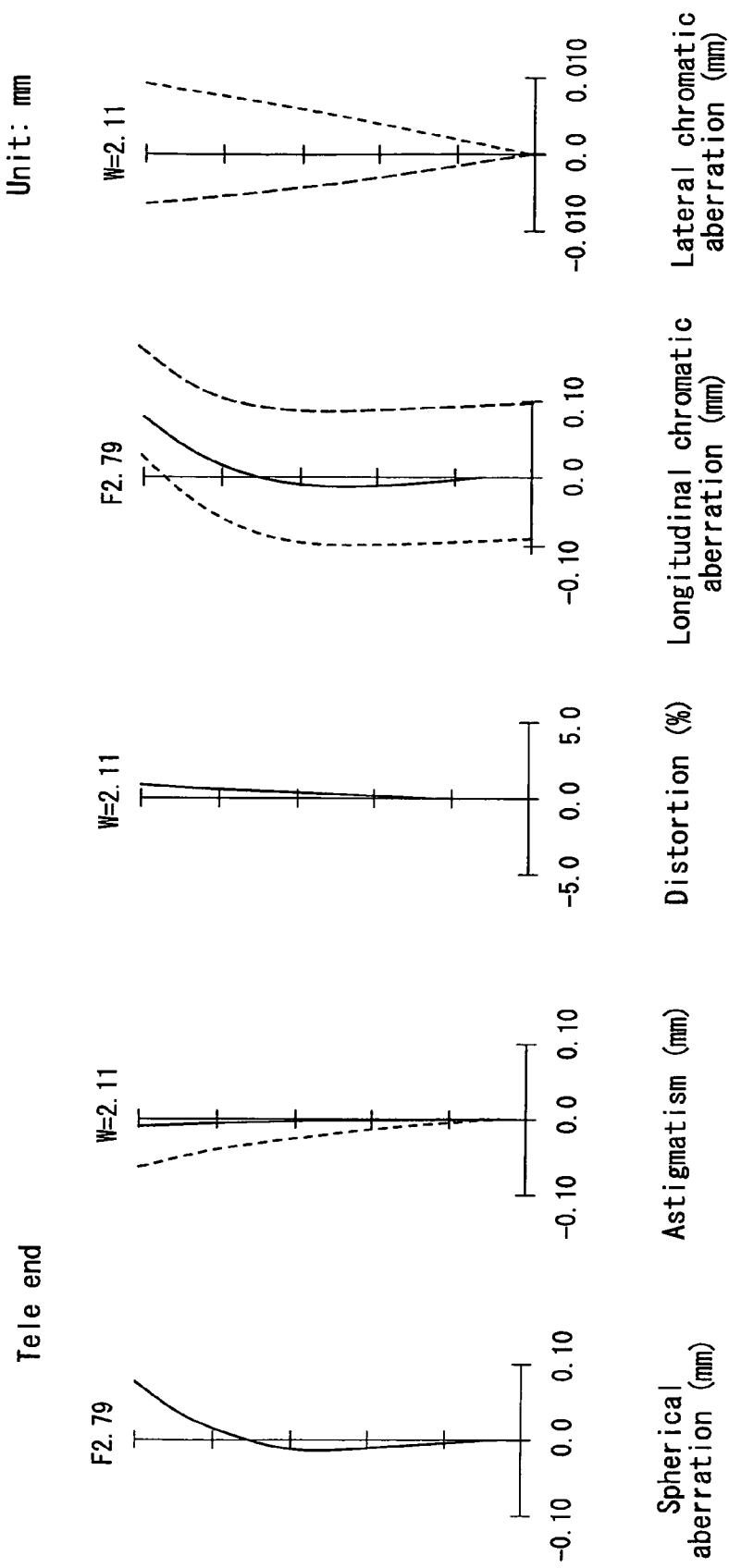

Unit: mm

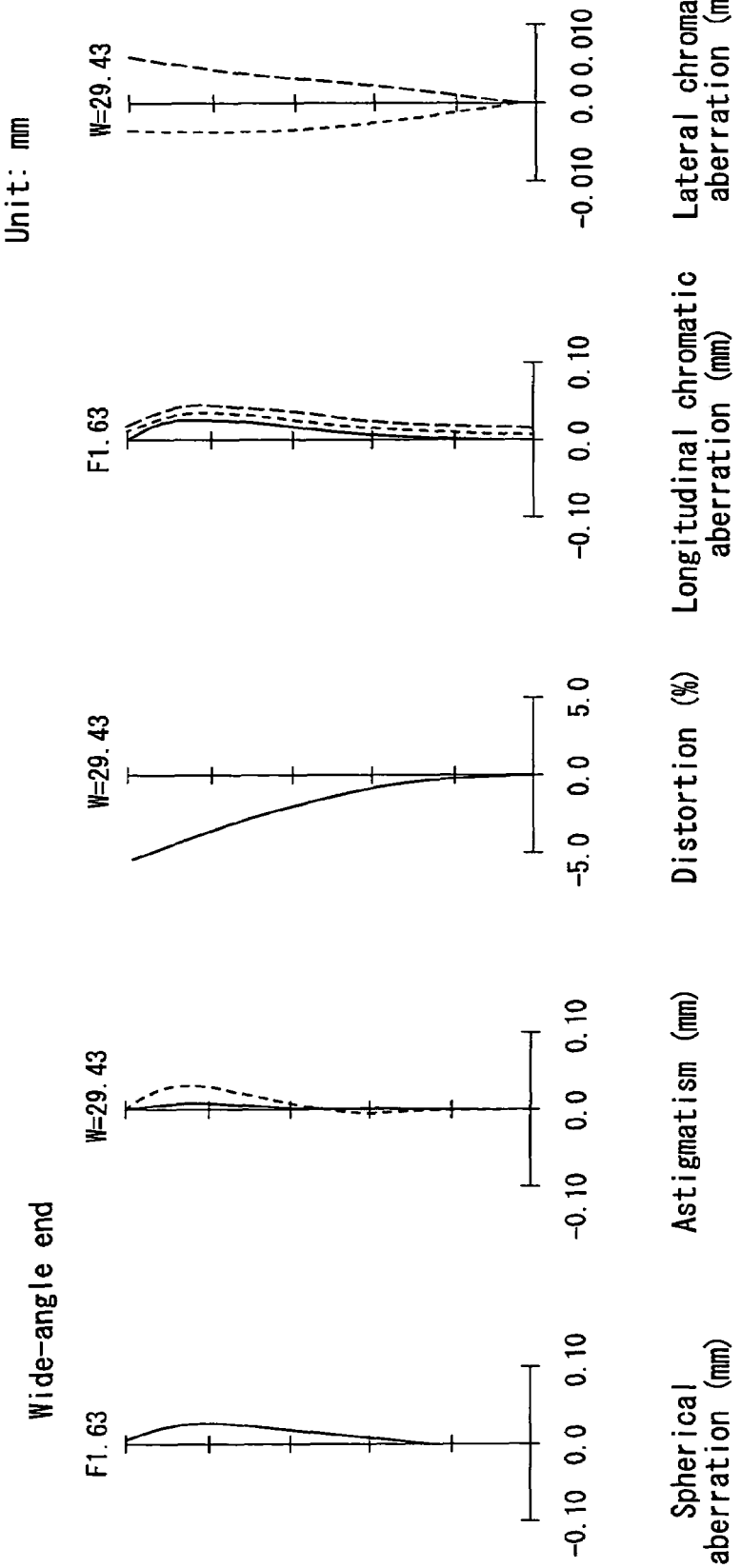

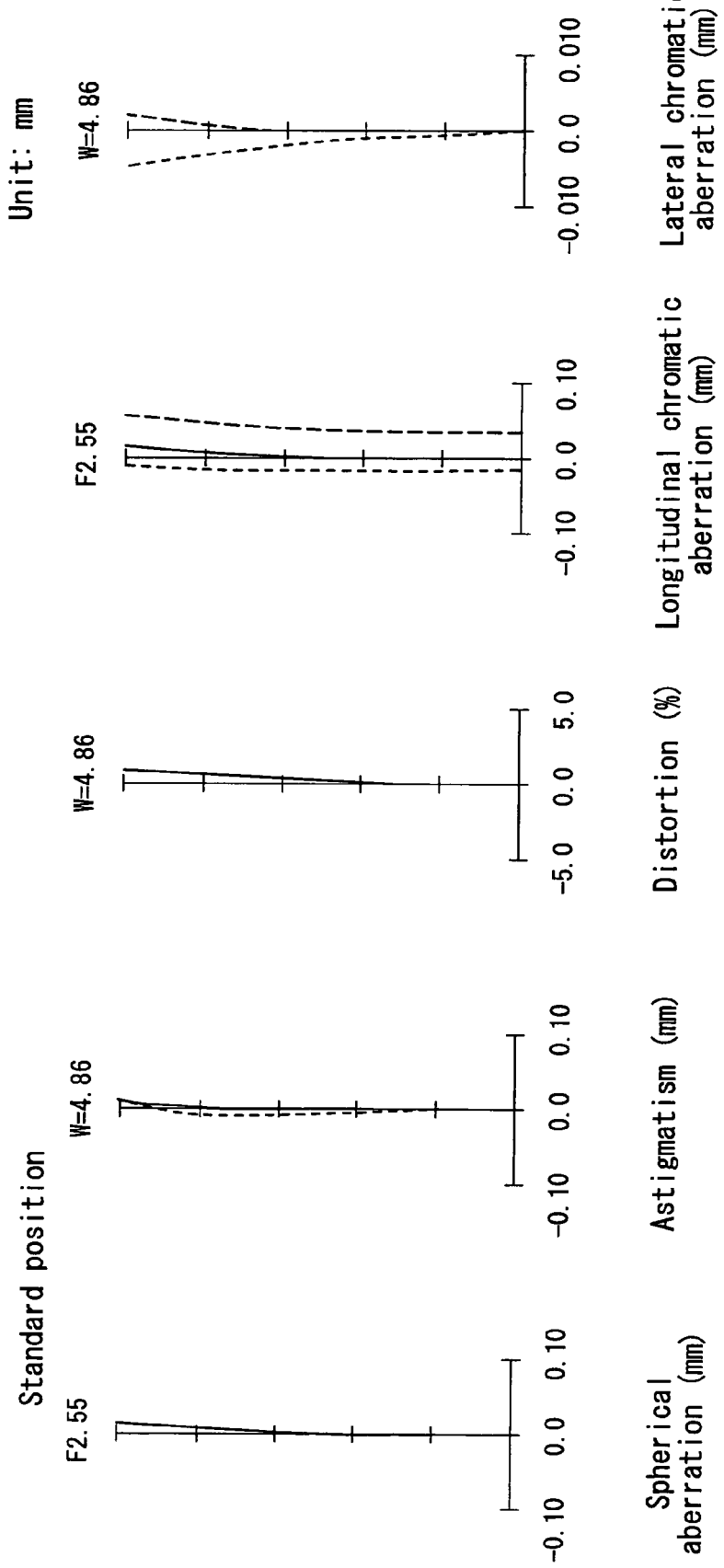

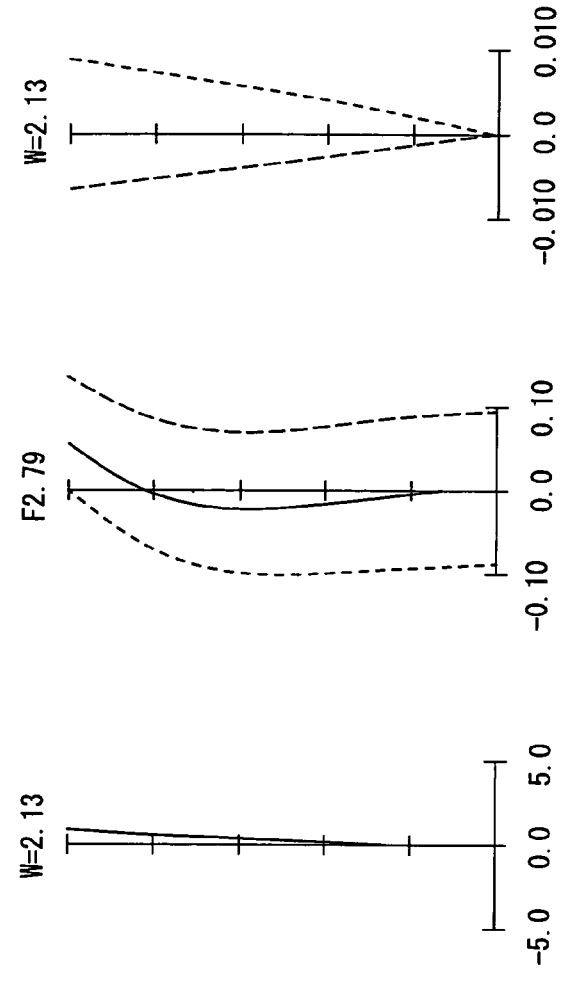
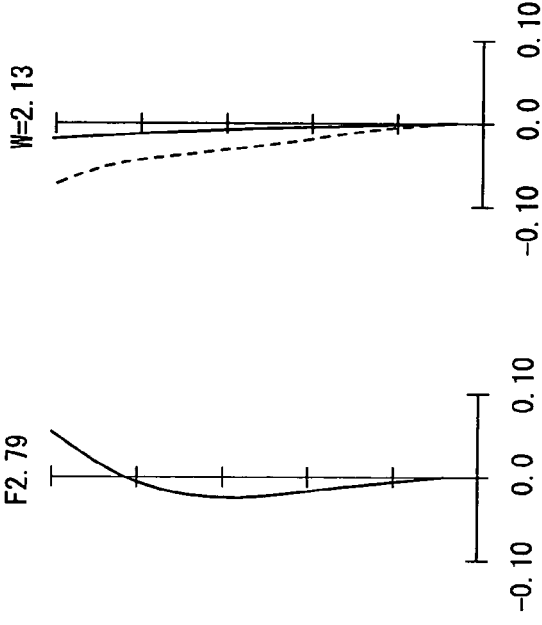
Tele end
FIG. 35A  FIG. 35B  FIG. 35C  FIG. 35D  FIG. 35E

Unit: mm

ZOOM LENS AND VIDEO CAMERA USING IT

TECHNICAL FIELD

The present invention relates to zoom lenses with high magnification and high picture quality that are used in video cameras or the like, and that are provided with a function for optically correcting image shake caused by camera shake or vibrations, and furthermore to video cameras using such zoom lenses.

BACKGROUND ART

In recent years, in imaging systems such as video cameras, an anti-shake function that prevents vibrations such as camera shake has become indispensable, and various types of anti-shake optical systems have been proposed.

For example, in the video camera disclosed in JP H8-29737A, an optical system for correcting camera shake made of two lenses is placed before a zoom lens, and image fluctuations due to camera shake are corrected by shifting one of those lenses perpendicularly with respect to the optical axis.

In the video camera disclosed in JP H7-128619A, a zoom lens of four lens groups is used, and image fluctuations due to camera shake are corrected by shifting some of the lenses of the third lens group, which is made of a plurality of lenses, perpendicularly with respect to the optical axis.

However, in the video camera disclosed in JP H8-29737A, since the optical system for correcting camera shake is placed before the zoom lens, the lens diameter of the optical system for correcting camera shake becomes large. As a consequence the video camera itself also becomes larger, and the load on the driving system becomes larger, which is disadvantageous with regard to making the video camera smaller and lighter, and reducing its power consumption.

Furthermore, in the video camera disclosed in JP H7-128619A, image fluctuations due to camera shake are corrected by shifting perpendicularly with respect to the optical axis some of the lenses of the third lens group, which is fixed with respect to the image plane, so that it is advantageous with regard to size compared to video cameras in which the optical system for correcting camera shake is placed before the zoom lens, but since the lens group for correcting camera shake is made of three lenses, the load on the actuator is large, and the zoom ratio is small, only about 1:10.

DISCLOSURE OF INVENTION

It is an object of the present invention to solve the above-described problems of the related art, and to present a zoom lens made of five lens groups with which camera shake can be corrected by shifting, perpendicularly with respect to the optical axis, a third lens group made of two lenses that are fixed with respect to the image plane when zooming and focusing, as well as to present a video camera using this zoom lens, with which smaller size and lighter weight are possible.

In order to attain this object, a first configuration of a zoom lens in accordance with the present invention includes a first lens group that is made of a cemented lens including a lens having negative refractive power and a lens having positive refractive power, as well as a lens having positive refractive power, arranged in that order from an object side to an image plane side, the first lens group having an overall positive refractive power and being fixed with respect to an image plane; a second lens group having an overall negative refractive power, a zoom operation being carried out by shifting the second lens group on an optical axis; an aperture stop that is fixed with respect to the image plane; a third lens group that is made of a lens having positive refractive power and a lens having negative refractive power, arranged in that order from the object side to the image plane side, the third lens group having an overall positive refractive power and being fixed with respect to the optical axis direction when zooming or focusing; a fourth lens group that is made of a lens having negative refractive power and a lens having positive refractive power, arranged in that order from the object side to the image plane side, the fourth lens group having an overall negative refractive power and being fixed with respect to the image plane; and a fifth lens group that has an overall positive refractive power and that is shifted on the optical axis so as to maintain the image plane, which fluctuates when the second lens group is shifted on the optical axis and when the object moves, at a certain position from a reference plane; wherein the second lens group is made of four lenses, including a negative meniscus lens, a double concave lens, and a cemented lens made of a convex lens and a concave lens, arranged in that order from the object side to the image plane side; wherein the third lens group can be shifted in a direction perpendicular to the optical axis in order to correct image fluctuations during camera shake; wherein the fourth lens group is made of a cemented lens including a convex lens and a concave lens; wherein the fifth lens group is made of three lenses, including a cemented lens made of a double convex lens and a double concave lens, and a convex lens; and wherein, when $\phi_{11}$ is the power of the lens on the object side in the cemented lens of the first lens group, $\phi_{12}$ is the power of the lens on the image plane side in the cemented lens of the first lens group, and $v_{d11}$ is the Abbe number of the lens on the object side in the cemented lens of the first lens group, $v_{d12}$ is the Abbe number of the lens on the image plane side in the cemented lens of the first lens group, then the first lens group satisfies the condition of the following Expression 22:

$$-75 < v_{d11} v_{d12} (\phi_{11} + \phi_{12}) / (\phi_{11} v_{d12} + \phi_{12} v_{d11}) < -50 \quad \text{Expression 22}$$

This Expression 22 is a condition for obtaining a favorable chromatic aberration across the entire zoom region, and expresses the compound Abbe number of the cemented lens of the first lens group. At the tele side, the aberration caused by the first lens group is magnified, so that the first lens group requires achromatization with an increase in magnification. Below the lower limit of Expression 22, the lateral chromatic aberration is incompletely compensated near the standard position and overcompensated at the tele side. Above the upper limit of Expression 22, the lateral chromatic aberration is overcompensated near the standard position and insufficiently compensated at the tele side.

In order to correct the chromatic aberration even more effectively, it is preferable that the first lens group satisfies the condition of the following Expression 23:

$$-75 < v_{d11} v_{d12} (\phi_{11} + \phi_{12}) / (\phi_{11} v_{d12} + \phi_{12} v_{d11}) < -65 \quad \text{Expression 23}$$

In the first configuration of the zoom lens of the present invention, when in the cemented lens of the fifth lens group, $r_{51}$ is the radius of curvature of a surface furthest toward the object side, $n_{d51}$ is the refractive index of the lens on the object side, $r_{52}$ is the radius of curvature of a surface furthest to the image plane side, and $n_{d52}$ is the refractive index of the lens on the image plane side, then it is preferable that the condition of the following Expression 24 is satisfied:

$$0.85 < (n_{dS1}-1)r_{S2}/(n_{dS2}-1)r_{S1} < 1.2. \qquad \text{Expression 24}$$

Expression 24 indicates the relationship between the refractive power of the surface on the object side and the refractive power of the surface on the image plane side in the cemented lens of the fifth lens group 15. Above the upper limit of Expression 24, the coma aberration becomes large, and also the fluctuations in the aberration depending on the zoom position become large. Below the lower limit in Expression 24, it becomes difficult to make the zoom lens more compact.

In the cemented lens of the fifth lens group of the first configuration of the zoom lens of the present invention, when $\phi_{51}$ is the power of the lens on the object side, $\phi_{52}$ is the power of the lens on the image plane side, $\nu_{d51}$ is the Abbe number of the lens on the object side, and $\nu_{d52}$ is the Abbe number of the lens on the image plane side, then it is preferable that the condition of the following Expression 25 is satisfied:

$$2.0 < \nu_{d51}\nu_{d52}(\phi_{51}+\phi_{52})/(\phi_{51}\nu_{d52}+\phi_{52}\nu_{d51}) < 8.0. \qquad \text{Expression 25}$$

The fifth lens group shifts when zooming or focusing. At this time, the above Expression 25 needs to be satisfied in order to suppress fluctuations in chromatic aberration. Even when an optimum chromatic aberration can be ensured at the standard position, above the upper limit in Expression 25, the g-line is overcompensated when zooming to the tele side, and below the lower limit in Expression 25, it is not sufficiently compensated.

A second configuration of a zoom lens in accordance with the present invention includes a first lens group that is made of a cemented lens including a lens having negative refractive power and a lens having positive refractive power, and a lens having positive refractive power, arranged in that order from an object side to an image plane side, the first lens group having an overall positive refractive power and being fixed with respect to an image plane; a second lens group having an overall negative refractive power, a zoom operation being carried out by shifting the second lens group on an optical axis; an aperture stop that is fixed with respect to the image plane; a third lens group that is made of a lens having positive refractive power and a lens having negative refractive power, arranged in that order from the object side to the image plane side, the third lens group having an overall positive refractive power and being fixed with respect to the optical axis direction when zooming or focusing; a fourth lens group that is made of a lens having negative refractive power and a lens having positive refractive power, arranged in that order from the object side to the image plane side, and a fifth lens group that has an overall positive refractive power and that is shifted on the optical axis so as to maintain the image plane, which fluctuates when the second lens group is shifted on the optical axis and when the object moves, at a certain position from a reference plane; wherein the second lens group is made of four lenses, including a negative meniscus lens, a double concave lens, and a cemented lens made of a convex lens and a concave lens, arranged in that order from the object side to the image plane side; wherein the third lens group can be shifted in a direction perpendicular to the optical axis in order to correct image fluctuations during camera shake; wherein the fourth lens group is made of a cemented lens including a convex lens and a concave lens; wherein the fifth lens group is made of four lenses, including a cemented lens triplet made of a double convex lens, a double concave lens and a double convex lens, as well as a convex lens; and wherein, when $\phi_{11}$ is the power of the lens on the object side in the cemented lens of the first lens group, $\phi_{12}$ is the power of the lens on the image plane side in the cemented lens of the first lens group, $\nu_{d11}$ is the Abbe number of the lens on the object side in the cemented lens of the first lens group, and $\nu_{d12}$ is the Abbe number of the lens on the image plane side in the cemented lens of the first lens group, then the first lens group satisfies the condition of the following Expression 26:

$$-75 < \nu_{d11}\nu_{d12}(\phi_{11}+\phi_{12})/(\phi_{11}\nu_{d12}+\phi_{12}\nu_{d11}) < -50 \qquad \text{Expression 26}$$

This Expression 26 is a condition for obtaining a favorable chromatic aberration across the entire zoom region, and expresses the compound Abbe number of the cemented lens of the first lens group. At the tele side, the aberration caused by the first lens group is magnified, so that the first lens group requires achromatization with an increase in magnification. Below the lower limit of Expression 26, the lateral chromatic aberration is incompletely compensated near the standard position and overcompensated at the tele side. Above the upper limit of Expression 26, the lateral chromatic aberration is overcompensated near the standard position and insufficiently compensated at the tele side. Furthermore, by making the fifth lens group of four lenses, the power of the lens surfaces of the fifth lens group can be weakened, which is advantageous for correcting aberrations, and makes it possible in particular to reduce the astigmatism that occurs when correcting camera shake.

In order to correct the chromatic aberration even more effectively, it is preferable that the first lens group satisfies the condition of the following Expression 27:

$$-75 < \nu_{d11}\nu_{d12}(\phi_{11}+\phi_{12})/(\phi_{11}\nu_{d12}+\phi_{12}\nu_{d11}) < -65. \qquad \text{Expression 27}$$

In the second configuration of the zoom lens of the present invention, it is preferable that at least three surfaces of the cemented lens triplet of the fifth lens group have the same radius of curvature. With this preferable configuration, centering when cementing the lenses becomes easy, and the task of discriminating lens surfaces can be omitted.

A third configuration of a zoom lens in accordance with the present invention includes a first lens group that is made of a lens having negative refractive power, a lens having positive refractive power, and a lens having positive refractive power, arranged in that order from an object side to an image plane side, the first lens group having an overall positive refractive power and being fixed with respect to an image plane; a second lens group having an overall negative refractive power, a zoom operation being carried out by shifting the second lens group on an optical axis; an aperture stop that is fixed with respect to the image plane; a third lens group that is made of a lens having positive refractive power and a lens having negative refractive power, arranged in that order from the object side to the image plane side, the third lens group having an overall positive refractive power and being fixed with respect to the optical axis direction when zooming or focusing; a fourth lens group that is made of a lens having negative refractive power and a lens having positive refractive power, arranged in that order from the object side to the image plane side, the fourth lens group having an overall negative refractive power and being fixed with respect to the image plane; and a fifth lens group that has an overall positive refractive power and that is shifted on the optical axis so as to maintain the image plane, which fluctuates when the second lens group is shifted on the optical axis and when the object moves, at a certain position from a reference plane; wherein the second lens group is made of four lenses, including a negative meniscus lens, a double concave lens, and a cemented lens made of a convex lens and a concave lens, arranged in that order from the object side to the image plane side; wherein the third lens group can be shifted in a direction perpendicular to the optical axis in order to correct image fluctuations during camera shake; wherein the fourth lens group is made of two single lenses, including a convex lens and a concave lens; wherein the fifth lens group is made of three lenses; and wherein, when $\phi_{11}$ is the power of the lens on the object side in the cemented lens of the first lens group, $\phi_{12}$ is the power of the lens on the image plane side in the cemented lens of the first lens group, $\nu_{d11}$ is the Abbe number of the lens on the object side in the cemented lens of the first lens group, and $\nu_{d12}$ is the Abbe number of the lens on the image plane side in the cemented lens of the first lens group, then the first lens group satisfies the condition of the following Expression 28:

$$-75 < \nu_{d11}\nu_{d12}(\phi_{11}+\phi_{12})/(\phi_{11}\nu_{d12}+\phi_{12}\nu_{d11}) < -50. \quad \text{Expression 28}$$

Making the fourth lens group of single lenses increases the design parameters, so that it becomes possible to improve the performance.

In order to correct the chromatic aberration even more effectively, it is preferable that the first lens group satisfies the condition of the following Expression 29:

$$-75 < \nu_{d11}\nu_{d12}(\phi_{11}+\phi_{12})/(\phi_{11}\nu_{d12}+\phi_{12}\nu_{d11}) < -65. \quad \text{Expression 29}$$

A fourth configuration of a zoom lens in accordance with the present invention includes a first lens group that is made of a lens having negative refractive power, a lens having positive refractive power, and a lens having positive refractive power, arranged in that order from an object side to an image plane side, the first lens group having an overall positive refractive power and being fixed with respect to an image plane; a second lens group having an overall negative refractive power, a zoom operation being carried out by shifting the second lens group on an optical axis; an aperture stop that is fixed with respect to the image plane; a third lens group that is made of a lens having positive refractive power and a lens having negative refractive power, arranged in that order from the object side to the image plane side, the third lens group having an overall positive refractive power and being fixed with respect to the optical axis direction when zooming or focusing; a fourth lens group that is made of a lens having negative refractive power and a lens having positive refractive power, arranged in that order from the object side to the image plane side, the fourth lens group having an overall negative refractive power and being fixed with respect to the image plane; and a fifth lens group that has an overall positive refractive power and that is shifted on the optical axis so as to maintain the image plane, which fluctuates when the second lens group is shifted on the optical axis and when the object moves, at a certain position from a reference plane; wherein the second lens group is made of four lenses, including a negative meniscus lens, a double concave lens, and a cemented lens made of a convex lens and a concave lens, arranged in that order from the object side to the image plane side; wherein the third lens group can be shifted in a direction perpendicular to the optical axis in order to correct image fluctuations during camera shake; wherein the fourth lens group is made of two single lenses, including a convex lens and a concave lens; wherein the fifth lens group is made of four lenses; and wherein, when $\phi_{11}$ is the power of the lens on the object side in the cemented lens of the first lens group, $\phi_{12}$ is the power of the lens on the image plane side in the cemented lens of the first lens group, $\nu_{d11}$ is the Abbe number of the lens on the object side in the cemented lens of the first lens group, and $\nu_{d12}$ is the Abbe number of the lens on the image plane side in the cemented lens of the first lens group, then the first lens group satisfies the condition of the following Expression 30:

$$-75 < \nu_{d11}\nu_{d12}(\phi_{11}+\phi_{12})/(\phi_{11}\nu_{d12}+\phi_{12}\nu_{d11}) < -50. \quad \text{Expression 30}$$

Making the fourth lens group of single lenses increases the design parameters, so that it becomes possible to improve the performance.

In order to correct the chromatic aberration even more effectively, it is preferable that the first lens group satisfies the condition of the following Expression 31:

$$-75 < \nu_{d11}\nu_{d12}(\phi_{11}+\phi_{12})/(\phi_{11}\nu_{d12}+\phi_{12}\nu_{d11}) < -65. \quad \text{Expression 31}$$

By making the fifth lens group of four lenses, the power of the lens surfaces of the fifth lens group can be weakened, which is advantageous for correcting aberrations, and makes it possible in particular to reduce the astigmatism that occurs when correcting camera shake.

In the first to fourth configurations of the zoom lens according to the present invention, when $dP_{g,F}$, $dP_{g,d}$, and $dP_{c,A}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{c,A12}$ are anomalous dispersion factors of the second lens of the first lens group counting from the object side, then it is preferable that the conditions of the following Expressions 32 to 34 are satisfied:

$$0.014 < dP_{g,F12} < 0.039 \quad \text{Expression 32}$$

$$0.020 < dP_{g,d12} < 0.057 \quad \text{Expression 33}$$

$$-0.031 < dP_{c,A'12} < -0.02. \quad \text{Expression 34}$$

Here, two types of standard optical glass were selected, namely 511605 ($n_d$=1.5112, $\nu_d$=60.49) and 620363 ($n_d$=1.62004, $\nu_d$=36.30), the straight line connecting the two points representing the two kinds of glasses in a graph with the partial dispersion ratio on the vertical axis and the Abbe number on the horizontal axis is taken as a reference line, and the difference between the partial dispersion ratio for the respective kind of glass and the partial dispersion ratio on the reference line corresponding to the Abbe number of that glass is taken as $dP_{x,y}$.

The above-noted Expressions 32 to 34 are necessary conditions for correcting chromatic aberration at short wavelengths and long wavelengths at the same time. In order to correct chromatic aberration at two or more wavelengths, a material with high anomalous dispersion is required. Expressions 32 to 34 indicate the anomalous dispersion from short wavelengths to long wavelengths, and it is possible to correct chromatic aberration at two or more wavelengths favorably by using a material that simultaneously fulfills the Expressions 32 to 34.

Furthermore, to correct chromatic aberration even more effectively, it is preferable that the conditions of the following Expressions 35 to 37 are satisfied:

$$0.036 < dP_{g,F12} < 0.039 \quad \text{Expression 35}$$

$$0.045 < dP_{g,d12} < 0.057 \quad \text{Expression 36}$$

$$-0.031 < dP_{c,A'12} < -0.024. \quad \text{Expression 37}$$

In the first to fourth configurations of the zoom lens of the present invention, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F11}$, $dP_{g,d11}$, and $dP_{C,A'11}$ are anomalous dispersion factors of the first lens of the first lens group counting from the object side, and $dP_{g,F12}$, $dP_{g,d12}$, and $dP_{C,A'12}$ are anomalous dispersion factors of the second lens of the first lens group counting from the object side, then it is preferable that the conditions of the following Expressions 38 to 40 are satisfied:

$$-0.006 < dP_{g,F11} - dP_{g,F12} < 0.019 \qquad \text{Expression 38}$$

$$0.002 < dP_{g,d11} - dP_{g,d12} < 0.035 \qquad \text{Expression 39}$$

$$-0.027 < dP_{C,A'11} - dP_{C,A'12} < -0.016. \qquad \text{Expression 40}$$

These Expressions 38 to 40 are conditions for a lens having negative refractive power and a lens having positive refractive power correcting chromatic aberration for at least two wavelengths. It is possible to correct chromatic aberration at two or more wavelengths favorably by combining lens materials such that the difference in anomalous dispersion factors of the individual lenses satisfies the Expressions 38 to 40.

Furthermore, to correct chromatic aberration even more effectively, it is preferable that the conditions of the following Expressions 41 to 43 are satisfied:

$$0.017 < dP_{g,F11} - dP_{g,F12} < 0.019 \qquad \text{Expression 41}$$

$$0.025 < dP_{g,d11} - dP_{g,d12} < 0.035 \qquad \text{Expression 42}$$

$$-0.027 < dP_{C,A'11} - dP_{C,A'12} < -0.02. \qquad \text{Expression 43}$$

In the first to fourth configurations of the zoom lens of the present invention, when $n_{d21}$ is the refractive index of the lens that is furthest on the object side in the second lens group, and $\nu_{d21}$ is its Abbe number, then it is preferable that the conditions of the following Expressions 44 and 45 are satisfied:

$$n_{d21} > 1.85 \qquad \text{Expression 44}$$

$$30 < \nu_{d21} < 50. \qquad \text{Expression 45}$$

With these Expressions 44 and 45, negative curvature of field can be corrected while adequately correcting chromatic aberration, so that it is possible to attain a high image quality all the way to the periphery of the picture plane.

In the first to fourth configurations of the zoom lens of the present invention, when $n_{d21}$ is the refractive index of the lens that is furthest on the object side in the second lens group, and $\nu_{d21}$ is its Abbe number, then it is preferable that the conditions of the following Expressions 46 and 47 are satisfied:

$$1.75 < n_{d21} < 1.85 \qquad \text{Expression 46}$$

$$30 < \nu_{d21} < 50. \qquad \text{Expression 47}$$

Using a glass material that satisfies the conditions of the Expressions 46 and 47, it is possible to reduce costs while maintaining the fundamental performance.

In the first to fourth configurations of the zoom lens of the present invention, it is preferable that the second lens group includes at least one aspherical surface. With such a configuration, it is possible to favorably correct flare of lower light beams from wide-angle positions to the standard position.

In the first to fourth configurations of the zoom lens of the present invention, it is preferable that the third lens group includes at least one aspherical surface. With this configuration, it is possible to correct spherical aberration and aberration occurring during the correction of camera shake favorably.

In the first to fourth configurations of the zoom lens of the present invention, it is preferable that the fifth lens group includes at least one aspherical surface. With this configuration, it is it is possible to suppress changes in monochromatic aberration during zooming and focusing.

In the first to fourth configurations of the zoom lens of the present invention, it is preferable that, when in the cemented lens of the second lens group, $\phi_{22}$ is the power of the lens on the object side, $\nu_{d22}$ is its Abbe number, $\phi_{23}$ is the power of the lens on the image plane side, and $\nu_{d23}$ is its Abbe number, the condition of the following Expression 48 is satisfied:

$$19 < \nu_{d22}\nu_{d23}(\phi_{22}+\phi_{23})/(\phi_{22}\nu_{d23}+\phi_{23}\nu_{d22}) < 22 \qquad \text{Expression 48}$$

Above the upper limit in Expression 48, the g-line is overcompensated at the tele end, and below the lower limit in Expression 48, it is insufficiently compensated.

In the first to fourth configurations of the zoom lens of the present invention, it is preferable that, when $f_w$ is the focus distance of the entire system at a wide-angle end, $f_i$ (i=1 . . . 5) is the focus distance of the i-th lens group, and $f_{34}$ is a combined focus distance of the third lens group and the fourth lens group, then the conditions of the following Expressions 49 to 52 are satisfied:

$$8.5 < f_1/f_w < 10.0 \qquad \text{Expression 49}$$

$$1.6 < |f_2|/f_w < 1.7 \qquad \text{Expression 50}$$

$$8.0 < f_{34}/f_w < 9.5 \qquad \text{Expression 51}$$

$$2.0 < f_5/f_w < 5.0. \qquad \text{Expression 52}$$

Expression 49 is a condition for the refractive power of the first lens group. Below the lower limit of Expression 49, the refractive power of the first lens group becomes too large, so that correction of the spherical aberration for long focus distances becomes difficult. Above the upper limit of Expression 49, the length of the first lens group becomes large, so that it becomes difficult to realize a compact zoom lens.

Expression 50 is a condition for the refractive power of the second lens group. Below the lower limit of Expression 50, it is possible to make the zoom lens more compact, but the Petzval sum of the entire system becomes a large negative number, and the correction of the curvature of field becomes difficult. Above the upper limit of Expression 50, correction of aberration becomes easy, but the zoom system becomes long, and it becomes difficult to make the entire system more compact.

Expression 51 is a condition for the refractive power of the third lens group. Below the lower limit of Expression 51, the refractive power of the third lens group becomes too large, so that correction of the spherical aberration becomes difficult. Above the upper limit of Expression 51, the combined system of the first lens group to the third lens group becomes a divergent system, so that the outer lens diameter of the fourth lens group, which is located behind that, cannot be made smaller, and the Petzval sum of the entire system cannot be made smaller.

Expression 52 is a condition for the refractive power of the fourth lens group. Below the lower limit of Expression 52, the picture plane coverage becomes narrow, and it is necessary to increase the lens diameter of the first lens group in order to attain the desired coverage, so that it becomes difficult to realize a smaller and lighter zoom lens. Above the upper limit of Expression 52, it is easy to correct aberration, but the shifting distance of the fourth lens group for close-distance imaging becomes large, which not only makes it difficult to make the entire system more compact, but also makes it difficult to correct the imbalance between off-axis aberrations during close-distance imaging and during long-distance imaging.

Furthermore, a configuration of a video camera in accordance with the present invention is a video camera including a zoom lens, wherein a zoom lens of the present invention is used as that zoom lens.

By configuring the video camera using a zoom lens having one of the above-described configurations, it is possible to realize a compact video camera with a high-performance camera shake correction function.

BRIEF DESCRIPTION OF DRAWINGS

FIG. 3 shows aberration graphs for the standard position of the zoom lens in Example 1 of the present invention (FIG. 3A depicts spherical aberration, FIG. 3B depicts astigmatism, FIG. 3C depicts distortion, FIG. 3D depicts longitudinal chromatic aberration, and FIG. 3E depicts lateral chromatic aberration).

FIG. 4 shows aberration graphs for the tele end of the zoom lens in Example 1 of the present invention (FIG. 4A depicts spherical aberration, FIG. 4B depicts astigmatism, FIG. 4C depicts distortion, FIG. 4D depicts longitudinal chromatic aberration, and FIG. 4E depicts lateral chromatic aberration).

FIG. 6 shows aberration graphs for the wide-angle end of the zoom lens in Example 2 of the present invention (FIG. 6A depicts spherical aberration, FIG. 6B depicts astigmatism, FIG. 6C depicts distortion, FIG. 6D depicts longitudinal chromatic aberration, and FIG. 6E depicts lateral chromatic aberration).

FIG. 7 shows aberration graphs for the standard position of the zoom lens in Example 2 of the present invention (FIG. 7A depicts spherical aberration, FIG. 7B depicts astigmatism, FIG. 7C depicts distortion, FIG. 7D depicts longitudinal chromatic aberration, and FIG. 7E depicts lateral chromatic aberration).

FIG. 10 shows aberration graphs for the wide-angle end of the zoom lens in Example 3 of the present invention (FIG. 10A depicts spherical aberration, FIG. 10B depicts astigmatism, FIG. 1C depicts distortion, FIG. 10D depicts longitudinal chromatic aberration, and FIG. 10E depicts lateral chromatic aberration).

FIG. 11 shows aberration graphs for the standard position of the zoom lens in Example 3 of the present invention (FIG. 11A depicts spherical aberration, FIG. 11B depicts astigmatism, FIG. 11C depicts distortion, FIG. 11D depicts longitudinal chromatic aberration, and FIG. 11E depicts lateral chromatic aberration).

FIG. 12 shows aberration graphs for the tele end of the zoom lens in Example 3 of the present invention (FIG. 12A depicts spherical aberration, FIG. 12B depicts astigmatism, FIG. 12C depicts distortion, FIG. 12D depicts longitudinal chromatic aberration, and FIG. 12E depicts lateral chromatic aberration).

FIG. 15 shows aberration graphs for the standard position of the zoom lens in Example 4 of the present invention (FIG. 15A depicts spherical aberration, FIG. 15B depicts astigmatism, FIG. 15C depicts distortion, FIG. 15D depicts longitudinal chromatic aberration, and FIG. 15E depicts lateral chromatic aberration).

FIG. 19 shows aberration graphs for the wide-angle end of the zoom lens in Example 5 of the present invention (FIG. 19A depicts spherical aberration, FIG. 19B depicts astigmatism, FIG. 19C depicts distortion, FIG. 19D depicts longitudinal chromatic aberration, and FIG. 19E depicts lateral chromatic aberration).

FIG. 20 shows aberration graphs for the standard position of the zoom lens in Example 5 of the present invention (FIG. 20A depicts spherical aberration, FIG. 20B depicts astigmatism, FIG. 20C depicts distortion, FIG. 20D depicts longitudinal chromatic aberration, and FIG. 20E depicts lateral chromatic aberration).

FIG. 21 shows aberration graphs for the tele end of the zoom lens in Example 5 of the present invention (FIG. 21A depicts spherical aberration, FIG. 21B depicts astigmatism, FIG. 21C depicts distortion, FIG. 21D depicts longitudinal chromatic aberration, and FIG. 21E depicts lateral chromatic aberration).

FIG. 25 shows aberration graphs for the tele end of the zoom lens in Example 6 of the present invention (FIG. 25A depicts spherical aberration, FIG. 25B depicts astigmatism, FIG. 25C depicts distortion, FIG. 25D depicts longitudinal chromatic aberration, and FIG. 25E depicts lateral chromatic aberration).

FIG. 29 shows aberration graphs for the standard position of the zoom lens in Example 7 of the present invention (FIG. 29A depicts spherical aberration, FIG. 29B depicts astigmatism, FIG. 29C depicts distortion, FIG. 29D depicts longitudinal chromatic aberration, and FIG. 29E depicts lateral chromatic aberration).

FIG. 30 shows aberration graphs for the tele end of the zoom lens in Example 7 of the present invention (FIG. 30A depicts spherical aberration, FIG. 30B depicts astigmatism, FIG. 30C depicts distortion, FIG. 30D depicts longitudinal chromatic aberration, and FIG. 30E depicts lateral chromatic aberration).

FIG. 33 shows aberration graphs for the wide-angle end of the zoom lens in Example 8 of the present invention (FIG. 33A depicts spherical aberration, FIG. 33B depicts astigmatism, FIG. 33C depicts distortion, FIG. 33D depicts longitudinal chromatic aberration, and FIG. 33E depicts lateral chromatic aberration).

FIG. 34 shows aberration graphs for the standard position of the zoom lens in Example 8 of the present invention (FIG. 34A depicts spherical aberration, FIG. 34B depicts astigmatism, FIG. 34C depicts distortion, FIG. 34D depicts longitudinal chromatic aberration, and FIG. 34E depicts lateral chromatic aberration).

FIG. 35 shows aberration graphs for the tele end of the zoom lens in Example 8 of the present invention (FIG. 35A depicts spherical aberration, FIG. 35B depicts astigmatism, FIG. 35C depicts distortion, FIG. 35D depicts longitudinal chromatic aberration, and FIG. 35E depicts lateral chromatic aberration).

BEST MODE FOR CARRYING OUT THE INVENTION

The following is a more specific explanation of the present invention, using embodiments.

First Embodiment

Figure 1:
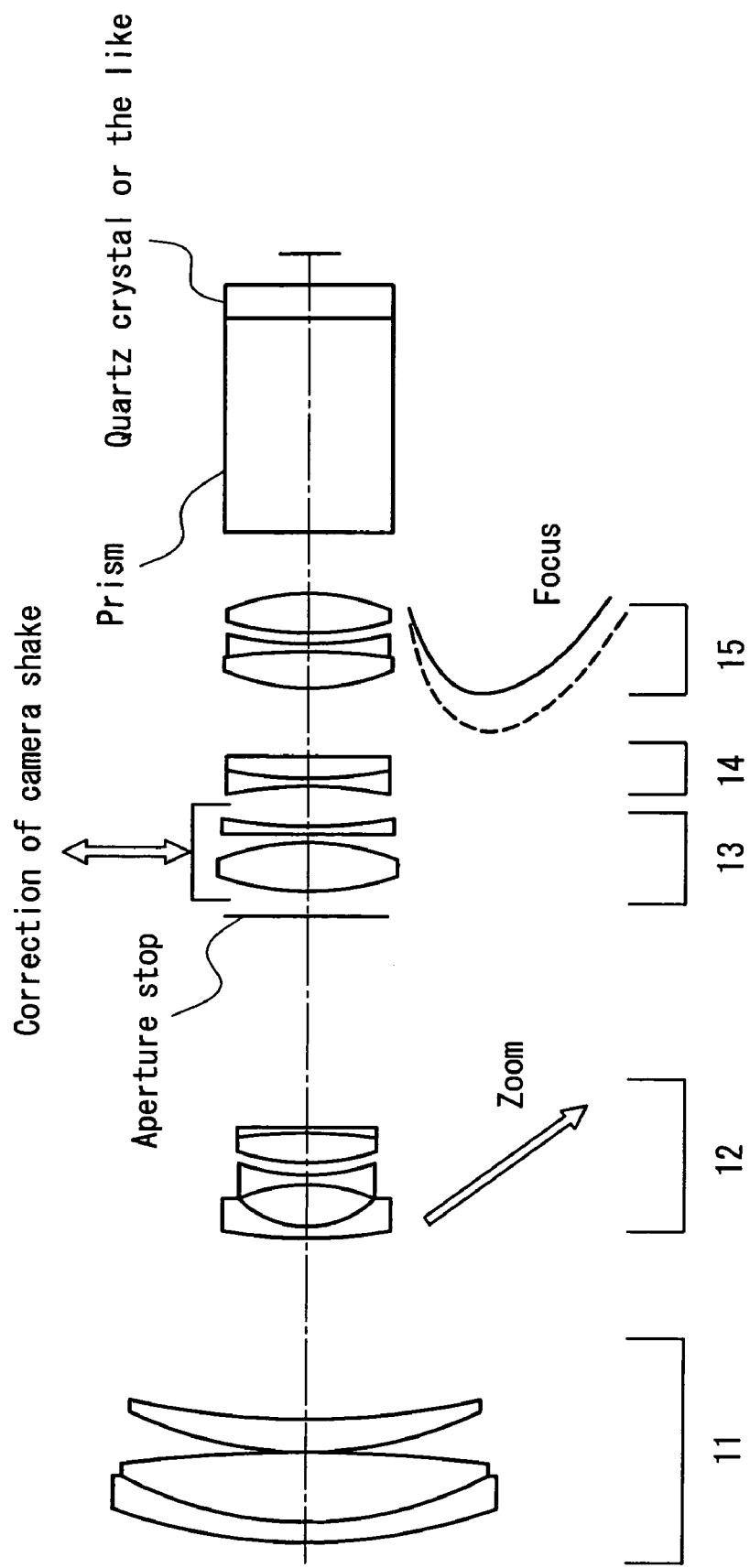
FIG. 1 is a layout drawing illustrating the configuration of a zoom lens according to a first embodiment of the present invention.

FIG. 1 is a layout drawing illustrating the configuration of a zoom lens according to a first embodiment of the present invention.

As shown in FIG. 1, the zoom lens according to this embodiment includes a first lens group 11 having an overall positive refractive power, a second lens group 12 having an overall negative refractive power, an aperture stop, a third lens group 13 having an overall positive refractive power, a fourth lens group 14 having an overall negative refractive power, and a fifth lens group 15 having an overall positive refractive power, arranged in that order from the object side (on the left in FIG. 1) to the image plane side (on the right in FIG. 1).

Figure 37:
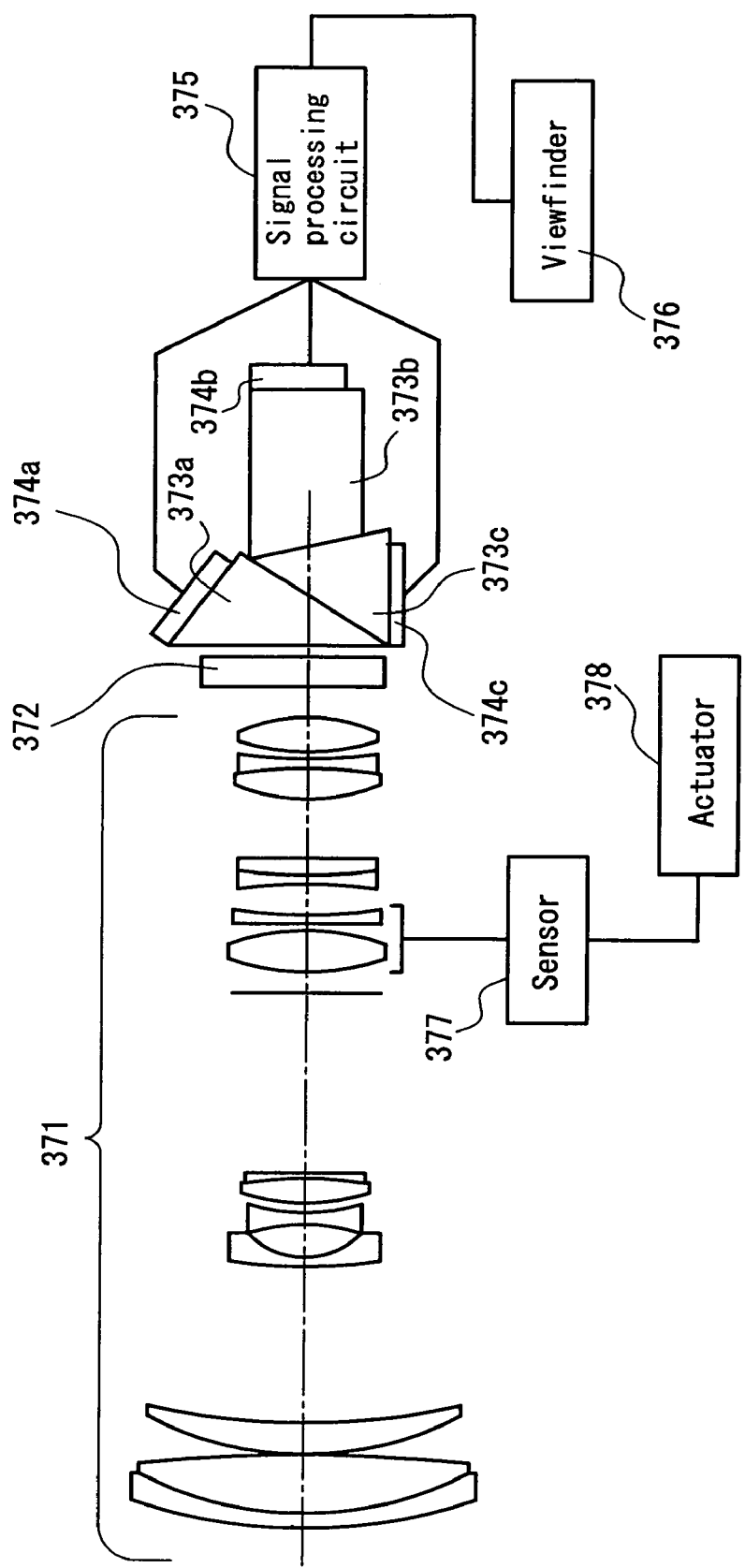
FIG. 37 is a layout drawing illustrating the configuration of a video camera according to a fifth embodiment of the present invention.

The prism shown in FIG. 1 indicates the color separating prisms 373a to 373c in FIG. 37, and the purpose of these color separating prisms is to separate white light into colors of the wavelength regions G (green), R (red) and B (blue). Furthermore, the quartz crystal or the like in FIG. 1 indicates all of a lowpass filter (372 in FIG. 37), an IR cut filter, and a cover glass of an imaging element (374a to 374c in FIG. 37).

The first lens group 11 is made of a cemented lens including a lens having negative refractive power and a lens having positive refractive power, and a lens having positive refractive power, arranged in that order from the object side. When zooming or focusing, the first lens group 11 stays fixed with respect to the image plane.

The second lens group 12 is made of four lenses, namely a negative meniscus lens, a double concave lens, and a cemented lens made of a convex lens and a concave lens, arranged in that order from the object side. Shifting the second lens group 12 on the optical axis carries out the zoom operation.

The aperture stop is fixed with respect to the image plane.

The third lens group 13 is made of a lens having positive refractive power and a lens having negative refractive power, arranged in that order from the object side, and stays fixed with respect to the optical axis direction when zooming or focusing. The third lens group 13 can be shifted in its entirety in a direction perpendicular to the optical axis in order to correct image fluctuations during camera shake. That is to say, when camera shake occurs, image shake is corrected by shifting the third lens group 13 in a direction perpendicular to the optical axis.

The fourth lens group 14 is made of a lens having negative refractive power and a lens having positive refractive power, arranged in that order from the object side, and stays fixed with respect to the image plane when zooming or focusing. More specifically, the fourth lens group 14 is a cemented lens including a convex lens and a concave lens.

The fifth lens group 15 is made of three lenses, namely a cemented lens including a double convex lens and a double concave lens, and a convex lens, arranged in that order from the object side, and is shifted on the optical axis in order to maintain the image plane, which fluctuates when the second lens group 12 is shifted on the optical axis and when the object moves, at a certain position from a reference plane. That is to say, adjustment of the focus and shifting of the image due to zooming is performed simultaneously by shifting the fifth lens group 15 on the optical axis.

In the first lens group 11 in the zoom lens of this embodiment, when $\phi_{11}$ is the power of the lens on the object side in the cemented lens of the first lens group 11, $\phi_{12}$ is the power of the lens on the image plane side in the cemented lens of the first lens group 11, $\nu_{d11}$ is the Abbe number of the lens on the object side in the cemented lens of the first lens group 11, and $\nu_{d12}$ is the Abbe number of the lens on the image plane side in the cemented lens of the first lens group 11, then the condition of the following Expression 53 is satisfied:

$-75 < \nu_{d11}\nu_{d12}(\phi_{11}+\phi_{12})/(\phi_{11}\nu_{d12}+\phi_{12}\nu_{d11}) < -50$  Expression 53

Expression 53 is a condition for obtaining a favorable chromatic aberration across the entire zoom region, and expresses the compound Abbe number of the cemented lens of the first lens group 11. At the tele side, the aberration caused by the first lens group 11 is magnified, so that the first lens group 11 requires achromatization with an increase in magnification. Below the lower limit of Expression 53, the lateral chromatic aberration is incompletely compensated near the standard position and overcompensated at the tele side. Above the upper limit of Expression 53, the lateral chromatic aberration is overcompensated near the standard position and insufficiently compensated at the tele side.

In order to correct chromatic aberration even more effectively, it is desirable that the first lens group 11 satisfies the condition of the following $-75 < \nu_{d11}\nu_{d12}(\phi_{11}+\phi_{12})/(\phi_{11}\nu_{d12}+\phi_{12}\nu_{d11}) < -65$  Expression 54

In the cemented lens of the fifth lens group 15, when $r_{51}$ is the radius of curvature of the surface furthest toward the object side, $n_{d51}$ is the refractive index of the lens on the object side, $r_{52}$ is the radius of curvature of the surface furthest to the image plane side, $n_{d52}$ is the refractive index of the lens on the image plane side, then it is desirable that condition of the following Expression 55 is satisfied:

$0.85 < (n_{d51}-1)r_{52}/(n_{d52}-1)r_{51} < 1.2$  Expression 55

Expression 55 indicates the relationship between the refractive power of the object side surface and that of the image plane side surface of the cemented lens in the fifth lens group 15. Above the upper limit of Expression 55, coma aberration becomes large, and also the fluctuation in the aberration depending on the zoom position becomes large. Below the lower limit of Expression 55, it becomes difficult to make the zoom lens more compact.

In the cemented lens of the fifth lens group 15, when $\phi_{51}$ is the power of the lens on the object side, $\phi_{52}$ is the power of the lens on the image plane side, $\nu_{d51}$ is the Abbe number of the lens on the object side, $\nu_{d52}$ is the Abbe number of the lens on the image plane side, then it is desirable that the condition of the following Expression 56 is satisfied:

$-2.0 < \nu_{d11}\nu_{d12}(\phi_{11}+\phi_{12})/(\phi_{11}\nu_{d12}+\phi_{12}\nu_{d11}) < -8.0$  Expression 56

The fifth lens group 15 is shifted when zooming or focusing. At that time, the condition of Expression 56 needs to be satisfied in order to suppress fluctuations in chromatic aberration. Even though optimum chromatic aberration may be ensured at the standard position, above the upper limit of Expression 56, the g-line will be overcompensated when zooming to the tele side, and below the lower limit of Expression 56, it will be insufficiently compensated.

Moreover, when $dP_{g,F}$, $dP_{g,d}$, and $dP_{c,A'}$ are the anomalous dispersion factors for the partial dispersion ratios at the g-line (435 nm), the F-line (486 nm), the d-line (587 nm), the C-line (656 nm) and the A'-line (768 nm) of the lens, and $dP_{g,F12}$, $dP_{g,d12}$, and $dP_{C,A'12}$ are the anomalous dispersion factors of the second lens of the first lens group 11 counting from the object side (i.e. the lens with positive refractive power that is part of the cemented lens), then it is desirable that the conditions of the following Expressions 57 to 59 are satisfied:

$0.014 < dP_{g,F12} < 0.039$  Expression 57

$0.020 < dP_{g,d12} < 0.057$  Expression 58

$-0.031 < dP_{C,A'12} < -0.02$  Expression 59

Expressions 57 to 59 are necessary conditions for correcting chromatic aberration at short wavelengths and long wavelengths at the same time. In order to correct chromatic aberration at two or more wavelengths, a material with high anomalous dispersion is required. Expressions 57 to 59 indicate the anomalous dispersion from short wavelengths to long wavelengths, and it is possible to favorably correct chromatic aberration at two or more wavelengths by using a material that simultaneously fulfills the Expressions 57 to 59.

Furthermore, to correct chromatic aberration more effectively, it is desirable that the conditions of the following Expressions 60 to 62 are satisfied:

$0.036 < dP_{g,F12} < 0.039$  Expression 60

$0.045 < dP_{g,d12} < 0.057$  Expression 61

$-0.031 < dP_{C,A'12} < -0.024$  Expression 62

Moreover, when $dP_{g,F11}$, $dP_{g,d11}$, and $dP_{C,A'11}$ are the anomalous dispersion factors of the first lens of the first lens group 11 counting from the object side (i.e. the lens with negative refractive power that is part of the cemented lens), and $dP_{g,F12}$, $dP_{g,d12}$, and $dP_{C,A'12}$ are the anomalous dispersion factors of the second lens of the first lens group 11 counting from the object side (i.e. the lens with positive refractive power that is part of the cemented lens), then it is desirable that the conditions of the following Expressions 63 to 65 are satisfied:

$-0.006 < dP_{g,F11} - dP_{g,F12} < 0.019$  Expression 63

$0.002 < dP_{g,d11} - dP_{g,d12} < 0.035$  Expression 64

$-0.027 < dP_{C,A'11} - dP_{C,A'12} < -0.016$  Expression 65

Expressions 63 to 65 are conditions for a lens having negative refractive power and a lens having positive refractive power correcting chromatic aberration for at least two wavelengths. It is possible to favorably correct chromatic aberration at two or more wavelengths by combining lens materials such that the difference in anomalous dispersion factors of the individual lenses satisfies the Expressions 63 to 65.

Furthermore, to correct chromatic dispersion even more effectively, it is desirable that the conditions of the following Expressions 66 to 68 are satisfied:

$$0.017 < dP_{g,F11} - dP_{g,F12} < 0.019 \quad \text{Expression 66}$$

$$0.025 < dP_{g,d11} - dP_{g,d12} < 0.035 \quad \text{Expression 67}$$

$$-0.027 < dP_{C,A'11} - dP_{C,A'12} < -0.02. \quad \text{Expression 68}$$

Also, when $n_{d21}$ is the refractive index of the lens that is furthest on the object side in the second lens group 12, and $v_{d21}$ is its Abbe number, then it is desirable that the conditions of the following Expressions 69 and 70 are satisfied:

$$n_{d21} > 1.85 \quad \text{Expression 69}$$

$$30 < v_{d21} < 50. \quad \text{Expression 70}$$

By satisfying the conditions of Expressions 69 and 70, negative curvature of field can be corrected while adequately correcting chromatic aberration, so that it is possible to attain a high image quality all the way to the periphery of the picture plane.

Furthermore, when $n_{d21}$ is the refractive index of the lens that is furthest on the object side in the second lens group 12, and $v_{d21}$ is its Abbe number, then it is desirable that the conditions of the following Expressions 71 and 72 are satisfied:

$$1.75 < n_{d21} < 1.85 \quad \text{Expression 71}$$

$$30 < v_{d21} < 50. \quad \text{Expression 72}$$

By using a glass material that satisfies the conditions of the Expressions 71 and 72, it is possible to reduce costs while maintaining the fundamental performance.

In the cemented lens of the second lens group 12, when $\phi_{22}$ is the power of the lens on the object side, $v_{d22}$ is its Abbe number, $\phi_{23}$ is the power of the lens on the image plane side, and $v_{d23}$ is its Abbe number, then it is desirable that the condition of the following Expression 73 is satisfied:

$$19 < v_{d22} v_{d23} (\phi_{22} + \phi_{23}) / (\phi_{22} v_{d23} + \phi_{23} v_{d22}) < 22 \quad \text{Expression 73}$$

Above the upper limit in Expression 73, the g-line at the tele end is overcompensated, whereas below the lower limit in Expression 73, it is insufficiently compensated.

When $f_w$ is the focus distance of the entire system on the wide-angle end, $f_i$ (i=1 . . . 5) is the focus distance of the i-th lens group, and $f_{34}$ is the combined focus distance of the third lens group 13 and the fourth lens group 14, then it is desirable that the conditions of the following Expressions 74 to 77 are satisfied.

$$8.5 < f_1/f_w < 10.0 \quad \text{Expression 74}$$

$$1.6 < |f_2|/f_w < 1.7 \quad \text{Expression 75}$$

$$8.0 < f_{34}/f_w < 9.5 \quad \text{Expression 76}$$

$$2.0 < f_5/f_w < 5.0. \quad \text{Expression 77}$$

Expression 74 is a condition for the refractive power of the first lens group 11. Below the lower limit of Expression 74, the refractive power of the first lens group 11 becomes too large, so that correction of the spherical aberration for long focus distances becomes difficult. Above the upper limit of Expression 74, the length of the first lens group becomes large, so that it becomes difficult to realize a compact zoom lens.

Expression 75 is a condition for the refractive power of the second lens group 12. Below the lower limit of Expression 75, it is possible to make the zoom lens more compact, but the Petzval sum of the entire system becomes a large negative number, and the correction of the curvature of field becomes difficult. Above the upper limit of Expression 75, correction of aberration becomes easy, but the zoom system becomes long, and it becomes difficult to make the entire system more compact.

Expression 76 is a condition for the refractive power of the third lens group 13. Below the lower limit of Expression 76, the refractive power of the third lens group 13 becomes too large, so that correction of the spherical aberration becomes difficult. Above the upper limit of Expression 76, the combined system of the first lens group 11 to the third lens group 13 becomes a divergent system, so that the outer lens diameter of the fourth lens group 14, which is located behind that, cannot be made smaller, and the Petzval sum of the entire system cannot be made smaller.

Expression 77 is a condition for the refractive power of the fourth lens group 14. Below the lower limit of Expression 77, the picture plane coverage becomes narrow, and it is necessary to increase the lens diameter of the first lens group 11 in order to attain the desired coverage, so that it becomes difficult to provide a smaller and lighter zoom lens. Above the upper limit of Expression 77, it is easy to correct aberration, but the shifting distance of the fourth lens group 14 for close-distance imaging becomes large, which not only makes it difficult to make the entire system more compact, but also makes it difficult to correct the imbalance between off-axis aberrations during close-distance imaging and during long-distance imaging.

It is desirable that the second lens group 12 includes at least one aspherical surface. By configuring the second lens group 12 like this, it is possible to correct flare of lower light beams from wide-angle positions to the standard position favorably.

It is also desirable that the third lens group 13 includes at least one aspherical surface. By configuring the third lens group 13 like this, it is possible to correct spherical aberration and aberration occurring during the correction of camera shake favorably.

It is also desirable that the fifth lens group 15 includes at least one aspherical surface. By configuring the fifth lens group 15 like this, it is possible to suppress changes in monochromatic aberration during zooming and focusing.

It should be noted that these aspherical surfaces are defined by the following Expression 78 (this also applies to Embodiments 2 to 4 below).

$$SAG = \frac{H^2/R}{1+\sqrt{1-(1+K)(H/R)^2}} + D \cdot H^4 + E \cdot H^6 \quad \text{Expression 78}$$

In Expression 78, H denotes the height from the optical axis, SAG denotes the distance from the vertex on the aspherical surface at a height H from the optical axis, R denotes the radius of curvature at the vertex of the aspherical surface, K denotes a conic constant, and D and E denote aspheric coefficients.

The following is a more detailed explanation of a zoom lens according to this embodiment, illustrated by specific examples.

EXAMPLE 1

Table 1 shows a specific numerical example of a zoom lens according to this example:

TABLE 1

| Group | Surface | r | d | N | ν |
|---|---|---|---|---|---|
| 1 | 1 | 56.454 | 1.40 | 1.84666 | 23.8 |
| | 2 | 36.832 | 6.10 | | |
| | 3 | −196.574 | 0.20 | 1.49700 | 81.6 |
| | 4 | 34.074 | 3.60 | 1.69680 | 55.6 |
| | 5 | 74.909 | variable | | |
| 2 | 6 | 74.909 | 0.90 | 1.83500 | 42.7 |
| | 7 | 8.855 | 3.69 | | |
| | 8 | −18.190 | 1.20 | 1.66547 | 55.2 |
| | 9 | 18.829 | 1.00 | | |
| | 10 | 19.043 | 2.60 | 1.84666 | 23.9 |
| | 11 | −67.116 | 0.80 | 1.83500 | 42.7 |
| | 12 | ∞ | variable | | |
| ap. stop | 13 | — | 2.50 | — | — |
| 3 | 14 | 23.113 | 4.20 | 1.51450 | 63.1 |
| | 15 | −23.113 | 0.80 | | |
| | 16 | 58.000 | 1.00 | 1.80518 | 25.4 |
| | 17 | ∞ | 3.50 | | |
| 4 | 18 | −41.309 | 0.90 | 1.60311 | 60.7 |
| | 19 | 41.309 | 1.60 | 1.80518 | 25.4 |
| | 20 | 176.658 | variable | | |
| 5 | 21 | 18.950 | 3.10 | 1.48749 | 70.4 |
| | 22 | −80.374 | 1.00 | 1.84666 | 23.9 |
| | 23 | 36.529 | 1.00 | | |
| | 24 | 23.244 | 3.50 | 1.51450 | 63.1 |
| | 25 | −18.407 | variable | | |
| 6 | 26 | ∞ | 20.00 | 1.58913 | 61.2 |
| | 27 | ∞ | 3.00 | 1.51633 | 64.1 |
| | 28 | ∞ | — | | |

In Table 1, r (mm) denotes the radius of curvature of the lens surfaces, d (mm) denotes the lens thickness or the air distance between lenses, n denotes the refractive index of the lenses at the d-line, and ν denotes the Abbe number of the lenses at the d-line (this also applies to Examples 2 to 7 below). It should be noted that the zoom lens shown in FIG. 1 has been configured on the basis of the data in Table 1 above.

Table 2 below lists the aspheric coefficients for the zoom lens of this example.

TABLE 2

| Surface | 8 | 14 | 15 | 24 | 25 |
|---|---|---|---|---|---|
| K | −2.09486 | 6.10364E−01 | 6.10364E−01 | −3.53907 | −9.53692E−01 |
| D | −2.27591E−05 | −2.91342E−05 | 2.91342E−05 | −5.98698E−06 | 2.69533E−05 |
| E | −6.91114E−07 | −2.61227E−08 | 2.61227E−08 | −1.13382E−07 | −1.21034E−07 |

Table 3 below lists the air distances (mm) that can be varied by zooming when the object point is located at infinity. The standard position in Table 3 below is the position at which the zoom factor of the second lens group 12 becomes X−1. In Table 3 below, f (mm), F/No, and ω (°) respectively denote the focus distance, the F number, the incident half field angle at the wide-angle end, the standard position and the tele end of the zoom lens in Table 1 (this also applies to Examples 2 to 7 below).

TABLE 3

| | wide-angle end | standard | tele end |
|---|---|---|---|
| F | 5.706 | 38.109 | 81.098 |
| F/No | 1.644 | 2.611 | 2.843 |
| 2ω | 57.860 | 8.924 | 4.194 |
| d5 | 1.000 | 28.000 | 34.000 |
| d10 | 35.500 | 8.500 | 2.500 |
| d14 | 10.400 | 4.407 | 9.394 |
| d19 | 2.000 | 7.993 | 3.006 |

Figures 2A, 2B, 2C, 2D, 2E:
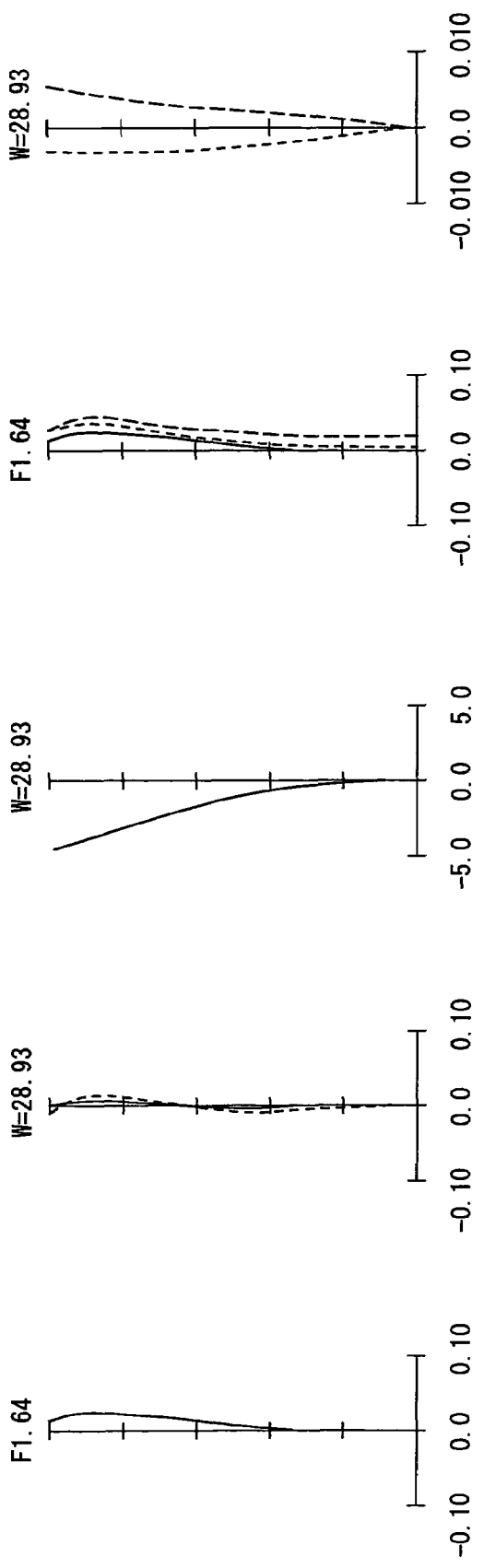
FIG. 2 shows aberration graphs for the wide-angle end of the zoom lens in Example 1 of the present invention (FIG. 2A depicts spherical aberration, FIG. 2B depicts astigmatism, FIG. 2C depicts distortion, FIG. 2D depicts longitudinal chromatic aberration, and FIG. 2E depicts lateral chromatic aberration).

The following are the values for the conditional expressions for the zoom lens of this example:

$\nu_{d11}\nu_{d12}(\phi_{11}+\phi_{12})/(\phi_{11}\nu_{d12}+\phi_{12}\nu_{d11})=-63.4$ $dP_{g, F12}=0.0374$ $dP_{g, d12}=0.0476$ $dP_{C, A'12}=-0.0255$ $dP_{g, F11}-dP_{g, F12}=0.0177$ $dP_{g, d11}-dP_{g, d12}=0.0266$ $dP_{C, A'11}-dP_{C, A'12}=-0.0213$ $(n_{dS1}-1)r_{S2}/(n_{dS2}-1)r_{S1}=1.11$ $\nu_{dS1}\nu_{dS2}(\phi_{S1}+\phi_{S2})/(\phi_{S1}\nu_{dS2}+\phi_{S2}\nu_{dS1})=2.5$ $n_{d21}=1.83500, \nu_{d21}=42.7$ $\nu_{d22}\nu_{d23}(\phi_{22}+\phi_{23})/(\phi_{22}\nu_{d23}+\phi_{23}\nu_{d22})=21.3$ $f_1/f_w=9.04$ $|f_2|/f_w=1.61$ $f_{34}/f_w=8.76$ $f_5/f_w=3.87$ FIGS. 2 to 4 are aberration graphs for the wide-angle end, the standard position and the tele end of the zoom lens in this example. In these figures, A is the graph for the spherical aberration, and shows the value at the d-line. B is the graph for the astigmatism; the solid curve indicates the sagittal image plane curvature, and the broken curve indicates the meridional image plane curvature. C is the graph for the distortion. D is the graph for the longitudinal chromatic aberration; the solid curve indicates the value for the d-line, the short broken curve indicates the value for the F-line, and the long broken curve indicates the value for the C-line. E is the graph for the lateral chromatic aberration; the short broken curve indicates the value for the F-line, and the long broken curve indicates the value for the C-line (these also apply to Examples 2 to 7 below).

As becomes clear from the aberration graphs in FIGS. 2 to 4, the zoom lens of this example has sufficient aberration correcting capability for achieving a very high resolution.

Figure 5A:
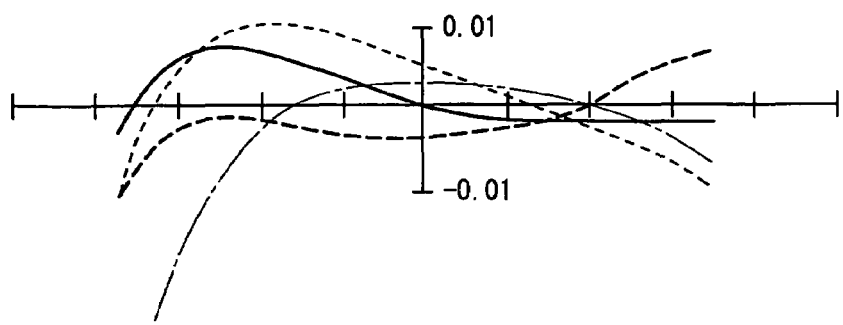
FIG. 5 shows the aberration graphs during a camera shake correction at the tele end in Example 1 of the present invention (FIG. 5A depicts the lateral aberration at a relative image height of 0.75, FIG. 5B depicts the lateral aberration at image plane center, and FIG. 5C depicts the lateral aberration at a relative image height of −0.75).
Figure 5B:
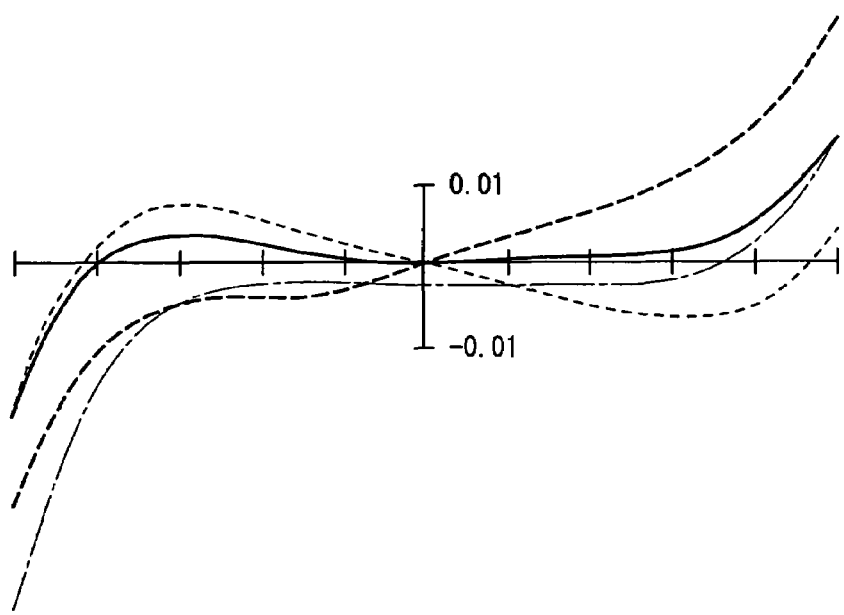
Figure 5C:
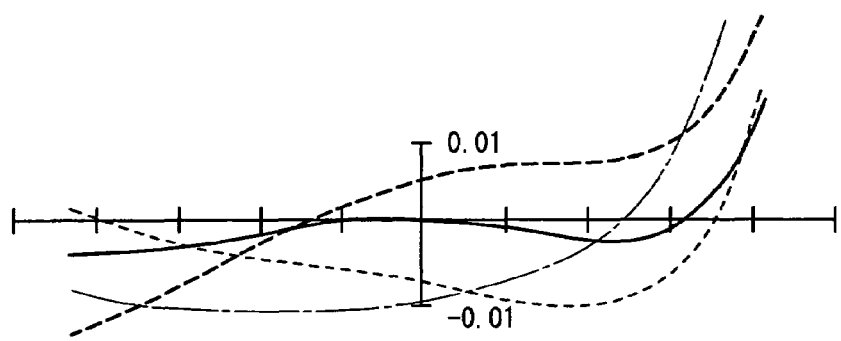

FIG. 5 shows the aberration graphs during a camera shake correction of 0.30° at the tele end. A is a graph of the lateral aberration at a relative image height of 0.75, B is a graph of the lateral aberration at image plane center, and C is a graph of the lateral aberration at a relative image height of −0.75; the solid curve indicates the value for the d-line, the short broken curve indicates the value for the F-line, the long broken curve indicates the value for the C-line, and the dash-dotted curve indicates the value for the g-line (these also apply to Examples 2 to 7 below).

As becomes clear from the aberration graphs shown in FIG. 5, the zoom lens of this example has favorable aberration properties even while correcting camera shake.

EXAMPLE 2

Table 4 shows a specific numerical example of a zoom lens according to this example:

TABLE 4

| Group | surface | r | d | n | ν |
|---|---|---|---|---|---|
| 1 | 1 | 50.232 | 1.40 | 1.84666 | 23.8 |
|   | 2 | 35.027 | 6.10 |  |  |
|   | 3 | −174.656 | 0.20 | 1.43426 | 95.0 |
|   | 4 | 33.856 | 3.60 | 1.69680 | 55.6 |
|   | 5 | 77.763 | variable |  |  |
| 2 | 6 | 77.763 | 0.90 | 1.83500 | 42.7 |
|   | 7 | 8.848 | 3.69 |  |  |
|   | 8 | −18.522 | 1.20 | 1.66547 | 55.2 |
|   | 9 | 18.590 | 1.00 |  |  |
|   | 10 | 18.958 | 2.60 | 1.84666 | 23.9 |
|   | 11 | −66.917 | 0.80 | 1.83500 | 42.7 |
|   | 12 | ∞ | variable |  |  |
| ap. stop | 13 | — | 2.50 | — | — |
| 3 | 14 | 23.424 | 4.20 | 1.51450 | 63.1 |
|   | 15 | −23.424 | 0.80 |  |  |
|   | 16 | 58.000 | 1.00 | 1.80518 | 25.4 |
|   | 17 | ∞ | 3.50 |  |  |
| 4 | 18 | −45.578 | 0.90 | 1.60311 | 60.7 |
|   | 19 | 45.578 | 1.60 | 1.80518 | 25.4 |
|   | 20 | 190.180 | variable |  |  |
| 5 | 21 | 22.282 | 3.10 | 1.53256 | 46.0 |
|   | 22 | −43.273 | 1.00 | 1.84666 | 23.9 |
|   | 23 | 35.954 | 1.00 |  |  |
|   | 24 | 20.105 | 3.50 | 1.51450 | 63.1 |
|   | 25 | −17.695 | variable |  |  |
| 6 | 26 | ∞ | 20.00 | 1.58913 | 61.2 |
|   | 27 | ∞ | 3.00 | 1.51633 | 64.1 |
|   | 28 | ∞ | — |  |  |

Table 5 below lists the aspheric coefficients for the zoom lens of this example.

TABLE 5

| surface | 8 | 14 | 15 | 24 | 25 |
|---|---|---|---|---|---|
| K | −3.62223 | 5.30002E−01 | 5.30002E−01 | −3.02021E+00 | −1.12745E+00 |
| D | −4.74619E−05 | −2.76407E−05 | 2.76407E−05 | 1.21027E−05 | 3.10126E−05 |
| E | −5.61894E−07 | −2.23345E−08 | 2.23345E−08 | −2.16832E−07 | −2.32500E−07 |

Table 6 below lists the air distances (mm) that can be varied by zooming when the object point is located at infinity.

TABLE 6

|  | wide-angle end | Standard | tele end |
|---|---|---|---|
| F | 5.661 | 38.109 | 81.098 |
| F/No | 1.632 | 2.611 | 2.843 |
| 2ω | 58.356 | 9.508 | 4.248 |
| d5 | 1.000 | 27.618 | 34.000 |
| d10 | 35.500 | 8.882 | 2.500 |
| d14 | 10.400 | 4.551 | 9.368 |
| d19 | 2.000 | 7.849 | 3.031 |

Figures 8A, 8B, 8C, 8D, 8E:
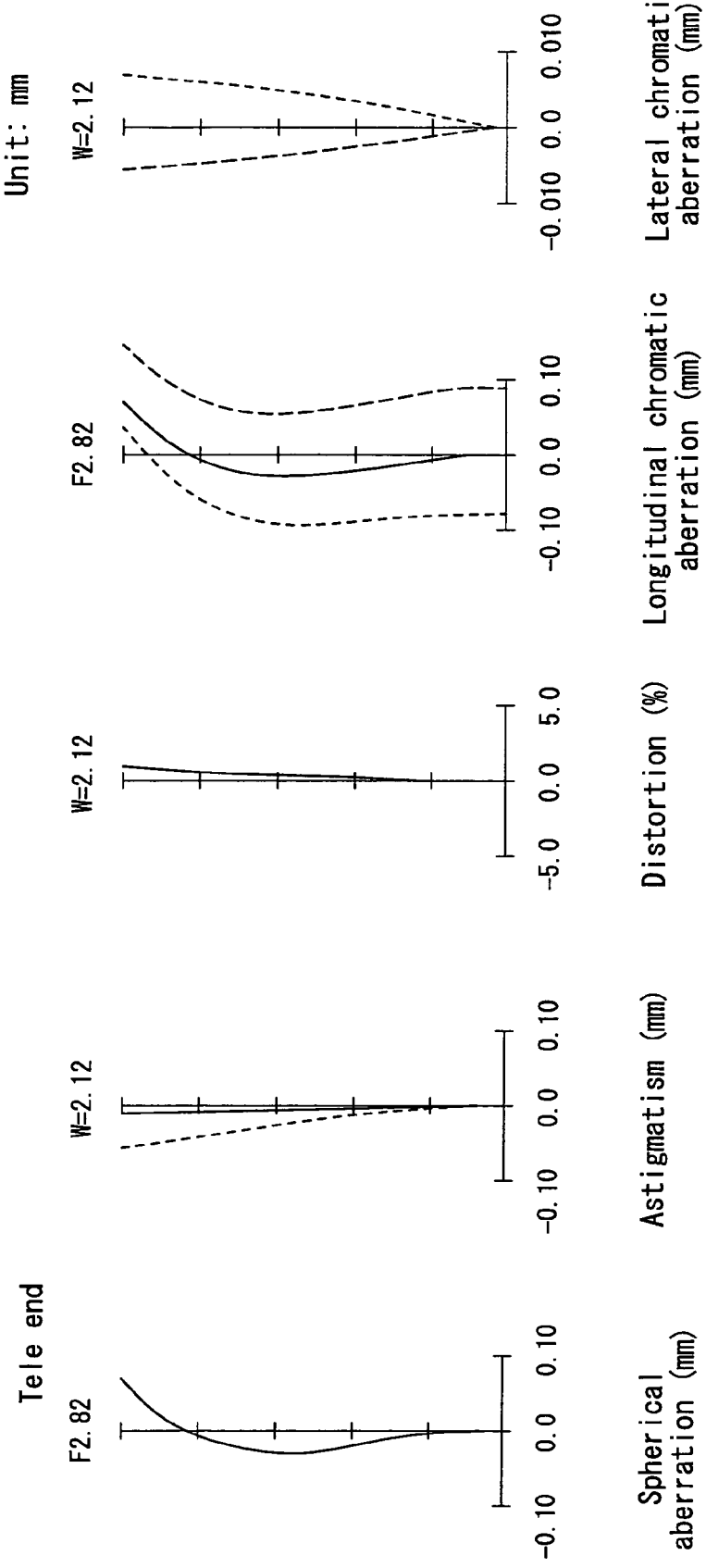
FIG. 8 shows aberration graphs for the tele end of the zoom lens in Example 2 of the present invention (FIG. 8A depicts spherical aberration, FIG. 8B depicts astigmatism, FIG. 8C depicts distortion, FIG. 8D depicts longitudinal chromatic aberration, and FIG. 8E depicts lateral chromatic aberration).

The following are the values for the conditional expressions for the zoom lens of this example:

$\nu_{d11}\nu_{d12}(\phi_{11}+\phi_{12})/(\phi_{11}\nu_{d12}+\phi_{12}\nu_{d11})=-56.2$ $dP_{g, F12}=0.0385$ $dP_{g, d12}=0.0550$ $dP_{C, A'12}=-0.0301$ $dP_{g, F11}-dP_{g, F12}=0.0188$ $dP_{g, d11}-dP_{g, d12}=0.0340$ $dP_{C, A'11}-dP_{C, A'12}=-0.0259$ $(n_{dS1}-1)r_{S2}/(n_{dS2}-1)r_{S1}=0.93$ $\nu_{dS1}\nu_{dS2}(\phi_{S1}+\phi_{S2})/(\phi_{S1}\nu_{dS2}+\phi_{S2}\nu_{dS1})=7.5$ $n_{d21}=1.83500, \nu_{d21}=42.7$ $\nu_{d22}\nu_{d23}(\phi_{22}+\phi_{23})/(\phi_{22}\nu_{d23}+\phi_{23}\nu_{d22})=21.3$ $f_1/f_w=1.62$ $|f_2|/f_w=1.62$ $f_{34}/f_w=8.69$ $f_5/f_w=3.90$ FIGS. 6 to 8 are aberration graphs for the wide-angle end, the standard position and the tele end of the zoom lens in this embodiment.

As becomes clear from the aberration graphs in FIGS. 6 to 8, the zoom lens of this example has sufficient aberration correcting capability for achieving a very high resolution.

Figure 9A:
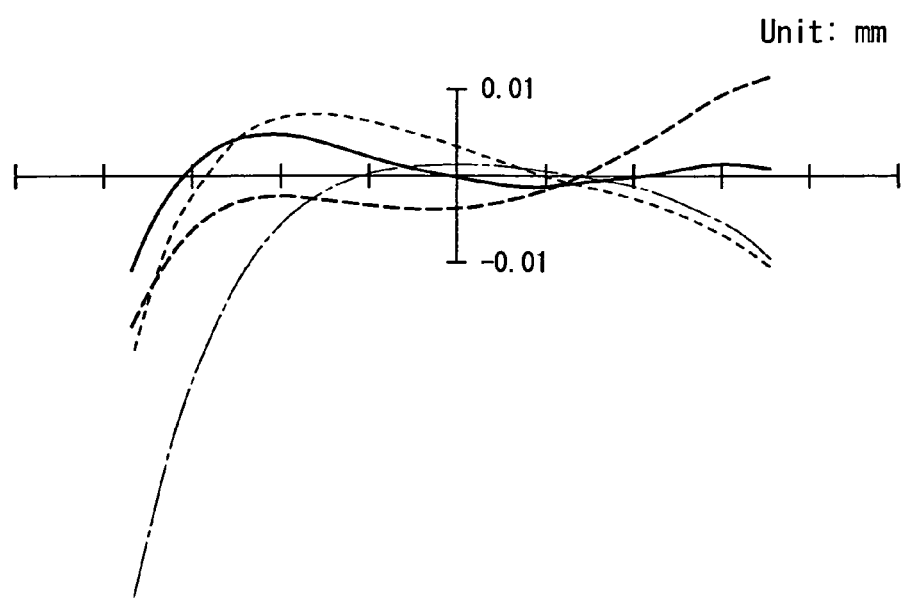
FIG. 9 shows the aberration graphs during a camera shake correction at the tele end in Example 2 of the present invention (FIG. 9A depicts the lateral aberration at a relative image height of 0.75, FIG. 9B depicts the lateral aberration at image plane center, and FIG. 9C depicts the lateral aberration at a relative image height of −0.75).
Figure 9B:
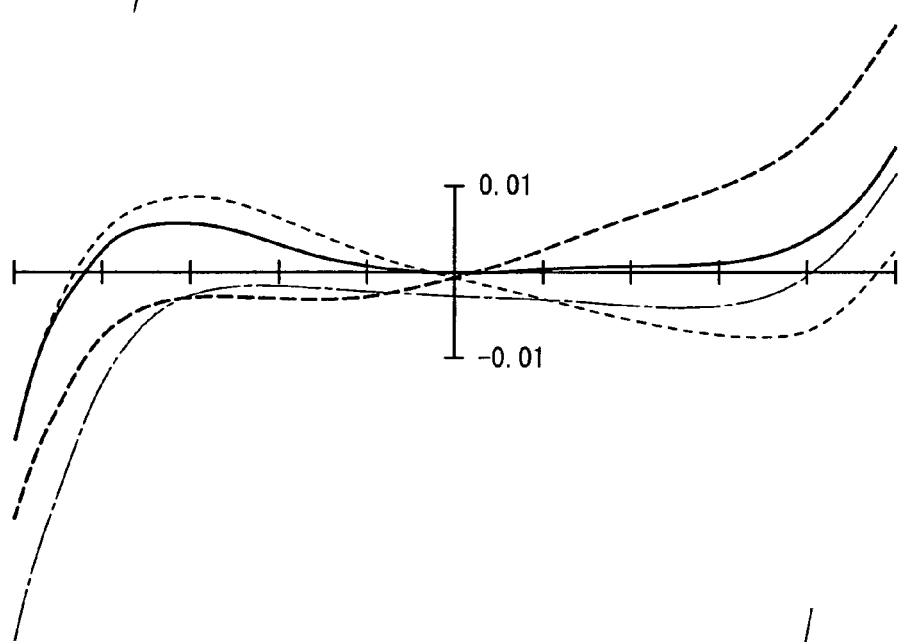
Figure 9C:
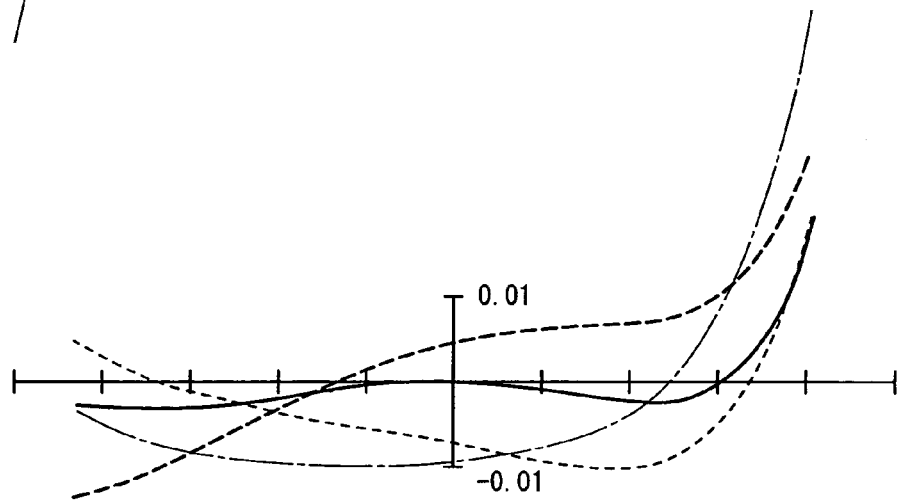

FIG. 9 shows the aberration graphs during a camera shake correction of 0.29° at the tele end.

As becomes clear from the aberration graphs shown in FIG. 9, the zoom lens of this example has favorable aberration properties even while correcting camera shake.

EXAMPLE 3

Table 7 shows a specific numerical example of a zoom lens according to this example:

TABLE 7

| Group | Surface | R | D | n | ν |
|---|---|---|---|---|---|
| 1 | 1 | 63.928 | 1.40 | 1.84666 | 23.8 |
|  | 2 | 38.379 | 6.10 |  |  |
|  | 3 | −235.396 | 0.20 | 1.56907 | 71.3 |
|  | 4 | 33.594 | 3.60 | 1.69680 | 55.6 |
|  | 5 | 69.397 | Variable |  |  |
| 2 | 6 | 69.397 | 0.90 | 1.83500 | 42.7 |
|  | 7 | 8.836 | 3.69 |  |  |
|  | 8 | −17.914 | 1.20 | 1.66547 | 55.2 |
|  | 9 | 18.939 | 1.00 |  |  |
|  | 10 | 19.085 | 2.60 | 1.84666 | 23.9 |
|  | 11 | −67.214 | 0.80 | 1.83500 | 42.7 |
|  | 12 | ∞ | Variable |  |  |
| ap. stop | 13 | — | 2.50 | — | — |
| 3 | 14 | 23.329 | 4.20 | 1.51450 | 63.1 |
|  | 15 | −23.329 | 0.80 |  |  |
|  | 16 | 58.000 | 1.00 | 1.80518 | 25.4 |
|  | 17 | ∞ | 3.50 |  |  |
| 4 | 18 | −42.135 | 0.90 | 1.60311 | 60.7 |
|  | 19 | 42.135 | 1.60 | 1.80518 | 25.4 |
|  | 20 | 201.296 | Variable |  |  |
| 5 | 21 | 20.835 | 3.10 | 1.48749 | 70.4 |
|  | 22 | −87.469 | 1.00 | 1.84666 | 23.9 |
|  | 23 | 34.850 | 1.00 |  |  |
|  | 24 | 20.536 | 3.50 | 1.51450 | 63.1 |
|  | 25 | −18.437 | Variable |  |  |
| 6 | 26 | ∞ | 20.00 | 1.58913 | 61.2 |
|  | 27 | ∞ | 3.00 | 1.51633 | 64.1 |
|  | 28 | ∞ | — |  |  |

Table 8 below lists the aspheric coefficients for the zoom lens of this example.

TABLE 8

| surface | 8 | 14 | 15 | 24 | 25 |
|---|---|---|---|---|---|
| K | −3.81039E+00 | 6.72458E−01 | 6.72458E−01 | −3.46418E+00 | −1.11210E+00 |
| D | −6.53925E−05 | −2.91539E−05 | 2.91539E−05 | 1.33843E−05 | 2.89203E−05 |
| E | −5.41199E−07 | −2.88003E−08 | 2.88003E−08 | −2.58933E−07 | −2.44700E−07 |

Table 9 below lists the air distances (mm) that can be varied by zooming when the object point is located at infinity.

TABLE 9

|  | wide-angle end | standard | tele end |
|---|---|---|---|
| F | 5.689 | 36.057 | 81.486 |
| F/No | 1.636 | 2.611 | 2.843 |
| 2ω | 58.124 | 9.444 | 4.180 |
| d5 | 1.000 | 27.542 | 34.000 |
| d10 | 35.500 | 8.958 | 2.500 |
| d14 | 10.400 | 4.513 | 9.553 |
| d19 | 2.000 | 7.887 | 2.848 |

The following are the values for the conditional expressions for the zoom lens of this example:

$\nu_{d11}\nu_{d12}(\phi_{11}+\phi_{12})/(\phi_{11}\nu_{d12}+\phi_{12}\nu_{d11})=-71.1$ $dP_{g, F12}=0.0145$ $dP_{g, d12}=0.0233$ $dP_{C, A'12}=-0.00220$ $dP_{g, F11}-dP_{g, F12}=-0.0052$ $dP_{g, d11}-dP_{g, d12}=0.0023$ $dP_{C, A'11}-dP_{C, A'12}=-0.0178$ $(n_{dS1}-1)r_{S2}/(n_{dS2}-1)r_{S1}=0.96$ $\nu_{dS1}\nu_{dS2}(\phi_{S1}+\phi_{S2})/(\phi_{S1}\nu_{dS2}+\phi_{S2}\nu_{dS1})=\mathbf{5.3}$ $n_{d21}=1.83500, \nu_{d21}=42.7$ $\nu_{d22}\nu_{d23}(\phi_{22}+\phi_{23})/(\phi_{22}\nu_{d23}+\phi_{23}\nu_{d22})=\mathbf{21.2}$ $f_1/f_w=9.09$ $|f_2|/f_w=1.61$ $f_{34}/f_w=8.73$ $f_5/f_w=3.87$ FIGS. 10 to 12 are aberration graphs for the wide-angle end, the standard position and the tele end of the zoom lens in this embodiment.

As becomes clear from the aberration graphs in FIGS. 10 to 12, the zoom lens of this example has sufficient aberration correcting capability for achieving a very high resolution.

Figure 13A:
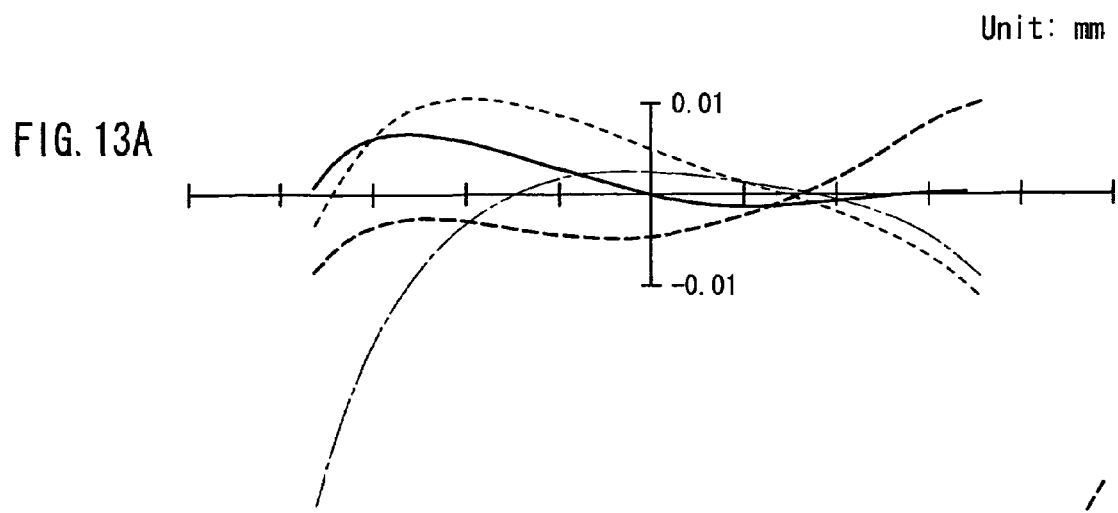
FIG. 13 shows the aberration graphs during a camera shake correction at the tele end in Example 3 of the present invention (FIG. 13A depicts the lateral aberration at a relative image height of 0.75, FIG. 13B depicts the lateral aberration at image plane center, and FIG. 13C depicts the lateral aberration at a relative image height of −0.75).
Figure 13B:
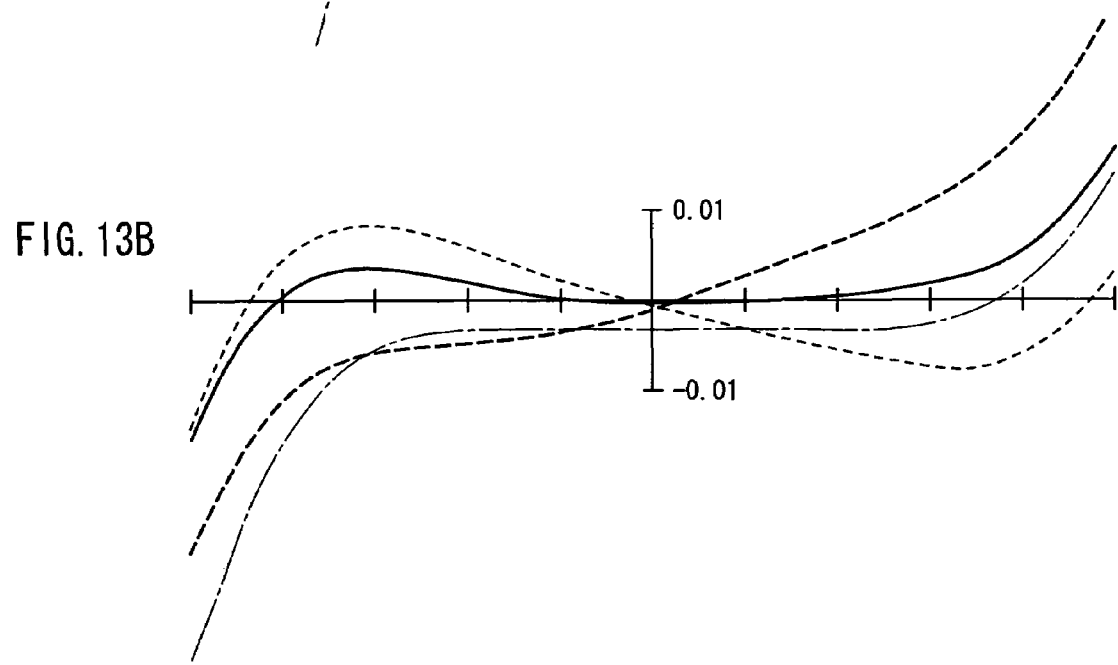
Figure 13C:
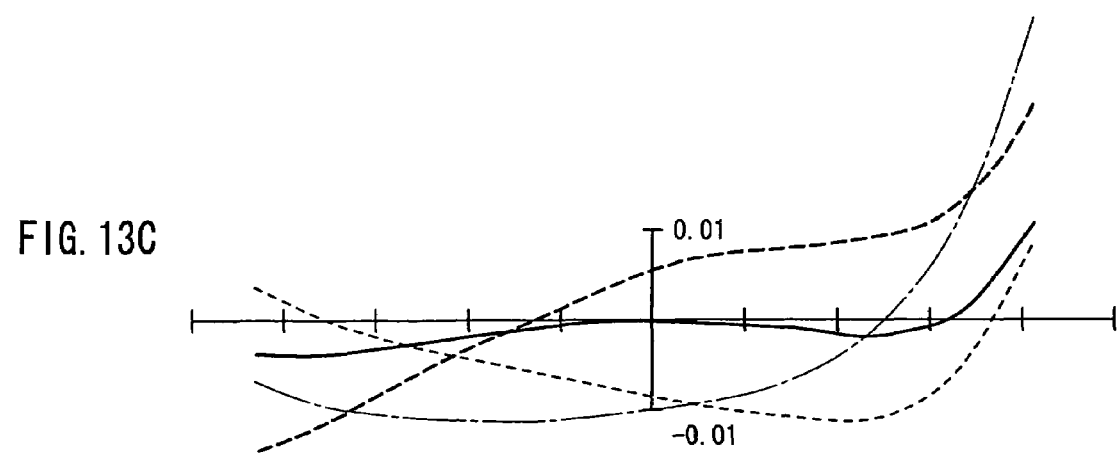

FIG. 13 shows the aberration graphs during a camera shake correction of 0.34° at the tele end.

As becomes clear from the aberration graphs shown in FIG. 13, the zoom lens of this example has favorable aberration properties even while correcting camera shake.

EXAMPLE 4

Table 10 shows a specific numerical example of a zoom lens according to this example:

TABLE 10

| Group | surface | r | d | n | ν |
|---|---|---|---|---|---|
| 1 | 1 | 55.985 | 1.40 | 1.84666 | 23.8 |
|  | 2 | 36.640 | 6.10 |  |  |
|  | 3 | −201.666 | 0.20 | 1.49700 | 81.6 |
|  | 4 | 34.118 | 3.60 | 1.69680 | 55.6 |
|  | 5 | 74.346 | variable |  |  |
| 2 | 6 | 74.346 | 0.90 | 1.88300 | 40.9 |
|  | 7 | 9.144 | 3.69 |  |  |
|  | 8 | −18.811 | 1.20 | 1.66547 | 55.2 |
|  | 9 | 18.875 | 1.00 |  |  |
|  | 10 | 19.093 | 2.60 | 1.84666 | 23.9 |
|  | 11 | −56.124 | 0.80 | 1.83500 | 42.7 |
|  | 12 | ∞ | variable |  |  |
| ap. stop | 13 | — | 2.50 | — | — |
| 3 | 14 | 23.129 | 4.20 | 1.51450 | 63.1 |
|  | 15 | −23.129 | 0.80 |  |  |
|  | 16 | 58.000 | 1.00 | 1.80518 | 25.4 |
|  | 17 | ∞ | 3.50 |  |  |
| 4 | 18 | −40.987 | 0.90 | 1.60311 | 60.7 |
|  | 19 | 40.987 | 1.60 | 1.80518 | 25.4 |
|  | 20 | 179.849 | variable |  |  |
| 5 | 21 | 18.947 | 3.10 | 1.48749 | 70.4 |
|  | 22 | −78.481 | 1.00 | 1.84666 | 23.9 |
|  | 23 | 36.369 | 1.00 |  |  |
|  | 24 | 23.175 | 3.50 | 1.51450 | 63.1 |

TABLE 10-continued

| Group | surface | r | d | n | ν |
|---|---|---|---|---|---|
|  | 25 | −18.327 | variable |  |  |
| 6 | 26 | ∞ | 20.00 | 1.58913 | 61.2 |
|  | 27 | ∞ | 3.00 | 1.51633 | 64.1 |
|  | 28 | ∞ | — |  |  |

Table 11 below lists the aspheric coefficients for the zoom lens of this example.

TABLE 11

| surface | 8 | 14 | 15 | 24 | 25 |
|---|---|---|---|---|---|
| K | −2.11321E+00 | 6.07564E−01 | 6.07564E−01 | −3.55702E+00 | −9.38956E−01 |
| D | −2.25879E−05 | −2.92453E−05 | 2.92453E−05 | −6.09899E−06 | 2.66479E−05 |
| E | −7.35685E−07 | −2.32172E−08 | 2.32172E−08 | −1.14480E−07 | −1.19391E−07 |

Table 12 below lists the air distances (mm) that can be varied by zooming when the object point is located at infinity.

TABLE 12

|  | wide-angle end | standard | tele end |
|---|---|---|---|
| F | 5.697 | 38.022 | 80.934 |
| F/No | 1.644 | 2.611 | 2.843 |
| 2ω | 58.026 | 8.946 | 4.204 |
| d5 | 1.000 | 28.000 | 34.000 |
| d10 | 35.500 | 8.500 | 2.500 |
| d14 | 10.400 | 4.409 | 9.365 |
| d19 | 2.000 | 7.991 | 3.035 |

Figures 14A, 14B, 14C, 14D, 14E:
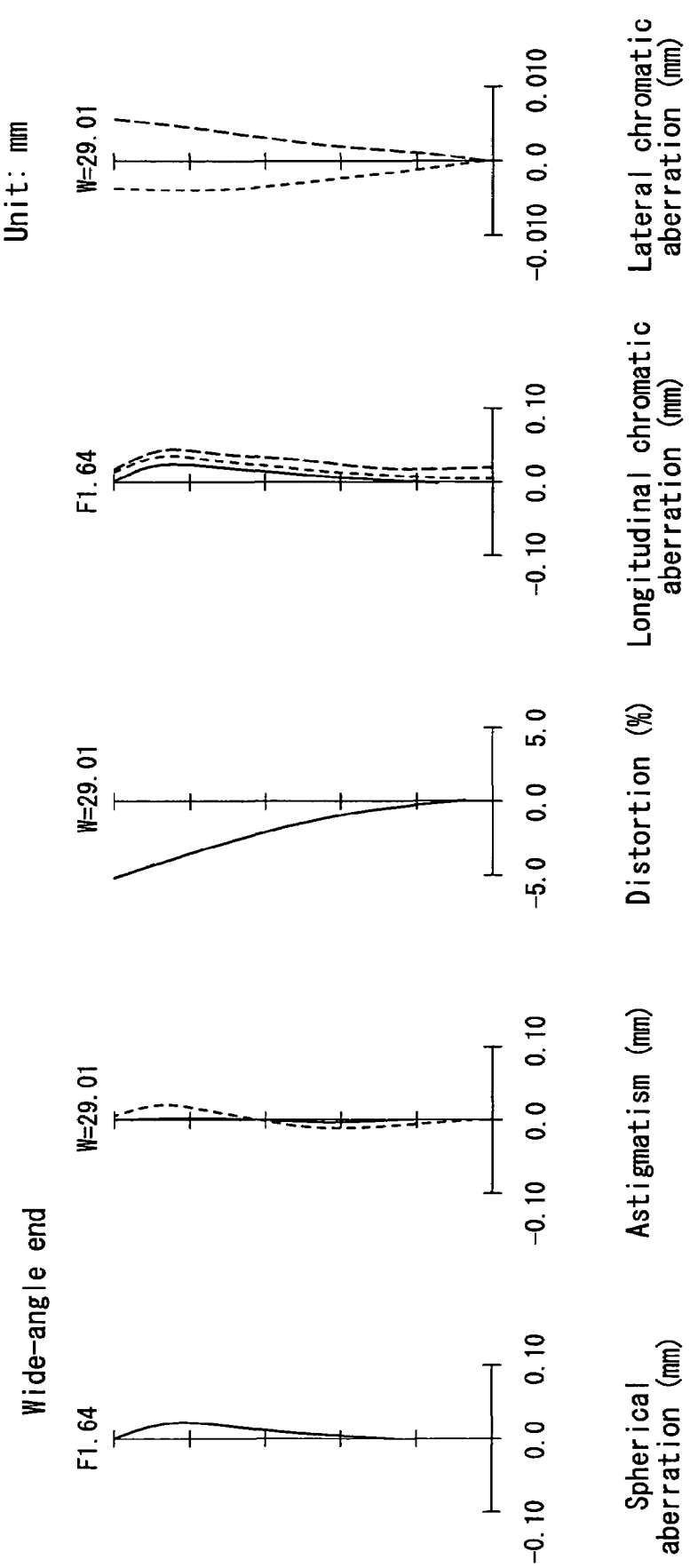
FIG. 14 shows aberration graphs for the wide-angle end of the zoom lens in Example 4 of the present invention (FIG. 14A depicts spherical aberration, FIG. 14B depicts astigmatism, FIG. 14C depicts distortion, FIG. 14D depicts longitudinal chromatic aberration, and FIG. 14E depicts lateral chromatic aberration).
Figures 16A, 16B, 16C, 16D, 16E:
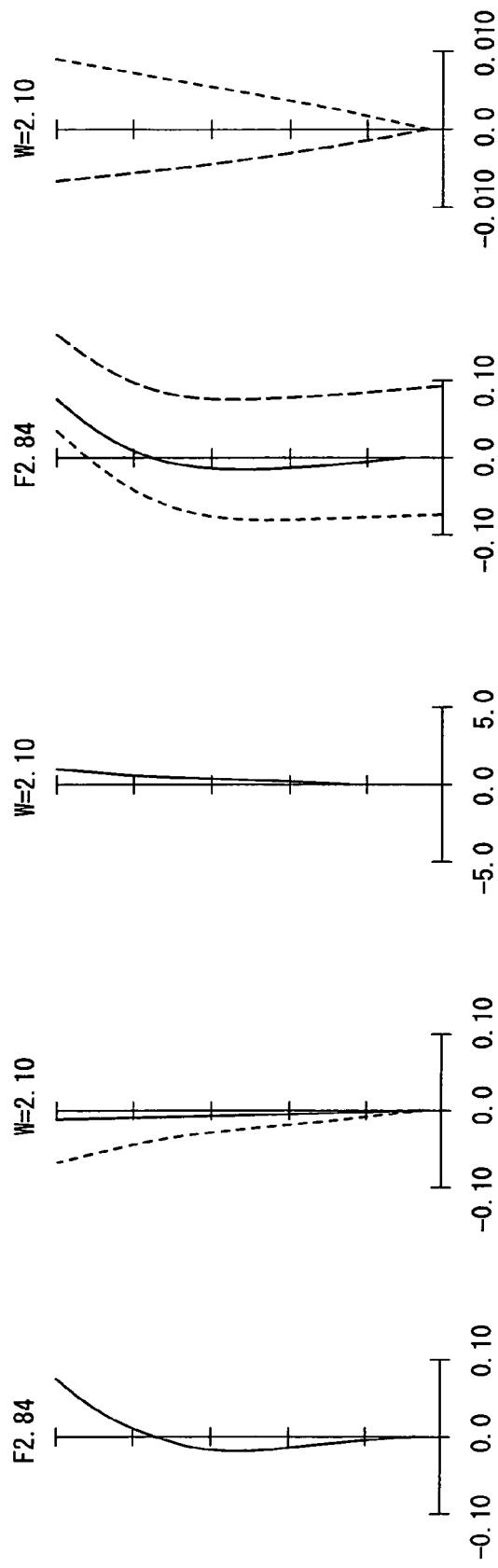
FIG. 16 shows aberration graphs for the tele end of the zoom lens in Example 4 of the present invention (FIG. 16A depicts spherical aberration, FIG. 16B depicts astigmatism, FIG. 16C depicts distortion, FIG. 16D depicts longitudinal chromatic aberration, and FIG. 16E depicts lateral chromatic aberration).

The following are the values for the conditional expressions for the zoom lens of this example:

$\nu_{d11}\nu_{d12}(\phi_{11}+\phi_{12})/(\phi_{11}\nu_{d12}+\phi_{12}\nu_{d11}) = -66.2$ $dP_{g, F12} = 0.0374$ $dP_{g, d12} = 0.0476$ $dP_{C, A'12} = -0.0255$ $dP_{g, F11} - dP_{g, F12} = 0.0177$ $dP_{g, d11} - dP_{g, d12} = 0.0266$ $dP_{C, A'11} - dP_{C, A'12} = -0.0213$ $(n_{d51}-1)r_{52}/(n_{d52}-1)r_{51} = 1.11$ $\nu_{d51}\nu_{d52}(\phi_{51}+\phi_{52})/(\phi_{51}\nu_{d52}+\phi_{52}\nu_{d51}) = 2.6$ $n_{d21} = 1.83500, \nu_{d21} = 40.9$ $\nu_{d22}\nu_{d23}(\phi_{22}+\phi_{23})/(\phi_{22}\nu_{d23}+\phi_{23}\nu_{d22}) = 20.8$ $f_1/f_w = 9.07$ $|f_2|/f_w = 1.61$ $f_{34}/f_w = 8.78$ $f_5/f_w = 3.90$ FIGS. 14 to 16 are aberration graphs for the wide-angle end, the standard position and the tele end of the zoom lens in this embodiment.

As becomes clear from the aberration graphs in FIGS. 14 to 16, the zoom lens of this example has sufficient aberration correcting capability for achieving a very high resolution.

Figure 17A:
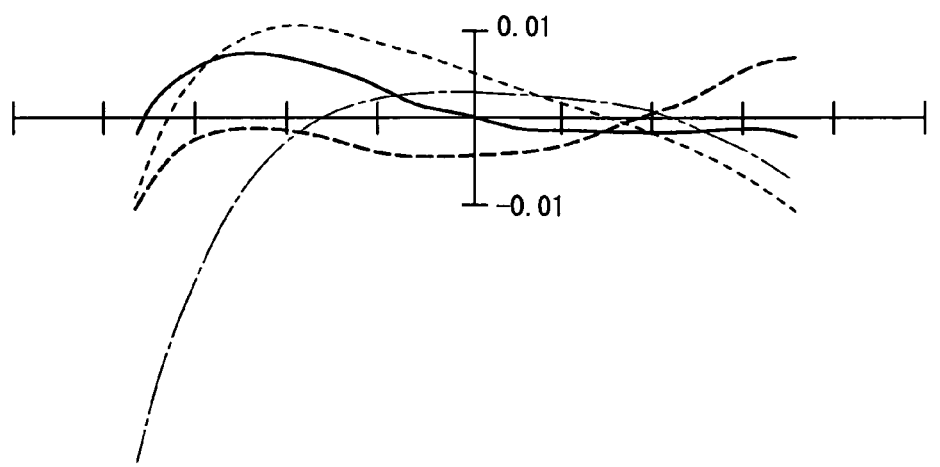
FIG. 17 shows the aberration graphs during a camera shake correction at the tele end in Example 4 of the present invention (FIG. 17A depicts the lateral aberration at a relative image height of 0.75, FIG. 17B depicts the lateral aberration at image plane center, and FIG. 17C depicts the lateral aberration at a relative image height of −0.75).
Figure 17B:
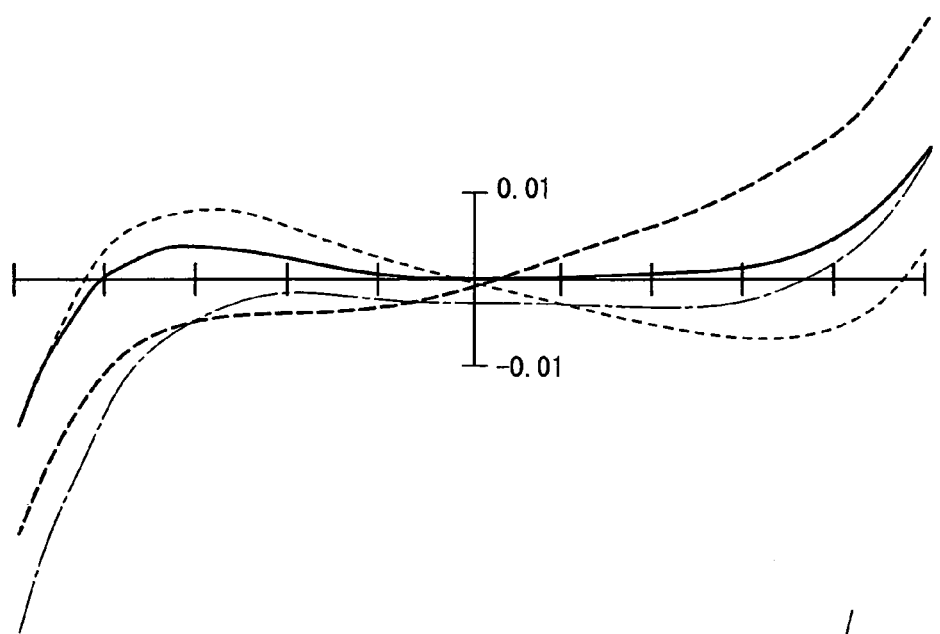
Figure 17C:
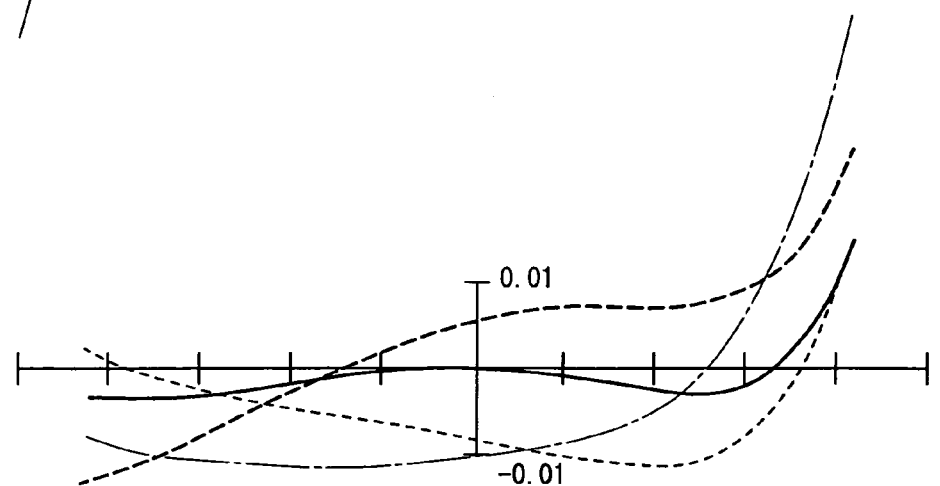

FIG. 17 shows the aberration graphs during a camera shake correction of 0.30° at the tele end.

As becomes clear from the aberration graphs shown in FIG. 17, the zoom lens of this example has favorable aberration properties even while correcting camera shake.

Second Embodiment

Figure 18:
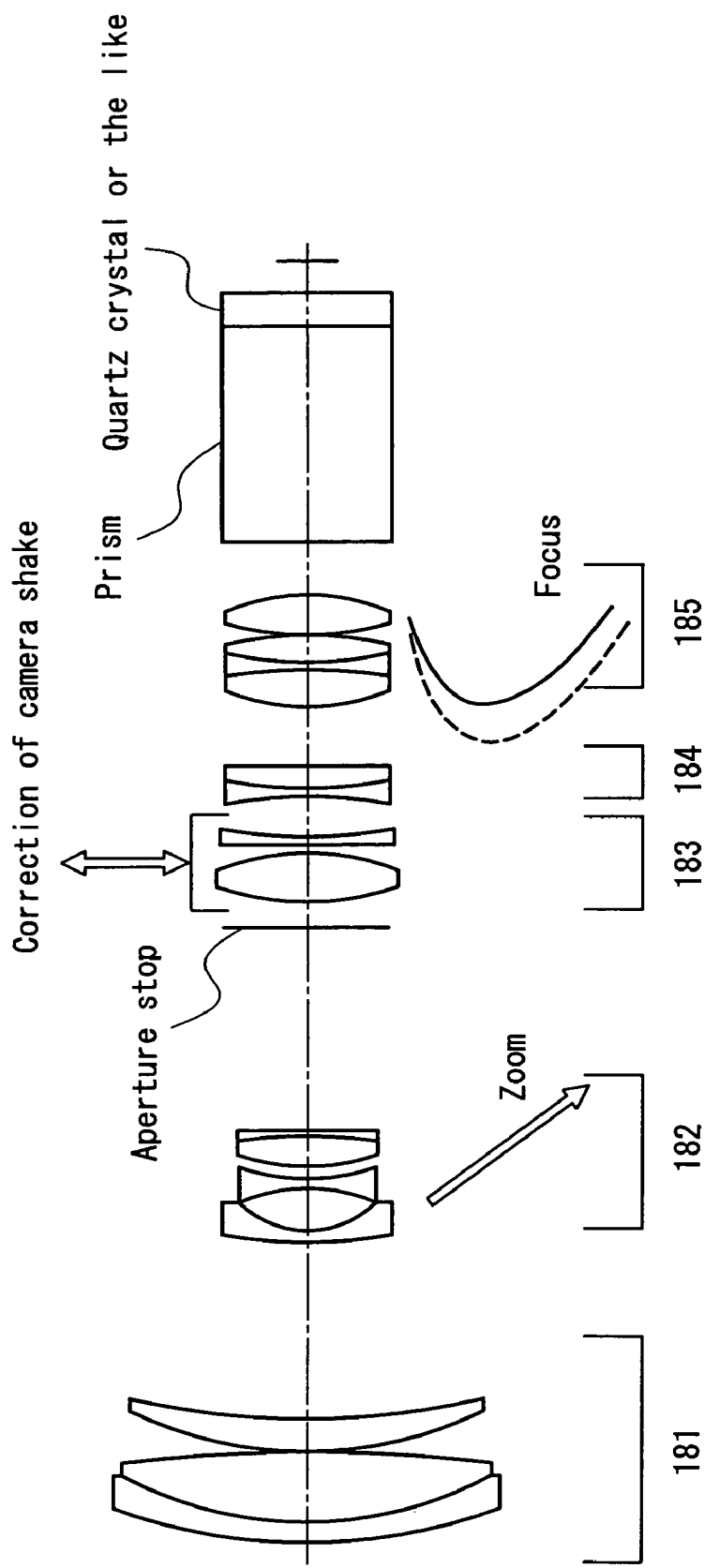
FIG. 18 is a layout drawing illustrating the configuration of a zoom lens according to a second embodiment of the present invention.

FIG. 18 is a layout drawing illustrating the configuration of a zoom lens according to a second embodiment of the present invention.

As shown in FIG. 18, the zoom lens according to this embodiment includes a first lens group 181 having an overall positive refractive power, a second lens group 182 having an overall negative refractive power, an aperture stop, a third lens group 183 having an overall positive refractive power, a fourth lens group 184 having an overall negative refractive power, and a fifth lens group 185 having an overall positive refractive power, arranged in that order from the object side (on the left in FIG. 18) to the image plane side (on the right in FIG. 18).

The first lens group 181 is made of a cemented lens including a lens having negative refractive power and a lens having positive refractive power, and a lens having positive refractive power, arranged in that order from the object side. When zooming or focusing, the first lens group 181 stays fixed with respect to the image plane.

The second lens group 182 is made of four lenses, namely a negative meniscus lens, a double concave lens, and a cemented lens including a convex lens and a concave lens, arranged in that order from the object side. The zoom operation is carried out by shifting the second lens group 182 on the optical axis.

The aperture stop is fixed with respect to the image plane.

The third lens group 183 is made of a lens having positive refractive power and a lens having negative refractive power, arranged in that order from the object side, and stays fixed with respect to the optical axis direction when zooming or focusing. The third lens group 183 can be shifted in its entirety in a direction perpendicular to the optical axis in order to correct image fluctuations during camera shake. That is to say, when camera shake occurs, image shake is corrected by shifting the third lens group 183 in a direction perpendicular to the optical axis.

The fourth lens group 184 is made of a lens having negative refractive power and a lens having positive refractive power, arranged in that order from the object side, and stays fixed with respect to the image plane when zooming or focusing. More specifically, the fourth lens group 184 is a cemented lens including a concave lens and a convex lens.

The fifth lens group 185 is made of four lenses, namely a cemented lens triplet including a double convex lens, a double concave lens and a double convex lens, as well as a convex lens, arranged in that order from the object side. The fifth lens group 185 is shifted on the optical axis in order to maintain the image plane, which fluctuates when the second lens group 182 is shifted on the optical axis and when the object moves, at a certain position from a reference plane.

In the first lens group 181 in the zoom lens of this embodiment, when $\phi_{11}$ is the power of the lens on the object side in the cemented lens of the first lens group 181, $\phi_{12}$ is the power of the lens on the image plane side in the cemented lens of the first lens group 181, $v_{d11}$ is the Abbe number of the lens on the object side in the cemented lens of the first lens group 181, and $v_{d12}$ is the Abbe number of the lens on the image plane side in the cemented lens of the first lens group 181, then the condition of the following Expression 79 is satisfied:

$$-75 < v_{d11} v_{d12}(\phi_{11}+\phi_{12})/(\phi_{11}v_{d12}+\phi_{12}v_{d11}) < -50 \quad \text{Expression 79}$$

Also in this embodiment, as in the first embodiment, it is desirable that the conditions of the Expressions 54 and 57 to 77 are satisfied.

Also in this embodiment, as in the first embodiment, it is desirable that the second lens group 182 includes at least one aspherical surface.

Also in this embodiment, as in the first embodiment, it is desirable that the third lens group 183 includes at least one aspherical surface.

Also in this embodiment, as in the first embodiment, it is desirable that the fifth lens group 185 includes at least one aspherical surface.

It is furthermore desirable that at least three surfaces of the cemented lens triplet of the fifth lens group 185 have the same radius of curvature. By employing this configuration, centering when cementing the lenses becomes easy, and the task of discriminating lens surfaces can be omitted.

The following is a more detailed explanation of a zoom lens according to this embodiment, illustrated by specific examples.

EXAMPLE 5

Table 13 shows a specific numerical example of a zoom lens according to this example:

TABLE 13

| Group | surface | R | d | n | ν |
|---|---|---|---|---|---|
| 1 | 1 | 56.001 | 1.40 | 1.84666 | 23.8 |
|  | 2 | 36.768 | 6.10 |  |  |
|  | 3 | −194.918 | 0.20 | 1.49700 | 81.6 |
|  | 4 | 33.753 | 3.60 | 1.69680 | 55.6 |
|  | 5 | 72.225 | variable |  |  |
| 2 | 6 | 72.225 | 0.90 | 1.88300 | 40.9 |
|  | 7 | 9.098 | 3.69 |  |  |
|  | 8 | −18.252 | 1.20 | 1.66547 | 55.2 |
|  | 9 | 20.392 | 1.00 |  |  |
|  | 10 | 19.681 | 2.60 | 1.84666 | 23.9 |
|  | 11 | −50.388 | 0.80 | 1.83500 | 42.7 |
|  | 12 | ∞ | variable |  |  |

TABLE 13-continued

| Group | surface | R | d | n | ν |
|---|---|---|---|---|---|
| ap. stop | 13 | — | 2.50 | — | — |
| 3 | 14 | 23.065 | 4.20 | 1.51450 | 63.1 |
|  | 15 | −23.065 | 0.80 |  |  |
|  | 16 | 58.000 | 1.00 | 1.80518 | 25.4 |
|  | 17 | ∞ | 3.50 |  |  |
| 4 | 18 | −39.764 | 0.90 | 1.58913 | 61.2 |
|  | 19 | 39.764 | 1.60 | 1.80518 | 25.4 |
|  | 20 | 159.802 | variable |  |  |
| 5 | 21 | 25.670 | 3.10 | 1.48749 | 70.4 |
|  | 22 | −52.204 | 1.00 | 1.84666 | 23.9 |
|  | 23 | 52.204 | 2.20 | 1.48749 | 70.4 |
|  | 24 | 52.204 | 0.20 |  |  |
|  | 25 | 37.609 | 3.10 | 1.51450 | 63.1 |
|  | 26 | −25.641 | variable |  |  |
| 6 | 27 | ∞ | 20.00 | 1.58913 | 61.2 |
|  | 28 | ∞ | 3.00 | 1.51633 | 64.1 |
|  | 29 | ∞ | — |  |  |

It should be noted that the zoom lens shown in FIG. 18 has been configured on the basis of the data in Table 13 above.

Table 14 below lists the aspheric coefficients for the zoom lens of this example.

TABLE 14

| surface | 8 | 14 | 15 | 25 | 26 |
|---|---|---|---|---|---|
| K | −5.08874E+00 | 6.68149E−01 | 6.68149E−01 | −3.95470E+00 | −6.17230E−01 |
| D | −8.90762E−05 | −3.11073E−05 | 3.11073E−05 | −1.04157E−05 | 1.87016E−05 |
| E | −4.23834E−07 | −1.73237E−08 | 1.73237E−08 | 2.96597E−08 | −3.20996E−08 |

Table 15 below lists the air distances (mm) that can be varied by zooming when the object point is located at infinity.

TABLE 15

|  | wide-angle end | Standard | tele end |
|---|---|---|---|
| F | 5.711 | 38.035 | 81.244 |
| F/No | 1.649 | 2.657 | 2.846 |
| 2ω | 57.976 | 8.956 | 4.190 |
| d5 | 1.000 | 28.000 | 34.000 |
| d10 | 35.500 | 8.500 | 2.500 |
| d14 | 10.400 | 4.411 | 9.402 |
| d19 | 2.000 | 7.989 | 2.998 |

The following are the values for the conditional expressions for the zoom lens of this example:

$$v_{d11}v_{d12}(\phi_{11}+\phi_{12})/(\phi_{11}v_{d12}+\phi_{12}v_{d11})=-66.2$$

$$dP_{g,\,F12}=0.0374$$

$$dP_{g,\,d12}=0.0476$$

$$dP_{C,\,A'12}=-0.0255$$

$$dP_{g,\,F11}-dP_{g,\,F12}=0.0177$$

$$dP_{g,\,d11}-dP_{g,\,d12}=0.0266$$

$$dP_{C,\,A'11}-dP_{C,\,A'12}=-0.0213$$

$n_{d21}=1.88300$, $v_{d21}=0.93$ $v_{dS1}v_{dS2}(\phi_{S1}+\phi_{S2})/(\phi_{S1}v_{dS2}+\phi_{S2}v_{dS1})=40.9$ $f_1/f_w=9.05$ $|f_2|/f_w=1.60$ $f_{34}/f_w=8.75$ $f_5/f_w=3.86$ FIGS. 19 to 21 are aberration graphs for the wide-angle end, the standard position and the tele end of the zoom lens in this embodiment.

As becomes clear from the aberration graphs in FIGS. 19 to 21, the zoom lens of this example has sufficient aberration correcting capability for achieving a very high resolution.

Figure 22A:
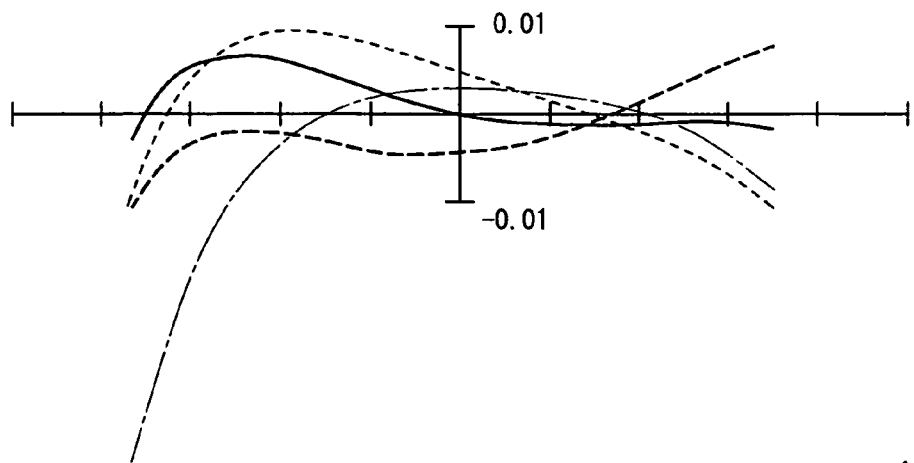
FIG. 22 shows the aberration graphs during a camera shake correction at the tele end in Example 5 of the present invention (FIG. 22A depicts the lateral aberration at a relative image height of 0.75, FIG. 22B depicts the lateral aberration at image plane center, and FIG. 22C depicts the lateral aberration at a relative image height of −0.75).
Figure 22B:
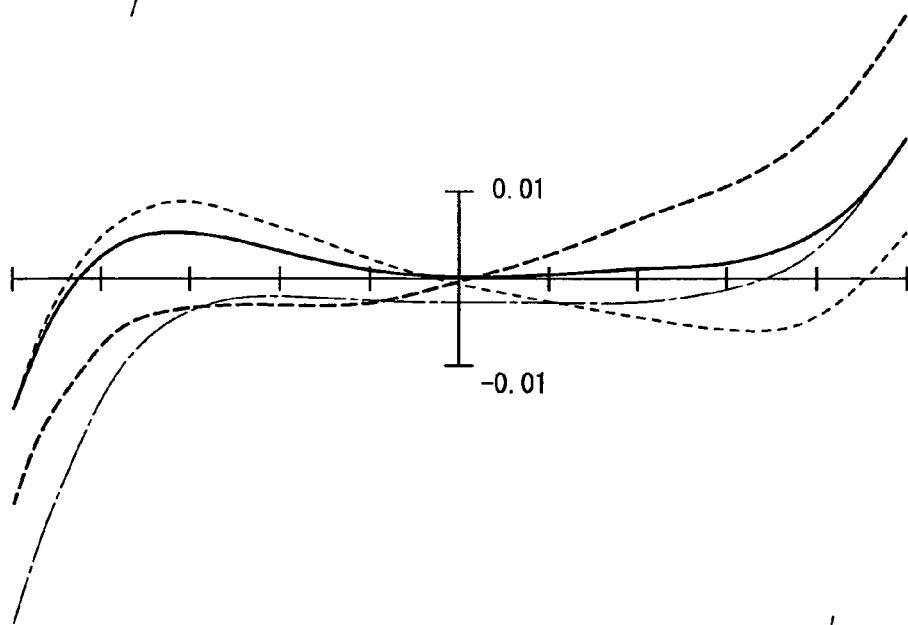
Figure 22C:
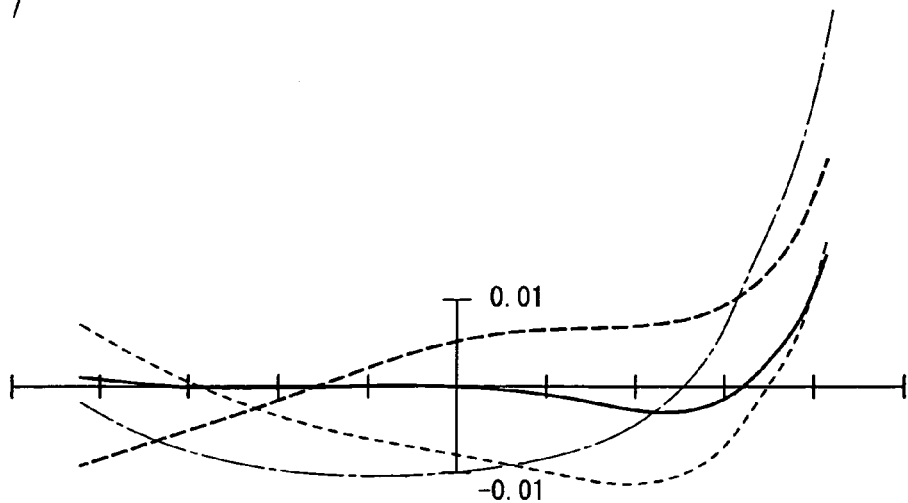

FIG. 22 shows the aberration graphs during a camera shake correction of 0.30° at the tele end.

As becomes clear from the aberration graphs shown in FIG. 22, the zoom lens of this example has favorable aberration properties even while correcting camera shake.

EXAMPLE 6

Table 16 shows a specific numerical example of a zoom lens according to this example:

TABLE 16

| Group | surface | R | D | n | ν |
|---|---|---|---|---|---|
| 1 | 1 | 56.302 | 1.40 | 1.84666 | 23.8 |
|  | 2 | 36.822 | 6.10 |  |  |
|  | 3 | −195.504 | 0.20 | 1.49700 | 81.6 |
|  | 4 | 33.804 | 3.60 | 1.69680 | 55.6 |
|  | 5 | 73.068 | variable |  |  |
| 2 | 6 | 73.068 | 0.90 | 1.83500 | 42.7 |
|  | 7 | 8.812 | 3.69 |  |  |
|  | 8 | −17.603 | 1.20 | 1.66547 | 55.2 |
|  | 9 | 20.759 | 1.00 |  |  |
|  | 10 | 19.845 | 2.60 | 1.84666 | 23.9 |
|  | 11 | −61.729 | 0.80 | 1.83500 | 42.7 |
|  | 12 | ∞ | variable |  |  |
| ap. stop | 13 | — | 2.50 | — | — |
| 3 | 14 | 22.968 | 4.20 | 1.51450 | 63.1 |
|  | 15 | −22.968 | 0.80 |  |  |
|  | 16 | 58.000 | 1.00 | 1.80518 | 25.4 |
|  | 17 | ∞ | 3.50 |  |  |
| 4 | 18 | −38.522 | 0.90 | 1.58913 | 61.2 |
|  | 19 | 38.522 | 1.60 | 1.80518 | 25.4 |
|  | 20 | 160.010 | variable |  |  |
| 5 | 21 | 25.649 | 3.10 | 1.48749 | 70.4 |
|  | 22 | −52.015 | 1.00 | 1.84666 | 23.9 |
|  | 23 | 52.015 | 2.20 | 1.48749 | 70.4 |
|  | 24 | 52.015 | 0.20 |  |  |
|  | 25 | 37.941 | 3.10 | 1.51450 | 63.1 |
|  | 26 | −25.461 | variable |  |  |
| 6 | 27 | ∞ | 20.00 | 1.58913 | 61.2 |
|  | 28 | ∞ | 3.00 | 1.51633 | 64.1 |
|  | 29 | ∞ | — |  |  |

Table 17 below lists the aspheric coefficients for the zoom lens of this example.

TABLE 17

| surface | 8 | 12 | 13 | 25 | 26 |
|---|---|---|---|---|---|
| K | −4.43897E+00 | 6.64851E−01 | 6.64851E−01 | −4.44366E+00 | −5.07981E−01 |
| D | −8.21976E−05 | −3.13313E−05 | 3.13313E−05 | −1.14632E−05 | 1.78393E−05 |
| E | −4.58309E−07 | −1.73637E−08 | 1.73637E−08 | −4.05883E−08 | −3.95075E−08 |

Table 18 below lists the air distances (mm) that can be varied by zooming when the object point is located at infinity.

TABLE 18

|  | wide-angle end | standard | tele end |
|---|---|---|---|
| F | 5.726 | 38.247 | 81.676 |
| F/No | 1.653 | 2.663 | 2.851 |
| 2ω | 57.788 | 8.908 | 4.168 |
| d5 | 1.000 | 28.000 | 34.000 |
| d10 | 35.500 | 8.500 | 2.500 |
| d14 | 10.400 | 4.379 | 9.443 |
| d19 | 2.000 | 8.021 | 2.957 |

Figures 23A, 23B, 23C, 23D, 23E:
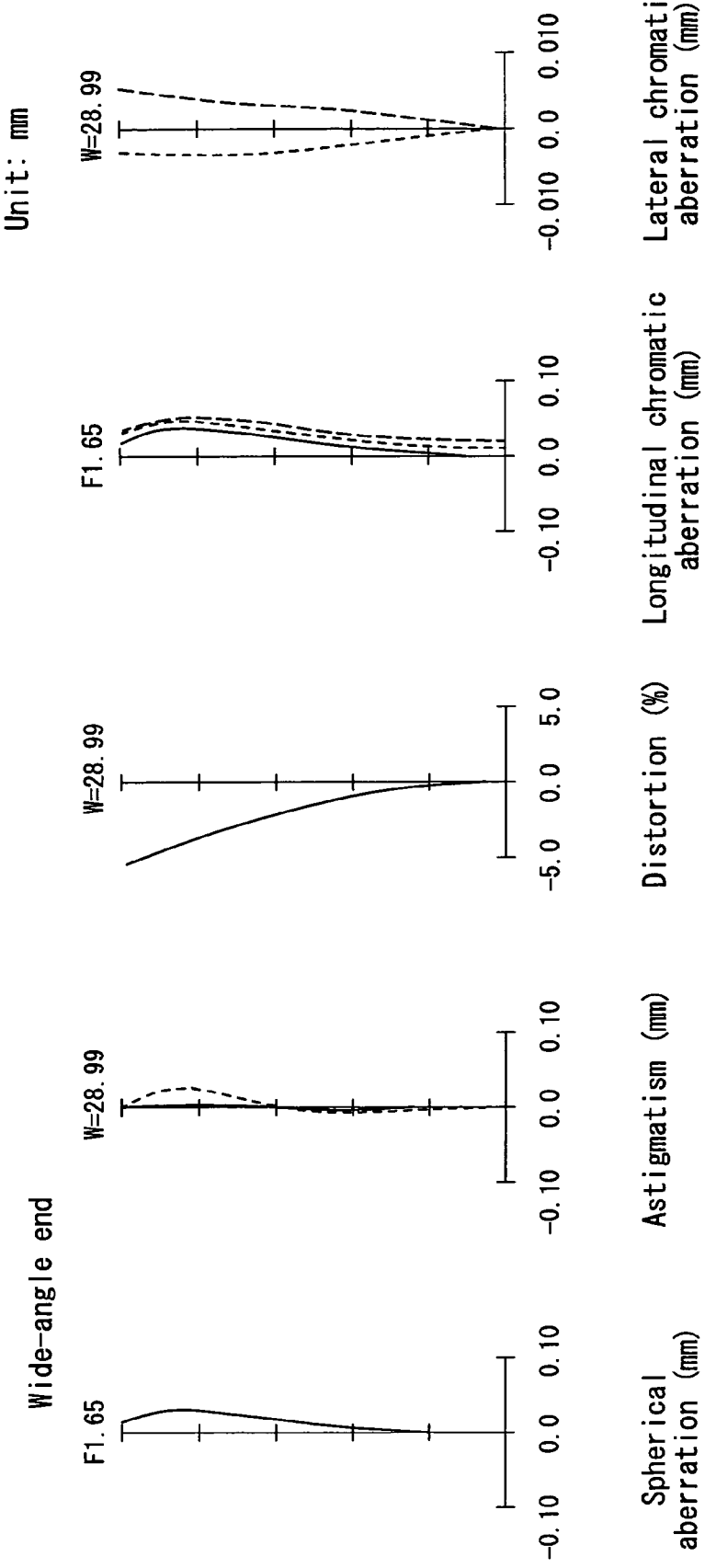
FIG. 23 shows aberration graphs for the wide-angle end of the zoom lens in Example 6 of the present invention (FIG. 23A depicts spherical aberration, FIG. 23B depicts astigmatism, FIG. 23C depicts distortion, FIG. 23D depicts longitudinal chromatic aberration, and FIG. 23E depicts lateral chromatic aberration).
Figures 24A, 24B, 24C, 24D, 24E:
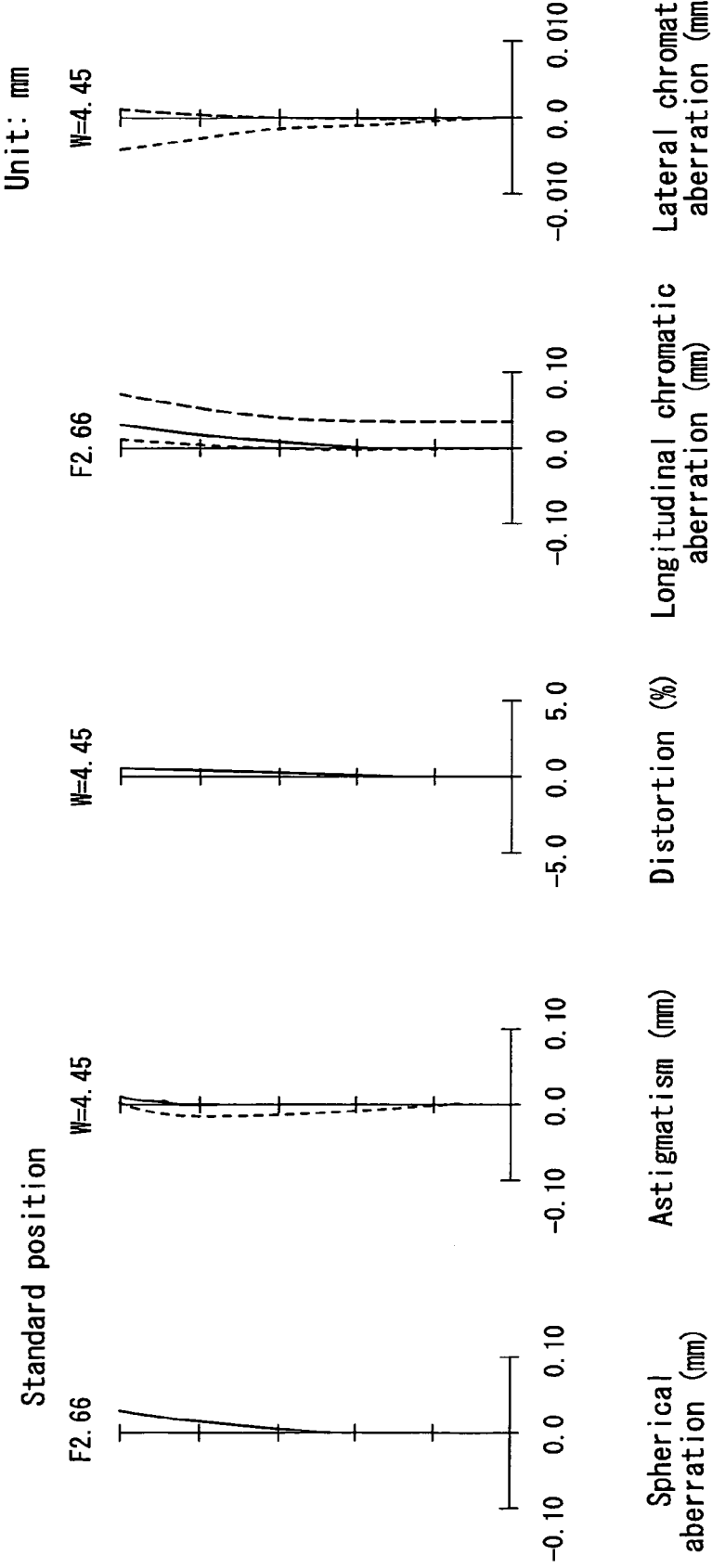
FIG. 24 shows aberration graphs for the standard position of the zoom lens in Example 6 of the present invention (FIG. 24A depicts spherical aberration, FIG. 24B depicts astigmatism, FIG. 24C depicts distortion, FIG. 24D depicts longitudinal chromatic aberration, and FIG. 24E depicts lateral chromatic aberration).

The following are the values for the conditional expressions for the zoom lens of this example:

$v_{d11}v_{d12}(\phi_{11}+\phi_{12})/(\phi_{11}v_{d12}+\phi_{12}v_{d11})=-64.6$ $dP_{g, F12}=0.0374$ $dP_{g, d12}=0.0476$ $dP_{C, A'12}=-0.0255$ $dP_{g, F11}-dP_{g, F12}=0.0177$ $dP_{g, d11}-dP_{g, d12}=0.0266$ $dP_{C, A'11}-dP_{C, A'12}=-0.0213$ $n_{d21}=1.83500$, $v_{d21}=42.7$ $v_{d22}v_{d23}(\phi_{22}+\phi_{23})/(\phi_{22}v_{d23}+\phi_{23}v_{d22})=20.9$ $f_1/f_w=9.03$ $|f_2|/f_w=1.60$ $f_{34}/f_w=8.74$ $f_5/f_w=3.85$ FIGS. 23 to 25 are aberration graphs for the wide-angle end, the standard position and the tele end of the zoom lens in this embodiment.

As becomes clear from the aberration graphs in FIGS. 23 to 25, the zoom lens of this example has sufficient aberration correcting capability for achieving a very high resolution.

Figure 26A:
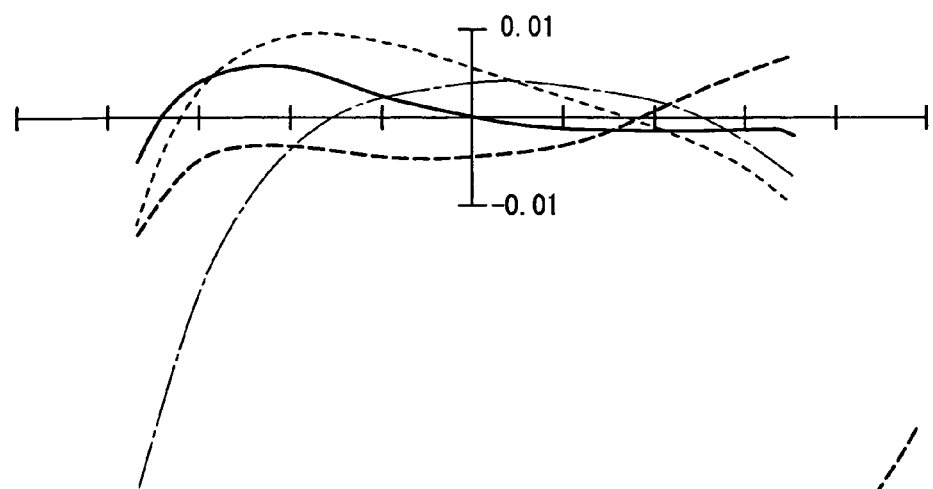
FIG. 26 shows the aberration graphs during a camera shake correction at the tele end in Example 6 of the present invention (FIG. 26A depicts the lateral aberration at a relative image height of 0.75, FIG. 26B depicts the lateral aberration at image plane center, and FIG. 26C depicts the lateral aberration at a relative image height of −0.75).
Figure 26B:
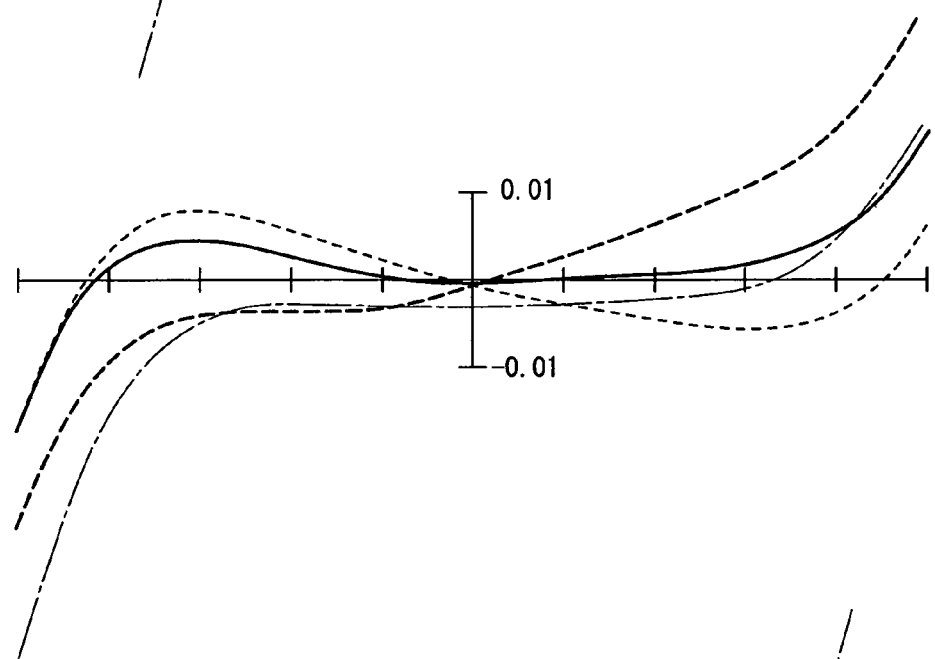
Figure 26C:
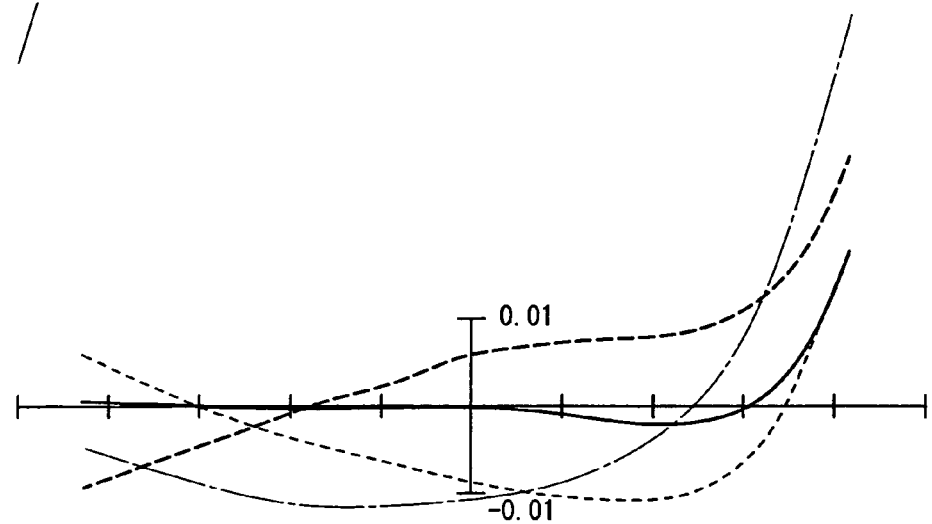

FIG. 26 shows the aberration graphs during a camera shake correction of 0.30° at the tele end.

As becomes clear from the aberration graphs shown in FIG. 26, the zoom lens of this example has favorable aberration properties even while correcting camera shake.

Third Embodiment

Figure 27:
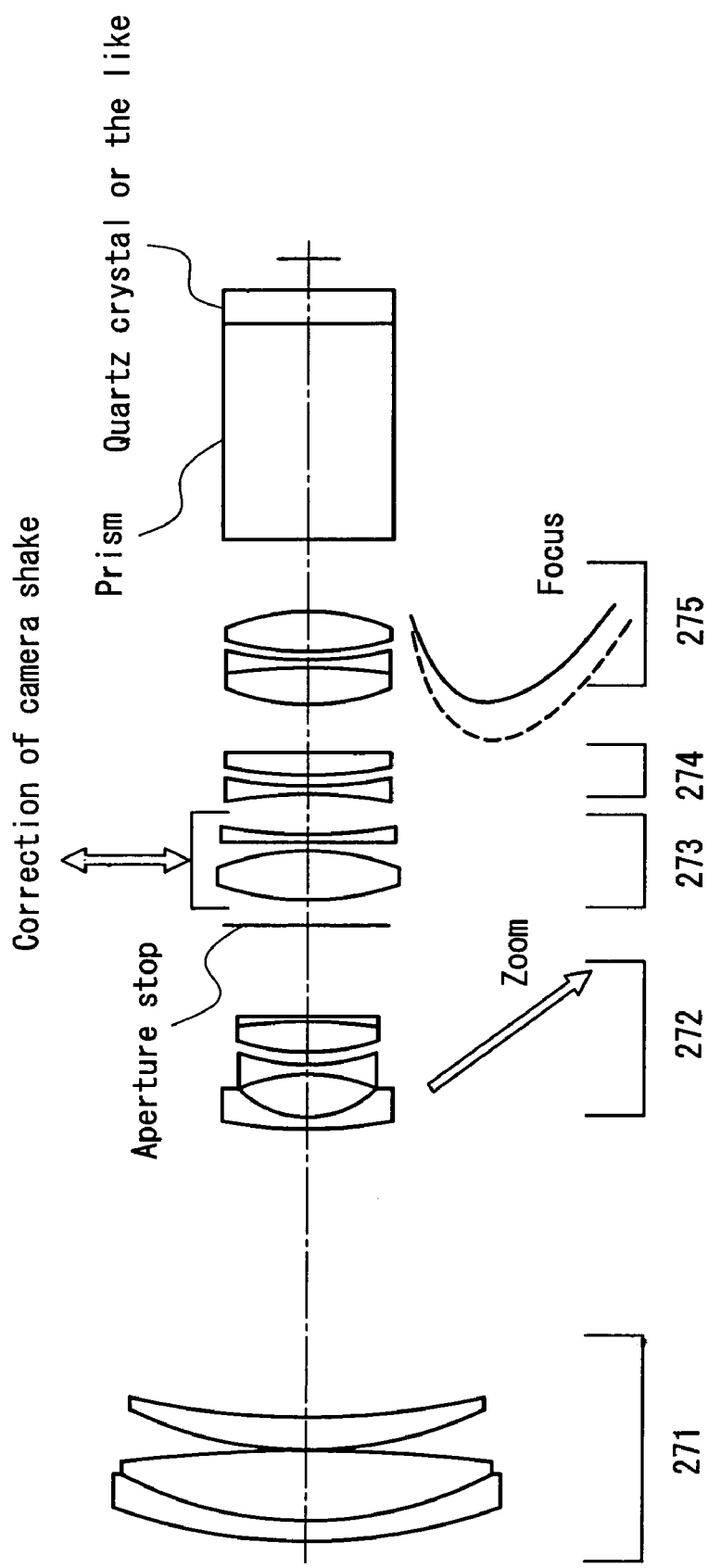
FIG. 27 is a layout drawing illustrating the configuration of a zoom lens according to a third embodiment of the present invention.

FIG. 27 is a layout drawing illustrating the configuration of a zoom lens according to a third embodiment of the present invention.

As shown in FIG. 27, the zoom lens according to this embodiment includes a first lens group 271 having an overall positive refractive power, a second lens group 272 having an overall negative refractive power, an aperture stop, a third lens group 273 having an overall positive refractive power, a fourth lens group 274 having an overall negative refractive power, and a fifth lens group 275 having an overall positive refractive power, arranged in that order from the object side (on the left in FIG. 27) to the image plane side (on the right in FIG. 27).

The first lens group 271 is made of a cemented lens including a lens having negative refractive power and a lens having positive refractive power, and a lens having positive refractive power, arranged in that order from the object side. When zooming or focusing, the first lens group 271 stays fixed with respect to the image plane.

The second lens group 272 is made of four lenses, namely a negative meniscus lens, a double concave lens, and a cemented lens including a convex lens and a concave lens, arranged in that order from the object side. The zoom operation is carried out by shifting the second lens group 272 on the optical axis.

The aperture stop is fixed with respect to the image plane.

The third lens group 273 is made of a lens having positive refractive power and a lens having negative refractive power, arranged in that order from the object side, and stays fixed with respect to the optical axis direction when zooming or focusing. The third lens group 273 can be shifted in its entirety in a direction perpendicular to the optical axis in order to correct image fluctuations during camera shake. That is to say, when camera shake occurs, image shake is corrected by shifting the third lens group 273 in a direction perpendicular to the optical axis.

The fourth lens group 274 is made of a lens having negative refractive power and a lens having positive refractive power, arranged in that order from the object side, and stays fixed with respect to the image plane when zooming or focusing. More specifically, the fourth lens group 274 is made of two single lenses, namely a concave lens and a convex lens.

The fifth lens group 275 is made of three lenses, namely a cemented lens including a double convex lens and a double concave lens, and a convex lens, arranged in that order from the object side. The fifth lens group 275 is shifted on the optical axis in order to maintain the image plane, which fluctuates when the second lens group 272 is shifted on the optical axis and when the object moves, at a certain position from a reference plane.

In the first lens group 271 in the zoom lens of this embodiment, when $\phi_{11}$ is the power of the lens on the object side in the cemented lens of the first lens group 271, $\phi_{12}$ is the power of the lens on the image plane side in the cemented lens of the first lens group 271, $\nu_{d11}$ is the Abbe number of the lens on the object side in the cemented lens of the first lens group 271, and $\nu_{d12}$ is the Abbe number of the lens on the image plane side in the cemented lens of the first lens group 271, then, as in the first embodiment, the condition of the following Expression 80 is satisfied:

$$-75 < \nu_{d11}\nu_{d12}(\phi_{11}+\phi_{12})/(\phi_1 \nu_{d12}+\phi_{12}\nu_{d11}) < -50. \quad \text{Expression 80}$$

Also in this embodiment, as in the first embodiment, it is desirable that the conditions of the Expressions 54 and 57 to 77 are satisfied.

Also in this embodiment, as in the first embodiment, it is desirable that the second lens group 272 includes at least one aspherical surface.

Also in this embodiment, as in the first embodiment, it is desirable that the third lens group 273 includes at least one aspherical surface.

Also in this embodiment, as in the first embodiment, it is desirable that the fifth lens group 275 includes at least one aspherical surface.

The following is a more detailed explanation of a zoom lens according to this embodiment, illustrated by specific examples.

EXAMPLE 7

Table 19 shows a specific numerical example of a zoom lens according to this example:

TABLE 19

| Group | surface | r | D | n | ν |
|---|---|---|---|---|---|
| 1 | 1 | 63.676 | 1.40 | 1.84666 | 23.8 |
|   | 2 | 38.305 | 6.10 |   |   |
|   | 3 | −233.383 | 0.20 | 1.56907 | 71.3 |
|   | 4 | 33.723 | 3.60 | 1.69680 | 55.6 |
|   | 5 | 69.568 | variable |   |   |
| 2 | 6 | 69.568 | 0.90 | 1.83500 | 42.7 |
|   | 7 | 8.874 | 3.69 |   |   |
|   | 8 | −17.726 | 1.20 | 1.66547 | 55.2 |
|   | 9 | 18.937 | 1.00 |   |   |
|   | 10 | 19.090 | 2.60 | 1.84666 | 23.9 |
|   | 11 | −59.936 | 0.80 | 1.83500 | 42.7 |
|   | 12 | ∞ | variable |   |   |
| ap. stop | 13 | — | 2.50 | — | — |
| 3 | 14 | 23.348 | 4.20 | 1.51450 | 63.1 |
|   | 15 | −23.348 | 0.80 |   |   |
|   | 16 | 58.000 | 1.00 | 1.80518 | 25.4 |
|   | 17 | ∞ | 3.50 |   |   |
| 4 | 18 | −42.639 | 0.90 | 1.58913 | 61.2 |
|   | 19 | 41.229 | 1.00 |   |   |
|   | 20 | 42.530 | 1.60 | 1.80518 | 25.4 |
|   | 22 | 195.297 | variable |   |   |
| 5 | 23 | 20.821 | 3.10 | 1.48749 | 70.4 |
|   | 24 | −87.601 | 1.00 | 1.84666 | 23.9 |
|   | 25 | 34.883 | 1.00 |   |   |
|   | 26 | 20.540 | 3.50 | 1.51450 | 63.1 |
|   | 27 | −18.477 | variable |   |   |
| 6 | 28 | ∞ | 20.00 | 1.58913 | 61.2 |
|   | 29 | ∞ | 3.00 | 1.51633 | 64.1 |
|   | 30 | ∞ | — |   |   |

It should be noted that the zoom lens shown in FIG. 27 has been configured on the basis of the data in Table 19 above.

Table 20 below lists the aspheric coefficients for the zoom lens of this example.

TABLE 20

| Surface | 8 | 14 | 15 | 26 | 27 |
|---|---|---|---|---|---|
| K | −3.71290E+00 | 6.67663E−01 | 6.67663E−01 | −3.46239E+00 | −1.11523E+00 |
| D | −6.66300E−05 | −2.92599E−05 | 2.92599E−05 | 1.34147E−05 | 2.89817E−05 |
| E | −4.79365E−07 | −2.78758E−08 | 2.78758E−08 | −2.59285E−07 | −2.43621E−07 |

Table 21 below lists the air distances (mm) that can be varied by zooming when the object point is located at infinity.

TABLE 21

|  | wide-angle end | Standard | tele end |
|---|---|---|---|
| F | 5.630 | 34.940 | 80.687 |
| F/No | 1.624 | 2.556 | 2.789 |
| 2ω | 58.646 | 9.736 | 4.884 |
| d5 | 1.000 | 27.496 | 34.000 |
| d10 | 35.500 | 9.004 | 2.500 |
| d14 | 10.400 | 4.773 | 9.672 |
| d19 | 2.000 | 7.627 | 2.729 |

The following are the values for the conditional expressions for the zoom lens of this example:

$$\nu_{d11}\nu_{d12}(\phi_{11}+\phi_{12})/(\phi_{11}\nu_{d12}+\phi_{12}\nu_{d11})=-72.3$$

$$dP_{g,F12}=0.0145$$

$$dP_{g,d12}=0.0233$$

$$dP_{C,A'12}=-0.0220$$

$$dP_{g,F11}-dP_{g,F12}=-0.0052$$

$$dP_{g,d11}-dP_{g,d12}=0.0023$$

$$dP_{C,A'11}-dP_{C,A'12}=-0.0178$$

$$n_{d21}=1.83500, \nu_{d21}=42.7$$

$$\nu_{d22}\nu_{d23}(\phi_{22}+\phi_{23})/(\phi_{22}\nu_{d23}+\phi_{23}\nu_{d22})=21.0$$

$$f_1/f_w=9.18$$

$$|f_2|/f_w=1.63$$

$$f_{34}/f_w=9.05$$

$$f_5/f_w=3.92$$

Figures 28A, 28B, 28C, 28D, 28E:
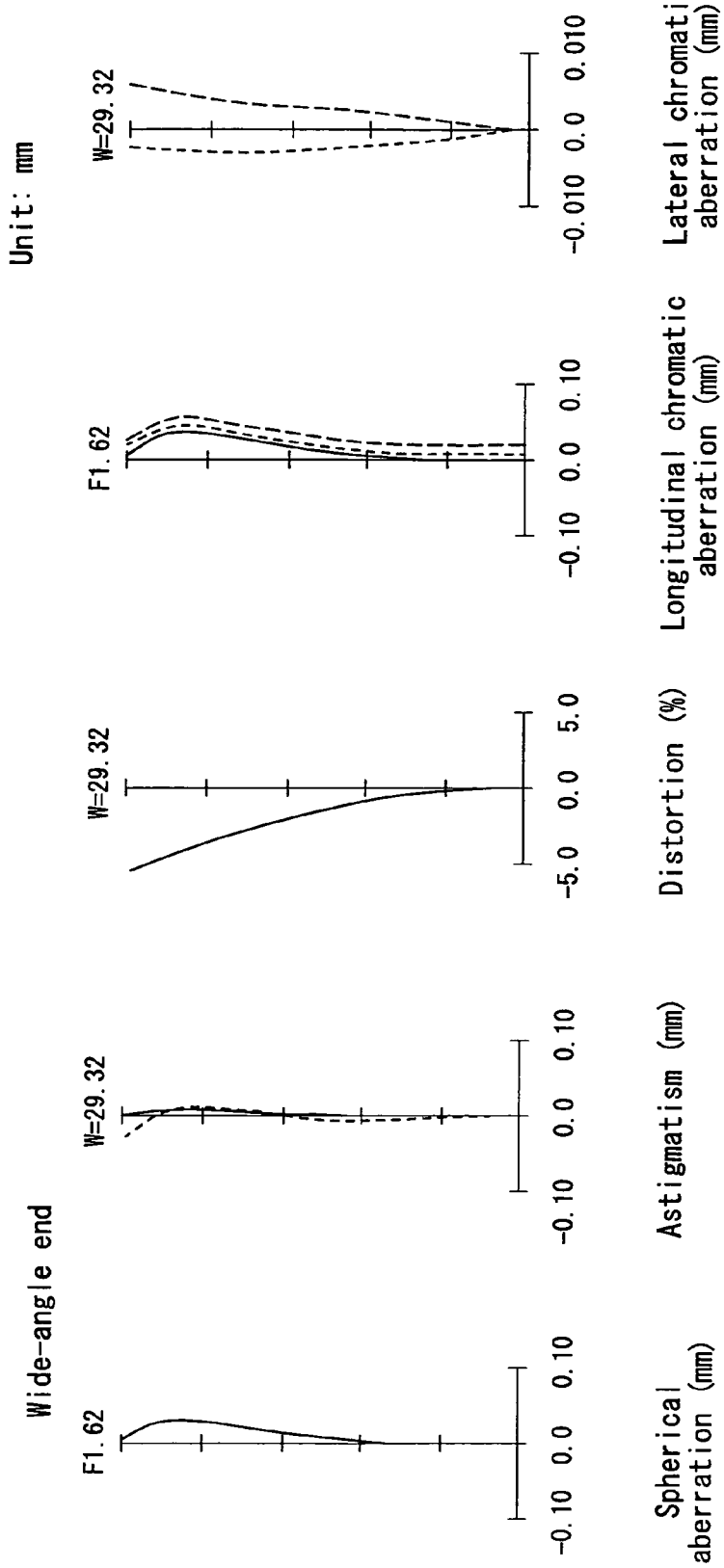
FIG. 28 shows aberration graphs for the wide-angle end of the zoom lens in Example 7 of the present invention (FIG. 28A depicts spherical aberration, FIG. 28B depicts astigmatism, FIG. 28C depicts distortion, FIG. 28D depicts longitudinal chromatic aberration, and FIG. 28E depicts lateral chromatic aberration).

FIGS. 28 to 30 are aberration graphs for the wide-angle end, the standard position and the tele end of the zoom lens in this embodiment.

As becomes clear from the aberration graphs in FIGS. 28 to 30, the zoom lens of this example has sufficient aberration correcting capability for achieving a very high resolution.

Figure 31A:
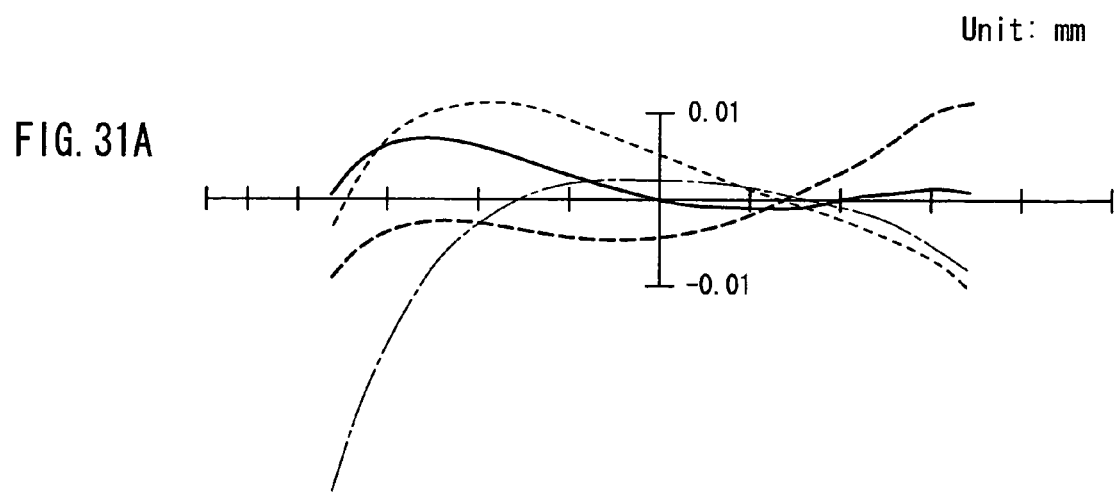
FIG. 31 shows the aberration graphs during a camera shake correction at the tele end in Example 7 of the present invention (FIG. 31A depicts the lateral aberration at a relative image height of 0.75, FIG. 31B depicts the lateral aberration at image plane center, and FIG. 31C depicts the lateral aberration at a relative image height of −0.75).
Figure 31B:
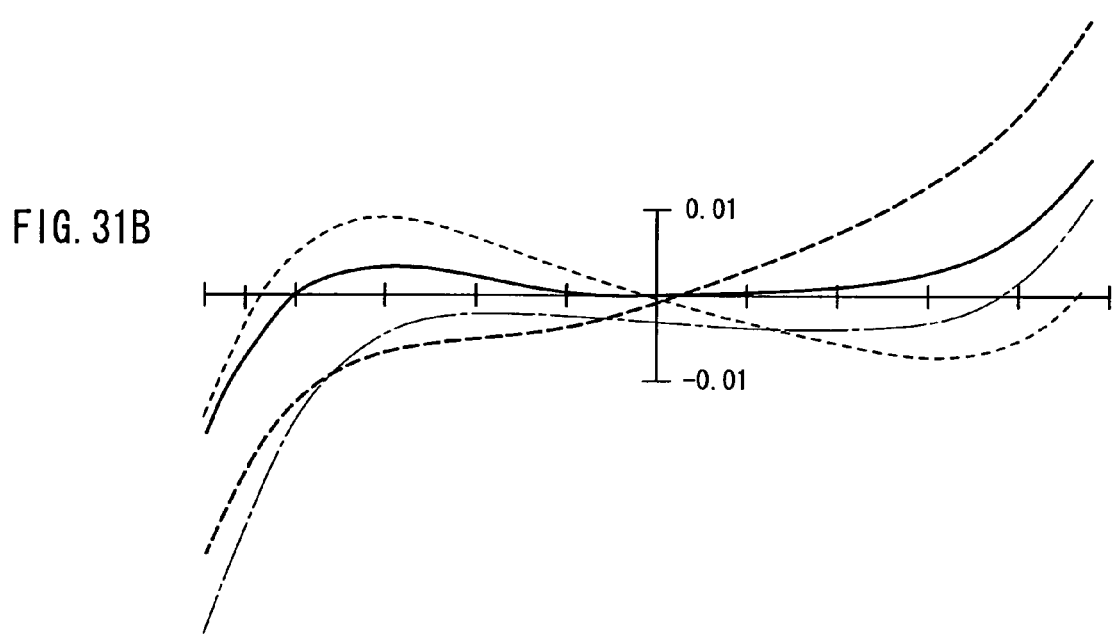
Figure 31C:
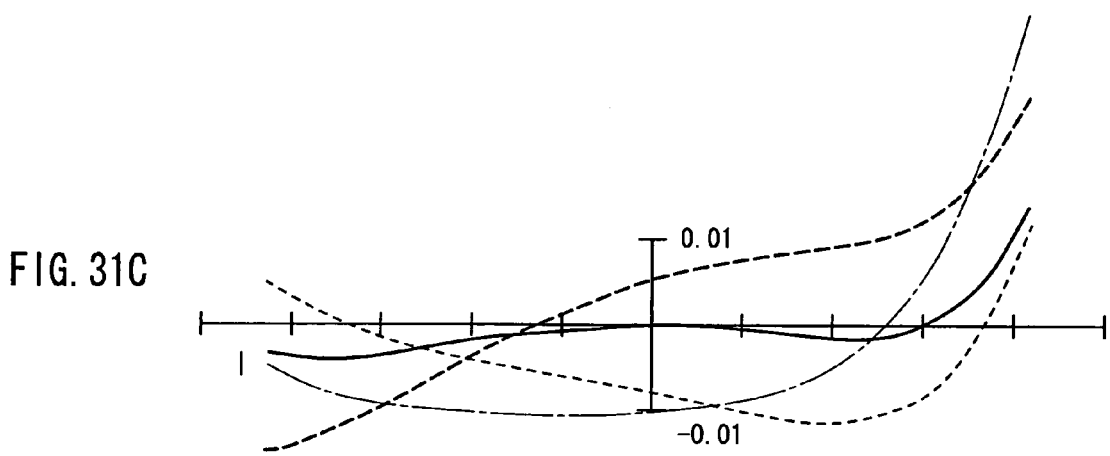

FIG. 31 shows the aberration graphs during a camera shake correction of 0.34° at the tele end.

As becomes clear from the aberration graphs shown in FIG. 31, the zoom lens of this example has favorable aberration properties even while correcting camera shake.

Fourth Embodiment

Figure 32:
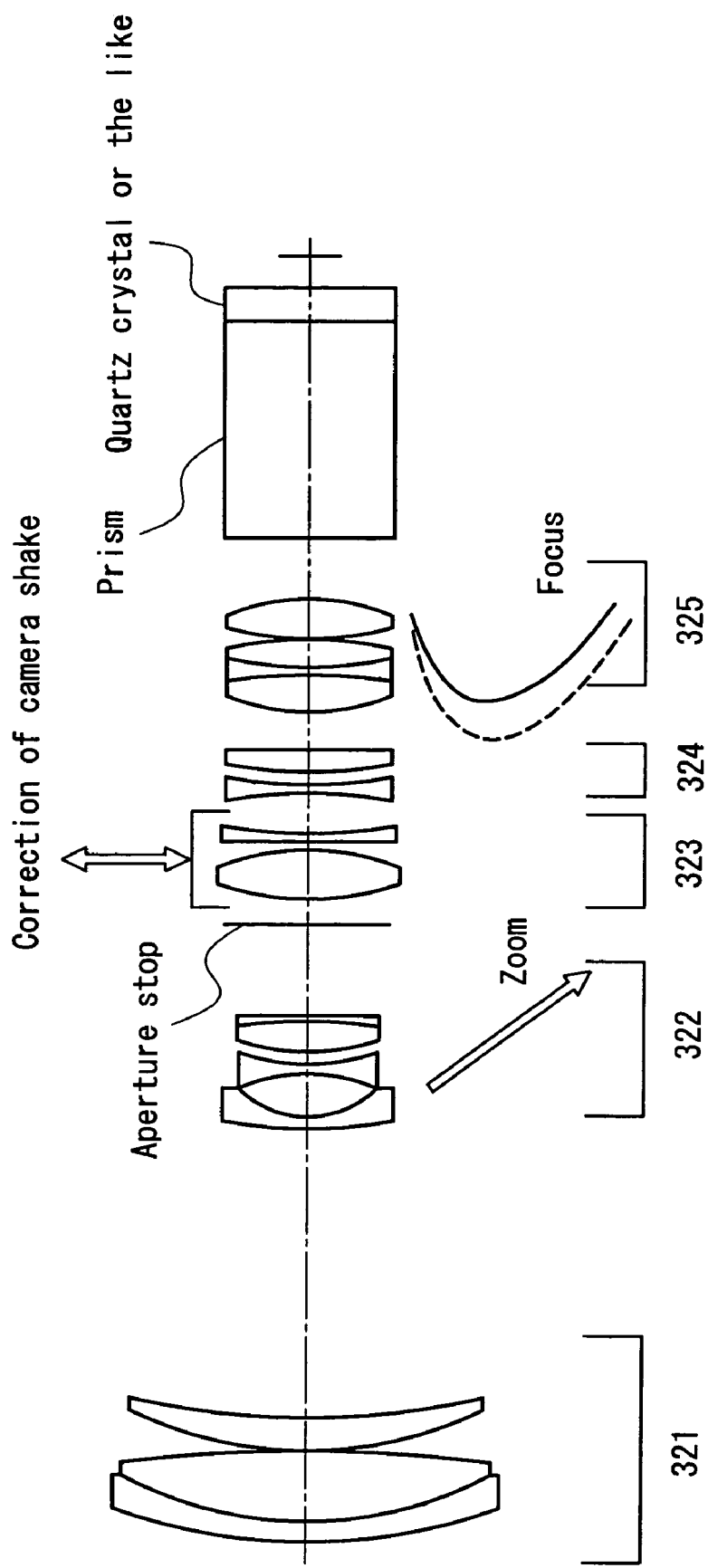
FIG. 32 is a layout drawing illustrating the configuration of a zoom lens according to a fourth embodiment of the present invention.

FIG. 32 is a layout drawing illustrating the configuration of a zoom lens according to a fourth embodiment of the present invention.

As shown in FIG. 32, the zoom lens according to this embodiment includes a first lens group 321 having an overall positive refractive power, a second lens group 322 having an overall negative refractive power, an aperture stop, a third lens group 323 having an overall positive refractive power, a fourth lens group 324 having an overall negative refractive power, and a fifth lens group 325 having an overall positive refractive power, arranged in that order from the object side (on the left in FIG. 32) to the image plane side (on the right in FIG. 32).

The first lens group 321 is made of a cemented lens including a lens having negative refractive power and a lens having positive refractive power, and a lens having positive refractive power, arranged in that order from the object side. When zooming or focusing, the first lens group 321 stays fixed with respect to the image plane.

The second lens group 322 is made of four lenses, namely a negative meniscus lens, a double concave lens, and a cemented lens including a convex lens and a concave lens, arranged in that order from the object side. The zoom operation is carried out by shifting the second lens group 322 on the optical axis.

The aperture stop is fixed with respect to the image plane.

The third lens group 323 is made of a lens having positive refractive power and a lens having negative refractive power, arranged in that order from the object side, and stays fixed with respect to the optical axis direction when zooming or focusing. The third lens group 323 can be shifted in its entirety in a direction perpendicular to the optical axis in order to correct image fluctuations during camera shake. That is to say, when camera shake occurs, image shake is corrected by shifting the third lens group 323 in a direction perpendicular to the optical axis.

The fourth lens group 324 is made of a lens having negative refractive power and a lens having positive refractive power, arranged in that order from the object side, and stays fixed with respect to the image plane when zooming or focusing. More specifically, the fourth lens group 324 is made of two single lenses, namely a concave lens and a convex lens.

The fifth lens group 325 is made of four lenses, namely a cemented lens triplet including a double convex lens, a double concave lens and a double convex lens, as well as a convex lens, arranged in that order from the object side. The fifth lens group 325 is shifted on the optical axis in order to maintain the image plane, which fluctuates when the second lens group 322 is shifted on the optical axis and when the object moves, at a certain position from a reference plane.

In the first lens group 321 in the zoom lens of this embodiment, when $\phi_{11}$ is the power of the lens on the object side in the cemented lens of the first lens group 321, $\phi_{12}$ is the power of the lens on the image plane side in the cemented lens of the first lens group 321, $\nu_{d11}$ is the Abbe number of the lens on the object side in the cemented lens of the first lens group 321, and $\nu_{d12}$ is the Abbe number of the lens on the image plane side in the cemented lens of the first lens group 321, then, as in the first embodiment, the condition of the following Expression 81 is satisfied:

$$-75<\nu_{d11}\nu_{d12}(\phi_{11}+\phi_{12})/(\phi_{11}\nu_{d12}+\phi_{12}\nu_{d11})<-50. \quad \text{Expression 81}$$

Also in this embodiment, as in the first embodiment, it is desirable that the conditions of the Expressions 54, and 57 to 77 are satisfied.

Also in this embodiment, as in the first embodiment, it is desirable that the second lens group 322 includes at least one aspherical surface.

Also in this embodiment, as in the first embodiment, it is desirable that the third lens group 323 includes at least one aspherical surface.

Also in this embodiment, as in the first embodiment, it is desirable that the fifth lens group 325 includes at least one aspherical surface.

The following is a more detailed explanation of a zoom lens according to this embodiment, illustrated by specific examples.

EXAMPLE 8

Table 22 shows a specific numerical example of a zoom lens according to this example:

TABLE 22

| Group | Surface | r | d | n | ν |
|---|---|---|---|---|---|
| 1 | 1 | 55.986 | 1.40 | 1.84666 | 23.8 |
| | 2 | 36.879 | 6.10 | | |
| | 3 | −202.717 | 0.20 | 1.49700 | 81.6 |
| | 4 | 34.092 | 3.60 | 1.69680 | 55.6 |
| | 5 | 74.490 | variable | | |
| 2 | 6 | 74.490 | 0.90 | 1.88300 | 40.9 |
| | 7 | 9.216 | 3.69 | | |
| | 8 | −18.253 | 1.20 | 1.66547 | 55.2 |
| | 9 | 19.928 | 1.00 | | |
| | 10 | 19.654 | 2.60 | 1.84666 | 23.9 |
| | 11 | −46.167 | 0.80 | 1.83500 | 42.7 |
| | 12 | ∞ | variable | | |
| ap. stop | 13 | — | 2.50 | — | — |
| 3 | 14 | 22.731 | 4.20 | 1.51450 | 63.1 |
| | 15 | −22.731 | 0.80 | | |
| | 16 | 58.000 | 1.00 | 1.80518 | 25.4 |
| | 17 | ∞ | 3.50 | | |
| 4 | 18 | −40.021 | 0.90 | 1.58913 | 61.2 |
| | 19 | 39.764 | 1.50 | | |
| | 20 | 45.156 | 1.60 | 1.80518 | 25.4 |
| | 22 | 203.124 | variable | | |
| 5 | 23 | 25.611 | 3.10 | 1.48749 | 70.4 |
| | 24 | −54.019 | 1.00 | 1.84666 | 23.9 |
| | 25 | 54.019 | 2.20 | 1.48749 | 70.4 |
| | 26 | −54.019 | 0.20 | | |
| | 27 | 37.555 | 3.10 | 1.51450 | 63.1 |
| | 28 | −25.867 | variable | | |
| 6 | 29 | ∞ | 20.00 | 1.58913 | 61.2 |
| | 30 | ∞ | 3.00 | 1.51633 | 64.1 |
| | 31 | ∞ | — | | |

It should be noted that the zoom lens shown in FIG. 32 has been configured on the basis of the data in Table 22 above.

Table 23 below lists the aspheric coefficients for the zoom lens of this example.

TABLE 23

| surface | 8 | 12 | 13 | 27 | 28 |
|---|---|---|---|---|---|
| K | −4.93260E+00 | 6.32215E−01 | 6.32215E−01 | −4.07752E+00 | −5.60049E−01 |
| D | −8.57073E−05 | −3.17621E−05 | 3.17621E−05 | −1.05881E−05 | 1.82421E−05 |
| E | −4.33161E−07 | −1.80095E−08 | 1.80095E−08 | −2.93650E−08 | −3.09103E−08 |

Table 24 below lists the air distances (mm) that can be varied by zooming when the object point is located at infinity.

TABLE 24

| | wide-angle end | standard | tele end |
|---|---|---|---|
| f | 5.626 | 34.989 | 79.748 |
| F/No | 1.629 | 2.551 | 2.791 |
| 2ω | 58.862 | 9.724 | 4.968 |
| d5 | 1.000 | 27.604 | 34.000 |
| d10 | 35.500 | 8.896 | 2.500 |
| d14 | 10.400 | 4.710 | 9.425 |
| d19 | 2.000 | 7.690 | 2.975 |

The following are the values for the conditional expressions for the zoom lens of this example:

$\nu_{d11}\nu_{d12}(\phi_{11}+\phi_{12})/(\phi_{11}\nu_{d12}+\phi_{12}\nu_{d11})=-66.7$ $dP_{g, F12}=0.0374$ $dP_{g, d12}=0.0476$ $dP_{C, A'12}=-0.0255$ $dP_{g, F11}-dP_{g, F12}=0.0177$ $dP_{g, d11}-dP_{g, d12}=0.0266$ $dP_{C, A'11}-dP_{C, A'12}=-0.0213$ $n_{d21}=1.83500, \nu_{d21}=42.7$ $\nu_{d22}\nu_{d23}(\phi_{22}+\phi_{23})/(\phi_{22}\nu_{d23}+\phi_{23}\nu_{d22})=20.1$ $f_1/f_w=9.19$ $|f_2|/f_w=1.63$ $f_{34}/f_w=9.10$ $f_5/f_w=3.92$ FIGS. 33 to 35 are aberration graphs for the wide-angle end, the standard position and the tele end of the zoom lens in this embodiment.

As becomes clear from the aberration graphs in FIGS. 33 to 35, the zoom lens of this example has sufficient aberration correcting capability for achieving a very high resolution.

Figure 36A:
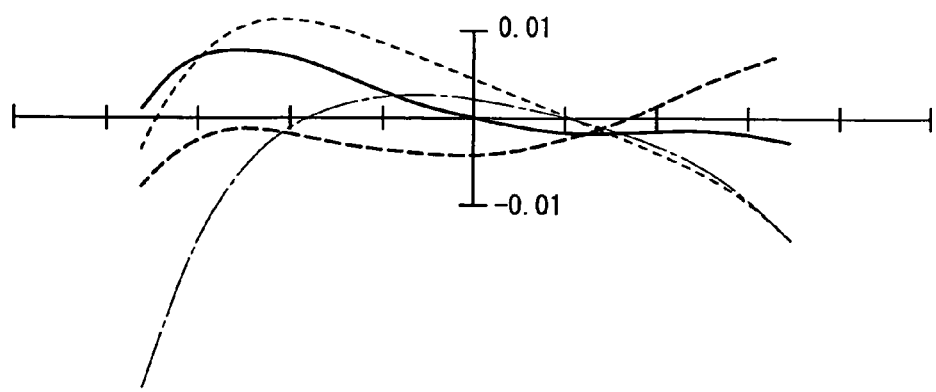
FIG. 36 shows the aberration graphs during a camera shake correction at the tele end in Example 8 of the present invention (FIG. 36A depicts the lateral aberration at a relative image height of 0.75, FIG. 36B depicts the lateral aberration at image plane center, and FIG. 36C depicts the lateral aberration at a relative image height of −0.75).
Figure 36B:
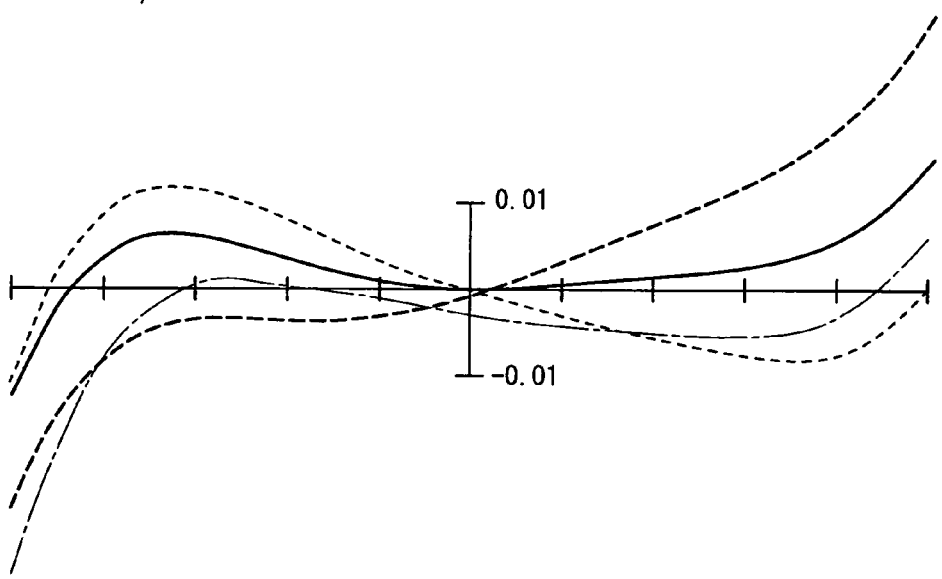
Figure 36C:
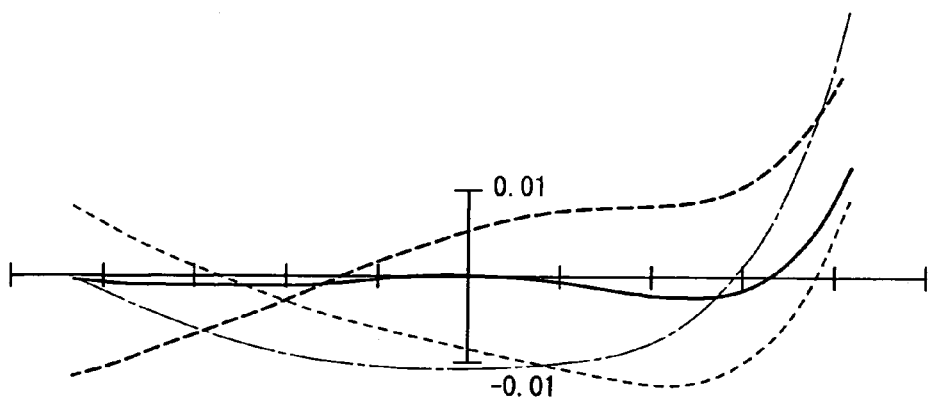

FIG. 36 shows the aberration graphs during a camera shake correction of 0.36° at the tele end.

As becomes clear from the aberration graphs shown in FIG. 36, the zoom lens of this example has favorable aberration properties even while correcting camera shake.

Fifth Embodiment

FIG. 37 is a layout drawing illustrating the configuration of a video camera (three-images video camera equipped with a camera shake correction function) according to a fifth embodiment of the present invention.

As shown in FIG. 37, the video camera according to this embodiment includes a zoom lens 371, a low-pass filter 372, color separation prisms 373a to 373c, imaging elements 374a to 374c, a viewfinder 376, a sensor 377 for detecting camera shake, and an actuator 378 for driving the lens. Here, the zoom lens of the first embodiment (see FIG. 1) is used as the zoom lens 371, and thus a compact video camera with high-performance camera shake correction can be realized.

It should be noted that in this embodiment, the zoom lens of the first embodiment as shown in FIG. 1 was used, but it is also possible to use any of the zoom lenses of the second to fourth embodiments instead.

Furthermore, in the above embodiments, the correction of camera shake was performed by shifting a lens group having a positive refractive power, but the same effect can also be attained when a lens group having a negative refractive power is shifted to correct camera shake.

INDUSTRIAL APPLICABILITY

With the present invention as explained above, it is possible to realize a zoom lens with which camera shake can be corrected and that can be made smaller and lighter, and using this zoom lens, it is possible to realize a compact video camera provided with a high-performance camera shake correction function.

What is claimed is:

1. A zoom lens comprising:
a first lens group that is made of a cemented lens including a lens having negative refractive power and a lens having positive refractive power, as well as a lens having positive refractive power, arranged in that order from an object side to an image plane side, the first lens group having an overall positive refractive power and being fixed with respect to an image plane;
a second lens group having an overall negative refractive power, a zoom operation being carried out by shifting the second lens group on an optical axis;
an aperture stop that is fixed with respect to the image plane;
a third lens group that is made of a lens having positive refractive power and a lens having negative refractive power, arranged in that order from the object side to the image plane side, the third lens group having an overall positive refractive power and being fixed with respect to the optical axis direction when zooming or focusing;
a fourth lens group that is made of a lens having negative refractive power and a lens having positive refractive power, arranged in that order from the object side to the image plane side, the fourth lens group having an overall negative refractive power and being fixed with respect to the image plane; and
a fifth lens group that has an overall positive refractive power and that is shifted on the optical axis so as to maintain the image plane, which fluctuates when the second lens group is shifted on the optical axis and when the object moves, at a certain position from a reference plane;
wherein the second lens group is made of four lenses, including a negative meniscus lens, a double concave lens, and a cemented lens made of a convex lens and a concave lens, arranged in that order from the object side to the image plane side;
wherein the third lens group can be shifted in a direction perpendicular to the optical axis in order to correct image fluctuations during camera shake;
wherein the fourth lens group is made of a cemented lens including a convex lens and a concave lens;
wherein the fifth lens group is made of three lenses, including a cemented lens made of a double convex lens and a double concave lens, and a convex lens; and
wherein, when $\phi_{11}$ is the power of the lens on the object side in the cemented lens of the first lens group, $\phi_{12}$ is the power of the lens on the image plane side in the cemented lens of the first lens group, $v_{d11}$ is the Abbe number of the lens on the object side in the cemented lens of the first lens group, and $v_{d12}$ is the Abbe number of the lens on the image plane side in the cemented lens of the first lens group, then the first lens group satisfies the condition of the following Expression 1:

$$-75 < v_{d11}v_{d12}(\phi_{11}+\phi_{12})/(\phi_{11}v_{d12}+\phi_{12}v_{d11}) < -50. \quad \text{Expression 1.}$$

2. The zoom lens according to claim 1, wherein, when in the cemented lens of the fifth lens group, $r_{51}$ is the radius of curvature of a surface furthest toward the object side, $n_{d51}$ is the refractive index of the lens on the object side, $r_{52}$ is the radius of curvature of a surface furthest to the image plane side, and $n_{d52}$ is the refractive index of the lens on the image plane side, then the condition of the following Expression 2 is satisfied:

$$0.85 < (n_{d51}-1)r_{52}/(n_{d52}-1)r_{51} < 1.2. \quad \text{Expression 2.}$$

3. The zoom lens according to claim 1, wherein, when in the cemented lens of the fifth lens group, $\phi_{51}$ is the power of the lens on the object side, $\phi_{52}$ is the power of the lens on the image plane side, $v_{d51}$ is the Abbe number of the lens on the object side, and $v_{d52}$ is the Abbe number of the lens on the image plane side, then the condition of the following Expression 3 is satisfied:

$$2.0 < v_{d51}v_{d52}(\phi_{51}+\phi_{52})/(\phi_{51}v_{d52}+\phi_{52}v_{d51}) < 8.0. \quad \text{Expression 3.}$$

4. A zoom lens comprising:
a first lens group that is made of a cemented lens including a lens having negative refractive power and a lens having positive refractive power, as well as a lens having positive refractive power, arranged in that order from an object side to an image plane side, the first lens group having an overall positive refractive power and being fixed with respect to an image plane;
a second lens group having an overall negative refractive power, a zoom operation being carried out by shifting the second lens group on an optical axis;
an aperture stop that is fixed with respect to the image plane;
a third lens group that is made of a lens having positive refractive power and a lens having negative refractive power, arranged in that order from the object side to the image plane side, the third lens group having an overall positive refractive power and being fixed with respect to the optical axis direction when zooming or focusing;
a fourth lens group that is made of a lens having negative refractive power and a lens having positive refractive power, arranged in that order from the object side to the image plane side, the fourth lens group having an overall negative refractive power and being fixed with respect to the image plane; and
a fifth lens group that has an overall positive refractive power and that is shifted on the optical axis so as to maintain the image plane, which fluctuates when the second lens group is shifted on the optical axis and when the object moves, at a certain position from a reference plane;
wherein the second lens group is made of four lenses, including a negative meniscus lens, a double concave lens, and a cemented lens made of a convex lens and a concave lens, arranged in that order from the object side to the image plane side;
wherein the third lens group can be shifted in a direction perpendicular to the optical axis in order to correct image fluctuations during camera shake;
wherein the fourth lens group is made of a cemented lens including a convex lens and a concave lens;
wherein the fifth lens group is made of four lenses, including a cemented lens triplet made of a double convex lens, a double concave lens and a double convex lens, as well as a convex lens; and
wherein, when $\phi_{11}$ is the power of the lens on the object side in the cemented lens of the first lens group, $\phi_{12}$ is the power of the lens on the image plane side in the cemented lens of the first lens group, $v_{d11}$ is the Abbe number of the lens on the object side in the cemented lens of the first lens group, and $v_{d12}$ is the Abbe number of the lens on the image plane side in the cemented lens of the first lens group, then the first lens group satisfies the condition of the following Expression 4:

$$-75 < v_{d11}v_{d12}(\phi_{11}+\phi_{12})/(\phi_{11}v_{d12}+\phi_{12}v_{d11}) < -50. \quad \text{Expression 4.}$$

5. The zoom lens according to claim 4, wherein at least three surfaces of the cemented lens triplet of the fifth lens group have the same radius of curvature.

6. A zoom lens comprising:
a first lens group that is made of a lens having negative refractive power, a lens having positive refractive power, and a lens having positive refractive power, arranged in that order from an object side to an image plane side, the first lens group having an overall positive refractive power and being fixed with respect to an image plane;
a second lens group having an overall negative refractive power, a zoom operation being carried out by shifting the second lens group on an optical axis;
an aperture stop that is fixed with respect to the image plane;
a third lens group that is made of a lens having positive refractive power and a lens having negative refractive power, arranged in that order from the object side to the image plane side, the third lens group having an overall positive refractive power and being fixed with respect to the optical axis direction when zooming or focusing;
a fourth lens group that is made of a lens having negative refractive power and a lens having positive refractive power, arranged in that order from the object side to the image plane side, the fourth lens group having an overall negative refractive power and being fixed with respect to the image plane; and
a fifth lens group that has an overall positive refractive power and that is shifted on the optical axis so as to maintain the image plane, which fluctuates when the second lens group is shifted on the optical axis and when the object moves, at a certain position from a reference plane;
wherein the second lens group is made of four lenses, including a negative meniscus lens, a double concave lens, and a cemented lens made of a convex lens and a concave lens, arranged in that order from the object side to the image plane side;
wherein the third lens group can be shifted in a direction perpendicular to the optical axis in order to correct image fluctuations during camera shake;
wherein the fourth lens group is made of two single lenses, including a convex lens and a concave lens;
wherein the fifth lens group is made of three lenses; and
wherein, when $\phi_{11}$ is the power of the lens on the object side in the cemented lens of the first lens group, $\phi_{12}$ is the power of the lens on the image plane side in the cemented lens of the first lens group, $v_{d11}$ is the Abbe number of the lens on the object side in the cemented lens of the first lens group, and $v_{d12}$ is the Abbe number of the lens on the image plane side in the cemented lens of the first lens group, then the first lens group satisfies the condition of the following Expression 5:

$$-75 < v_{d11}v_{d12}(\phi_{11}+\phi_{12})/(\phi_{11}v_{d12}+\phi_{12}v_{d11}) < -50. \quad \text{Expression 5.}$$

7. A zoom lens comprising:
a first lens group that is made of a lens having negative refractive power, a lens having positive refractive power, and a lens having positive refractive power, arranged in that order from an object side to an image plane side, the first lens group having an overall positive refractive power and being fixed with respect to an image plane;
a second lens group having an overall negative refractive power, a zoom operation being carried out by shifting the second lens group on an optical axis;
an aperture stop that is fixed with respect to the image plane;
a third lens group that is made of a lens having positive refractive power and a lens having negative refractive power, arranged in that order from the object side to the image plane side, the third lens group having an overall positive refractive power and being fixed with respect to the optical axis direction when zooming or focusing;
a fourth lens group that is made of a lens having negative refractive power and a lens having positive refractive power, arranged in that order from the object side to the image plane side, the fourth lens group having an overall negative refractive power and being fixed with respect to the image plane; and
a fifth lens group that has an overall positive refractive power and that is shifted on the optical axis so as to maintain the image plane, which fluctuates when the second lens group is shifted on the optical axis and when the object moves, at a certain position from a reference plane;
wherein the second lens group is made of four lenses, including a negative meniscus lens, a double concave lens, and a cemented lens made of a convex lens and a concave lens, arranged in that order from the object side to the image plane side;
wherein the third lens group can be shifted in a direction perpendicular to the optical axis in order to correct image fluctuations during camera shake;
wherein the fourth lens group is made of two single lenses, including a convex lens and a concave lens;
wherein the fifth lens group is made of four lenses; and
wherein, when $\phi_{11}$ is the power of the lens on the object side in the cemented lens of the first lens group, $\phi_{12}$ is the power of the lens on the image plane side in the cemented lens of the first lens group, $v_{d11}$ is the Abbe number of the lens on the object side in the cemented lens of the first lens group, and $v_{d12}$ is the Abbe number of the lens on the image plane side in the cemented lens of the first lens group, then the first lens group satisfies the condition of the following Expression 6:

$$-75 < v_{d11}v_{d12}(\phi_{11}+\phi_{12})/(\phi_{11}v_{d12}+\phi_{12}v_{d11}) < -50. \quad \text{Expression 6.}$$

8. The zoom lens according to claim 1,
wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{C,A'12}$ are anomalous dispersion factors of the second lens of the first lens group counting from the object side, then the conditions of the following Expressions 7 to 9 are satisfied:

$$0.014 < dP_{g, F12} < 0.039 \quad \text{Expression 7}$$

$$0.020 < dP_{g, d12} < 0.057 \quad \text{Expression 8}$$

$$-0.031 < dP_{C, A'12} < -0.02. \quad \text{Expression 9.}$$

9. The zoom lens according to claim 1, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{C,A'11}$ are anomalous dispersion factors of the first lens of the first lens group counting from the object side, and $dP_{g,F12}$, $dP_{g,d12}$, and $dP_{C,A'12}$ are anomalous dispersion factors of the second lens of the first lens group counting from the object side, then the conditions of the following Expressions 10 to 12 are satisfied:

$$-0.006 < dP_{g,F11} - dP_{g,F12} < 0.019 \quad \text{Expression 10}$$

$$0.002 < dP_{g,d11} - dp_{g,d12} < 0.035 \quad \text{Expression 11}$$

$$-0.027 < dP_{C,A'11} - dP_{C,A'12} < -0.016. \quad \text{Expression 12.}$$

10. The zoom lens according to claim 1, wherein when $n_{d21}$ is the refractive index of the lens that is furthest on the object side in the second lens group, and $v_{d21}$ is its Abbe number, then the conditions of the following Expressions 13 and 14 are satisfied:

$$n_{d21} > 1.85 \quad \text{Expression 13}$$

$$30 < v_{d21} < 50. \quad \text{Expression 14.}$$

11. The zoom lens according to any of claim 1, wherein when $n_{d21}$ is the refractive index of the lens that is furthest on the object side in the second lens group, and $v_{d21}$ is its Abbe number, then the conditions of the following Expressions 15 and 16 are satisfied:

$$1.75 < n_{d21} < 1.85 \quad \text{Expression 15}$$

$$30 < v_{d21} < 50. \quad \text{Expression 16.}$$

12. The zoom lens according to claim 1, wherein the second lens group includes at least one aspherical surface.

13. The zoom lens according to claim 1, wherein the third lens group includes at least one aspherical surface.

14. The zoom lens according to claim 1, wherein the fifth lens group includes at least one aspherical surface.

15. The zoom lens according to claim 1, wherein, when in the cemented lens of the second lens group, $\phi_{22}$ is the power of the lens on the object side, $v_{d22}$ is its Abbe number, $\phi_{23}$ is the power of the lens on the image plane side, and $v_{d23}$ is its Abbe number, then the condition of the following Expression 17 is satisfied:

$$19 < v_{d22} v_{d23} (\phi_{22} + \phi_{23}) / (\phi_{22} v_{d23} + \phi_{22} v_{d23}) < -22. \quad \text{Expression 17.}$$

16. The zoom lens according to claim 1, wherein, when $f_w$ is the focus distance of the entire system at a wide-angle end, $f_i$ ($i = 1 \ldots 5$) is the focus distance of the i-th lens group, and $f_{34}$ is a combined focus distance of the third lens group and the fourth lens group, then the conditions of the following Expressions 18 to 21 are satisfied:

$$8.5 < f_1/f_w < 10.0 \quad \text{Expression 18}$$

$$1.6 < f_2/f_w < 1.7 \quad \text{Expression 19}$$

$$8.0 < f_{34}/f_w < 9.5 \quad \text{Expression 20}$$

$$2.0 < f_5/f_w < 5.0. \quad \text{Expression 21.}$$

17. A video camera comprising a zoom lens, wherein a zoom lens according to claim 1 is used as the zoom lens.

18. The zoom lens according to claim 4, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{C,A'12}$ are anomalous dispersion factors of the second lens of the first lens group counting from the object side, then the conditions of the following Expressions 7 to 9 are satisfied:

$$0.014 < dP_{g,F12} < 0.039 \quad \text{Expression 7}$$

$$0.020 < dP_{g,d12} < 0.057 \quad \text{Expression 8}$$

$$-0.031 < dP_{C,A'12} < -0.02. \quad \text{Expression 9.}$$

19. The zoom lens according to claim 6, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{C,A'12}$ are anomalous dispersion factors of the second lens of the first lens group counting from the object side, then the conditions of the following Expressions 7 to 9 are satisfied:

$$0.014 < dP_{g,F12} < 0.039 \quad \text{Expression 7}$$

$$0.020 < dP_{g,d12} < 0.057 \quad \text{Expression 8}$$

$$-0.031 < dP_{C,A'12} < -0.02. \quad \text{Expression 9.}$$

20. The zoom lens according to claim 7, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F12}$, $dP_{g,d12}$, and $dP_{C,A'12}$ are anomalous dispersion factors of the second lens of the first lens group counting from the object side, then the conditions of the following Expressions 7 to 9 are satisfied:

$$0.014 < dP_{g,F12} < 0.039 \quad \text{Expression 7}$$

$$0.020 < dP_{g,d12} < 0.057 \quad \text{Expression 8}$$

$$-0.031 < dP_{C,A'12} < -0.02. \quad \text{Expression 9.}$$

21. The zoom lens according to claim 4, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F11}$, $dP_{g,d12}$, and $dP_{C,A'11}$ are anomalous dispersion factors of the first lens of the first lens group counting from the object side, and $dP_{g,F12}$, $dP_{g,d12}$, and $dP_{C,A'12}$ are anomalous dispersion factors of the second lens of the first lens group counting from the object side, then the conditions of the following Expressions 10 to 12 are satisfied:

$$-0.006 < dP_{g,F11} - dP_{g,F12} < 00.019 \quad \text{Expression 10}$$

$$0.002 < dP_{g,d11} - dP_{g,d12} < 0.035 \quad \text{Expression 11}$$

$$-0.027 < dP_{C,A'11} - dP_{C,A'12} < -0.016. \quad \text{Expression 12.}$$

22. The zoom lens according to claim 6, wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F11}$, $dP_{g,d11}$, and $dP_{C,A'11}$ are anomalous dispersion factors of the first lens of the first lens group counting from the object side, and $dP_{g,F12}$, $dP_{g,d12}$, and $dP_{C,A'12}$ are anomalous dispersion factors of the second lens of the first lens group counting from the object side, then the conditions of the following Expressions 10 to 12 are satisfied:

$-0.006 < dP_{g,F11} - dP_{g,F12} < 00.019$  Expression 10

$0.002 < dP_{g,d11} - dP_{g,d12} < 0.035$  Expression 11

$-0.027 < dP_{C,A'11} - dP_{C,A'12} < -0.016.$  Expression 12.

23. The zoom lens according to claim 7,
wherein, when $dP_{g,F}$, $dP_{g,d}$, and $dP_{C,A'}$ are anomalous dispersion factors for partial dispersion ratios at a g-line (435 nm), an F-line (486 nm), a d-line (587 nm), a C-line (656 nm) and an A'-line (768 nm) of the lens, and $dP_{g,F11}$, $dP_{g,d11}$, and $dP_{C,A'11}$ are anomalous dispersion factors of the first lens of the first lens group counting from the object side, and $dP_{g,F12}$, $dP_{g,d12}$, and $dP_{C,A'12}$ are anomalous dispersion factors of the second lens of the first lens group counting from the object side, then the conditions of the following Expressions 10 to 12 are satisfied:

$-0.006 < dP_{g,F11} - dP_{g,F12} < 00.019$  Expression 10

$0.002 < dP_{g,d11} - dP_{g,d12} < 0.035$  Expression 11

$-0.027 < dP_{C,A'11} - dP_{C,A'12} < -0.016.$  Expression 12.

24. The zoom lens according to claim 4,
wherein when $n_{d21}$ is the refractive index of the lens that is furthest on the object side in the second lens group, and $v_{d21}$ is its Abbe number, then the conditions of the following Expressions 13 and 14 are satisfied:

$n_{d21} > 1.85$  Expression 13

$30 < v_{d21} < 50.$  Expression 14.

25. The zoom lens according to claim 6,
wherein when $n_{d21}$ is the refractive index of the lens that is furthest on the object side in the second lens group, and $v_{d21}$ is its Abbe number, then the conditions of the following Expressions 13 and 14 are satisfied:

$n_{d21} > 1.85$  Expression 13

$30 < v_{d21} < 50.$  Expression 14.

26. The zoom lens according to claim 7,
wherein when $n_{d21}$ is the refractive index of the lens that is furthest on the object side in the second lens group, and $v_{d21}$ is its Abbe number, then the conditions of the following Expressions 13 and 14 are satisfied:

$n_{d21} > 1.85$  Expression 13

$30 < v_{d21} < 50.$  Expression 14.

27. The zoom lens according to claim 4,
wherein when $n_{d21}$ is the refractive index of the lens that is furthest on the object side in the second lens group, and $v_{d21}$ is its Abbe number, then the conditions of the following Expressions 15 and 16 are satisfied:

$1.75 < n_{d21} < 1.85$  Expression 15

$30 < v_{d21} < 50.$  Expression 16.

28. The zoom lens according to claim 6,
wherein when $n_{d21}$ is the refractive index of the lens that is furthest on the object side in the second lens group, and $v_{d21}$ is its Abbe number, then the conditions of the following Expressions 15 and 16 are satisfied:

$1.75 < n_{d21} < 1.85$  Expression 15

$30 < v_{d21} < 50.$  Expression 16.

29. The zoom lens according to claim 7,
wherein when $n_{d21}$ is the refractive index of the lens that is furthest on the object side in the second lens group, and $v_{d21}$ is its Abbe number, then the conditions of the following Expressions 15 and 16 are satisfied:

$1.75 < n_{d21} < 1.85$  Expression 15

$30 < v_{d21} < 50.$  Expression 16.

30. The zoom lens according to claim 4, wherein the second lens group includes at least one aspherical surface.

31. The zoom lens according to claim 6, wherein the second lens group includes at least one aspherical surface.

32. The zoom lens according to claim 7, wherein the second lens group includes at least one aspherical surface.

33. The zoom lens according to claim 4, wherein the third lens group includes at least one aspherical surface.

34. The zoom lens according to claim 6, wherein the third lens group includes at least one aspherical surface.

35. The zoom lens according to claim 7, wherein the third lens group includes at least one aspherical surface.

36. The zoom lens according to claim 4, wherein the fifth lens group includes at least one aspherical surface.

37. The zoom lens according to claim 6, wherein the fifth lens group includes at least one aspherical surface.

38. The zoom lens according to claim 7, wherein the fifth lens group includes at least one aspherical surface.

39. The zoom lens according to claim 4, wherein, when in the cemented lens of the second lens group, $\phi_{22}$ is the power of the lens on the object side, $v_{d22}$ is its Abbe number, $\phi_{23}$ is the power of the lens on the image plane side, and $v_{d23}$ is its Abbe number, then the condition of the following Expression 17 is satisfied:

$19 < v_{d22} v_{d23} (\phi_{22} + \phi_{23}) / (\phi_{22} v_{d23} + \phi_{23} v_{d22}) < 22.$  Expression 17.

40. The zoom lens according to claim 6,
wherein, when in the cemented lens of the second lens group, $\phi_{22}$ is the power of the lens on the object side, $v_{d22}$ is its Abbe number, $\phi_{23}$ is the power of the lens on the image plane side, and $v_{d23}$ is its Abbe number, then the condition of the following Expression 17 is satisfied:

$19 < v_{d22} v_{d23} (\phi_{22} + \phi_{23}) / (\phi_{22} v_{d23} + \phi_{23} v_{d22}) < 22.$  Expression 17.

41. The zoom lens according to claim 7,
wherein, when in the cemented lens of the second lens group, $\phi_{22}$ is the power of the lens on the object side, $v_{d22}$ is its Abbe number, $\phi_{23}$ is the power of the lens on the image plane side, and $v_{d23}$ is its Abbe number, then the condition of the following Expression 17 is satisfied:

$19 < v_{d22} v_{d23} (\phi_{22} + \phi_{23}) / (\phi_{22} v_{d23} + \phi_{23} v_{d22}) < 22.$  Expression 17.

42. The zoom lens according to claim 4,
wherein, when $f_w$ is the focus distance of the entire system at a wide-angle end, $f_i$ (i=1 . . . 5) is the focus distance of the i-th lens group, and $f_{34}$ is a combined focus distance of the third lens group and the fourth lens group, then the conditions of the following Expressions 18 to 21 are satisfied:

$8.5 < f_1/f_w < 10.0$  Expression 18

$1.6 < |f_2|/f_w < 1.7$  Expression 19

$8.0<f_{34}/f_w<9.5$ Expression 20

$2.0<f_5/f_w<5.0.$ Expression 21.

43. The zoom lens according to claim 6,
wherein, when $f_w$ is the focus distance of the entire system at a wide-angle end, $f_i$ (i=1 . . . 5) is the focus distance of the i-th lens group, and $f_{34}$ is a combined focus distance of the third lens group and the fourth lens group, then the conditions of the following Expressions 18 to 21 are satisfied:

$1.6<|f_2|/f_w<1.7$ Expression 19

$8.0<f_{34}/f_w<9.5$ Expression 20

$2.0<f_5/f_w<5.0.$ Expression 21.

44. The zoom lens according to claim 7,
wherein, when $f_w$ is the focus distance of the entire system at a wide-angle end, $f_i$ (i=1 . . . 5) is the focus distance of the i-th lens group, and $f_{34}$ is a combined focus distance of the third lens group and the fourth lens group, then the conditions of the following Expressions 18 to 21 are satisfied:

$1.6<|f_2|/f_w<1.7$ Expression 19

$8.0<f_{34}/f_w<9.5$ Expression 20

$2.0<f_5/f_w<5.0.$ Expression 21.

45. A video camera comprising a zoom lens,
wherein a zoom lens according to claim 4 is used as the zoom lens.
46. A video camera comprising a zoom lens,
wherein a zoom lens according to claim 6 is used as the zoom lens.
47. A video camera comprising a zoom lens,
wherein a zoom lens according to claim 7 is used as the zoom lens.

* * * * *